United States Patent
Raina et al.

(10) Patent No.: US 10,341,466 B2
(45) Date of Patent: Jul. 2, 2019

(54) EVOLVED DATA COMPRESSION SCHEME SIGNALING

(71) Applicant: QUALCOMM Incorporated, San Diego, CA (US)

(72) Inventors: Ashwini Raina, Sunnyvale, CA (US); Shailesh Maheshwari, San Diego, CA (US); Vishal Dalmiya, San Diego, CA (US); Srinivasan Balasubramanian, San Diego, CA (US); Rohit Kapoor, Bangalore (IN); Seyed Ali Ahmadzadeh, San Jose, CA (US); Leena Zacharias, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 317 days.

(21) Appl. No.: 14/939,137

(22) Filed: Nov. 12, 2015

(65) Prior Publication Data

US 2016/0142518 A1  May 19, 2016

Related U.S. Application Data

(60) Provisional application No. 62/151,371, filed on Apr. 22, 2015, provisional application No. 62/121,433, (Continued)

(51) Int. Cl.
*H04L 29/06* (2006.01)
*H04W 28/02* (2009.01)
(Continued)

(52) U.S. Cl.
CPC ............. *H04L 69/04* (2013.01); *H04L 69/24* (2013.01); *H04W 28/0289* (2013.01); *H04W 28/06* (2013.01); *H04W 28/18* (2013.01)

(58) Field of Classification Search
CPC .................................................... H04W 72/00
See application file for complete search history.

(56) References Cited

U.S. PATENT DOCUMENTS 7,290,063 B2    10/2007  Kalliokulju et al.
8,959,230 B2    2/2015   Hsu et al.
(Continued)

FOREIGN PATENT DOCUMENTS

WO        WO0211397 A1    2/2002

OTHER PUBLICATIONS

ISA/EPO, International Search Report and Written Opinion of the International Searching Authority, Int'l. App. No. PCT/US2015/060640, dated Feb. 1, 2016, European Patent Office, Rijswijk, NL, 11 pgs.

*Primary Examiner* — Sulaiman Nooristany
(74) *Attorney, Agent, or Firm* — Holland & Hart LLP/Qualcomm

(57) ABSTRACT

Methods, systems, and devices are described for wireless communication at a UE. In aspects, a receiver may receive a transmission requesting information about support for data compression. The receiver may determine parameters related to the types of supported data compression and communicate the information to the transmitting device. In some cases, the receiver may then receive a message from the transmitting entity that requests establishment of a data compression configuration. The receiver may respond with confirmation or rejection of the proposed compression configuration. If the configuration is confirmed, the transmitter and receiver may exchange compressed data packets according to the configuration. The devices may exchange status and control information related to the compression configu- (Continued)

ration (e.g., in a compression header of a compressed message or a separate status and/or control information message).

16 Claims, 31 Drawing Sheets

Related U.S. Application Data filed on Feb. 26, 2015, provisional application No. 62/080,197, filed on Nov. 14, 2014, provisional application No. 62/080,227, filed on Nov. 14, 2014.

(51) Int. Cl.
*H04W 28/06* (2009.01)
*H04W 28/18* (2009.01)

(56) References Cited

U.S. PATENT DOCUMENTS

| | | |
|---|---|---|
| 2010/0034187 A1 | 2/2010 | Kumar et al. |
| 2011/0142122 A1* | 6/2011 | Park ................ H04N 21/25808 375/240.01 |
| 2012/0106413 A1* | 5/2012 | Huang ................ H04L 1/0079 370/310 |
| 2013/0035106 A1* | 2/2013 | Hans .................... H04W 28/06 455/452.1 |
| 2014/0211620 A1 | 7/2014 | Kubota et al. |
| 2014/0369200 A1 | 12/2014 | Poeluev et al. |
| 2015/0326685 A1* | 11/2015 | Erickson ................ H04L 29/06 709/213 |
| 2015/0326695 A1* | 11/2015 | Pang ...................... H04L 69/04 370/477 |

\* cited by examiner

EVOLVED DATA COMPRESSION SCHEME SIGNALING

CROSS REFERENCES

The present application for patent claims priority to U.S. Provisional Patent Application No. 62/151,371 by Raina et al., entitled "Evolved Data Compression Scheme Signaling," filed Apr. 22, 2015, U.S. Provisional Patent Application No. 62/121,433 by Maheshwari et al., entitled "Techniques For Extending A Header For An Evolved Data Compression Scheme (EDCS)," filed Feb. 26, 2015, U.S. Provisional Patent Application No. 62/080,197 by Raina et al., entitled "Evolved Data Compression Scheme Signaling," filed Nov. 14, 2014, and U.S. Provisional Patent Application No. 62/080,227 by Dalmiya et al., entitled "Techniques For Extending A Header For An Evolved Data Compression Scheme (EDCS)," filed Nov. 14, 2014, assigned to the assignee hereof.

BACKGROUND

Field of Disclosure

The following relates generally to wireless communication, and more specifically to evolved data compression scheme signaling.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Wireless systems may suffer from congestion due to an increasing number of receivers and an increasing amount of data traffic to and from those receivers. Increased congestion may result in slower communication exchanges, and may also result in difficulties establishing connections between receivers and transmitters. Receivers may spend a significantly higher amount of time searching for available base stations or waiting in an active state for communications, thus representing a power drain on the receiver.

A wireless communications system may use data acceleration techniques such as data compression to relieve congestion. Data compression may reduce the amount of resources it takes to transmit information. However, the transmitter may not know what configurations of data compression the receiver supports. Consequently, the transmitter may use a data compression configuration which the receiver does not support, or may forego using data compression altogether, which may result in decreased communication performance.

SUMMARY

The present disclosure may relate generally to wireless communications systems, and more particularly to improved systems, methods, or apparatuses for evolved data compression scheme signaling. For example, a receiver may receive a transmission requesting information about support for data compression. The receiver may determine parameters related to the types of supported data compression and communicate the information to the transmitting device. In some cases, the receiver may then receive a message from the transmitting entity that requests establishment of a data compression configuration. The receiver may respond with confirmation or rejection of the proposed compression configuration. If the configuration is confirmed, the transmitter and receiver may exchange compressed data packets according to the configuration. The devices may also exchange status and control information related to the compression configuration (e.g., in a compression header of a compressed message or a separate status and/or control information message).

One example for reducing congestion in wireless communication networks is to apply compression schemes to the wireless communications. An example compression scheme may be referenced herein as an evolved data compression scheme (eDCS). eDCS is a compression scheme that may be used by both receivers and transmitters. In order to use eDCS, however, both the receivers and the transmitters may require access to a compression context. The compression context provides the receivers and the transmitters the compression scheme that is to be or has been applied. Thus, a compression context may vary based on different types of traffic and payloads on a wireless communication network. The compression context, and other useful compression options, may be communicated between a receiver and a transmitter using, for example, a compression header. The compression header may include a compression scheme portion having an extension indicator to indicate that the compression header includes various compression options, such as implementation of various compression contexts.

A method of wireless communication at a UE is described. The method may include receiving a compression capability request related to a capability for compressing a payload of a wireless data transmission, identifying at least one compression capability parameter based on the compression capability request, and transmitting a compression capability response based at least in part on the compression capability request and the at least one compression capability parameter.

An apparatus for wireless communication at a UE is described. The apparatus may include means for receiving a compression capability request related to a capability for compressing a payload of a wireless data transmission, means for identifying at least one compression capability parameter based on the compression capability request, and means for transmitting a compression capability response based at least in part on the compression capability request and the at least one compression capability parameter.

A further apparatus for wireless communication at a UE is described. The apparatus may include a processor, memory in electronic communication with the processor, and instructions stored in the memory, wherein the instructions are executable by the processor to receive a compression capability request related to a capability for compressing a payload of a wireless data transmission, identify at least one compression capability parameter based on the compression capability request, and transmit a compression capability response based at least in part on the compression capability request and the at least one compression capability parameter.

A non-transitory computer-readable medium storing code for wireless communication at a UE is described. The code may include instructions executable to receive a compression capability request related to a capability for compressing a payload of a wireless data transmission, identify at least one compression capability parameter based on the compression capability request, and transmit a compression capability response based at least in part on the compression capability request and the at least one compression capability parameter.

Some examples of the method, apparatuses, or non-transitory computer-readable medium described above may further include receiving a compression configuration request. Additionally or alternatively, some examples may include transmitting a compression configuration confirmation based at least in part on the compression configuration request.

Some examples of the method, apparatuses, or non-transitory computer-readable medium described above may further include transmitting a compression configuration rejection based at least in part on the compression configuration request. Additionally or alternatively, some examples may include transmitting a compressed packet based at least in part on the compression capability response.

Some examples of the method, apparatuses, or non-transitory computer-readable medium described above may further include receiving a compressed packet based at least in part on the compression capability response. Additionally or alternatively, in some examples the compressed packet comprises one or more extended compression header fields indicating at least one of a compression context reset request, a compression disable request associated with a number of subsequent packets, a compression context synchronization indication, a compression context freeze request, a multi-part compression indicator associated with a plurality of compression contexts, or a compression metadata indicator.

Some examples of the method, apparatuses, or non-transitory computer-readable medium described above may further include transmitting a context identification (ID) save confirmation request. Additionally or alternatively, some examples may include receiving a context ID save confirmation.

Some examples of the method, apparatuses, or non-transitory computer-readable medium described above may further include transmitting a compression control message (e.g., request). Additionally or alternatively, in some examples transmitting the compression control message comprises transmitting the compression control message on a high priority radio bearer.

In some examples of the method, apparatuses, or non-transitory computer-readable medium described above, the compression control message is based at least in part on a determination that an amount of available wireless device processing resources is below a threshold. Additionally or alternatively, in some examples the compression control message is based on a determination that the wireless device has failed to decompress or decode a number of packets.

In some examples of the method, apparatuses, or non-transitory computer-readable medium described above, the compression control message comprises at least one of a compression state indication, a compression scope indication, a data compression threshold, a compression enable/disable indication, a compressed packet ratio, or a context ID reset request. Additionally or alternatively, some examples may include transmitting a compression status indication.

In some examples of the method, apparatuses, or non-transitory computer-readable medium described above, the compression status indication comprises at least one of a ciphered packet data convergence protocol (PDCP) control protocol data unit (PDU) type, an unciphered PDCP control PDU type, a sequence number, a compression enable/disable indication. In some examples of the method, apparatuses, or non-transitory computer-readable medium described above, transmitting the compression status indication comprises disabling or enabling compression on a radio bearer, and transmitting the compression status indication after a last or before a first compressed data protocol data unit (PDU) is transmitted. Additionally or alternatively, some examples may include transmitting a compression enable request or a compression disable request based at least in part on at least one of a processing limitation, a traffic type, or a determination that a resource grant volume is sufficient to clear an uncompressed memory buffer during one or more periodic intervals.

In some examples of the method, apparatuses, or non-transitory computer-readable medium described above, the compression capability parameter comprises a compression rate support parameter or a compression context prefill configuration. Additionally or alternatively, some examples may include disabling a PDCP discard timer based at least in part on the compression capability request.

Some examples of the method, apparatuses, or non-transitory computer-readable medium described above may further include receiving a compressed packet, wherein the compressed packet is compressed immediately prior to transmission. Additionally or alternatively, some examples may include resetting a compression queue based on an indication that a compressed packet has been dropped.

Some examples of the method, apparatuses, or non-transitory computer-readable medium described above may further include storing a compressed version of a packet, storing an uncompressed version of the packet, and resetting a context ID based on the uncompressed version of the packet.

A method of wireless communication at a base station is described. The method may include transmitting a compression capability request related to a capability for compressing a payload of a wireless data transmission, receiving a compression capability response based at least in part on the compression capability request, and selecting a compression configuration based at least in part on the compression capability response.

An apparatus for wireless communication at a base station is described. The apparatus may include means for transmitting a compression capability request related to a capability for compressing a payload of a wireless data transmission, means for receiving a compression capability response based at least in part on the compression capability request, and means for selecting a compression configuration based at least in part on the compression capability response.

A further apparatus for wireless communication at a base station is described. The apparatus may include a processor, memory in electronic communication with the processor, and instructions stored in the memory, wherein the instructions are executable by the processor to transmit a compression capability request related to a capability for compressing a payload of a wireless data transmission, receive a compression capability response based at least in part on the compression capability request, and select a compression configuration based at least in part on the compression capability response.

A non-transitory computer-readable medium storing code for wireless communication at a base station is described. The code may include instructions executable to transmit a compression capability request related to a capability for compressing a payload of a wireless data transmission, receive a compression capability response based at least in part on the compression capability request, and select a compression configuration based at least in part on the compression capability response.

Some examples of the method, apparatuses, or non-transitory computer-readable medium described above may further include transmitting a compression configuration request based at least in part on the selected compression configuration. Additionally or alternatively, some examples may include receiving a compression configuration confirmation based at least in part on the compression configuration request.

Some examples of the method, apparatuses, or non-transitory computer-readable medium described above may further include receiving a compression configuration rejection based at least in part on the compression configuration request. Additionally or alternatively, some examples may include receiving a compressed packet based at least in part on the compression capability response.

Some examples of the method, apparatuses, or non-transitory computer-readable medium described above may further include transmitting a compressed packet based at least in part on the compression capability response. Additionally or alternatively, in some examples the compressed packet comprises one or more extended compression header fields indicating at least one of a compression context reset request, a compression disable request associated with a number of subsequent packets, a compression context synchronization indication, a compression context freeze request, a multi-part compression indicator associated with a plurality of compression contexts, or a compression metadata indicator.

Some examples of the method, apparatuses, or non-transitory computer-readable medium described above may further include receiving a context ID save confirmation request. Additionally or alternatively, some examples may include transmitting a context ID save confirmation.

Some examples of the method, apparatuses, or non-transitory computer-readable medium described above may further include transmitting a compression control message (e.g., request). Additionally or alternatively, in some examples transmitting the compression control message comprises transmitting the compression control message on a high priority radio bearer.

In some examples of the method, apparatuses, or non-transitory computer-readable medium described above, the compression control message is based at least in part on a determination that an amount of available wireless device processing resources is below a threshold. Additionally or alternatively, in some examples the compression control message is based on a determination that the wireless device has failed to decompress or decode a number of packets.

In some examples of the method, apparatuses, or non-transitory computer-readable medium described above, the compression control message comprises at least one of a compression state indication, a compression scope indication, a data compression threshold, a compression enable/disable indication, a compressed packet ratio, or a context ID reset request. Additionally or alternatively, some examples may include transmitting a compression status indication.

In some examples of the method, apparatuses, or non-transitory computer-readable medium described above, the compression status indication comprises at least one of a ciphered PDCP control PDU type, an unciphered PDCP control PDU type, a sequence number, or a compression enable/disable indication. Additionally or alternatively, some examples may include transmitting a compression enable request or a compression disable request based at least in part on at least one of a processing limitation, a traffic type, or a determination that a resource grant volume is sufficient to clear an uncompressed memory buffer during one or more periodic intervals.

In some examples of the method, apparatuses, or non-transitory computer-readable medium described above, the capability relates to a compression rate support parameter or a compression context prefill configuration. Additionally or alternatively, some examples may include disabling a PDCP discard timer based at least in part on the compression capability request.

Some examples of the method, apparatuses, or non-transitory computer-readable medium described above may further include resetting a compression queue based on an indication that a compressed packet has been dropped. Additionally or alternatively, some examples may include determining that a packet is scheduled for immediate transmission, and compressing the packet based on the determination that the packet is scheduled for immediate transmission.

A method for wireless communication is described. The method may include identifying a compression option associated with a wireless communication session, wherein the compression option is associated with at least a compression context in the wireless communication session. The method may also include generating a compression header for a data packet, wherein the compression header comprises a compression scheme portion that identifies the compression option. Additionally, the method may include transmitting the compression header and the data packet during the wireless communication session.

An apparatus for wireless communication is described. The apparatus may include means for identifying a compression option associated with a wireless communication session, wherein the compression option is associated with at least a compression context in the wireless communication session. The apparatus may also include means for generating a compression header for a data packet, wherein the compression header comprises a compression scheme portion that identifies the compression option. The apparatus may further include means for transmitting the compression header and the data packet during the wireless communication session.

A further apparatus for wireless communication is described. The apparatus may include a processor, memory in electronic communication with the processor, and instructions stored in the memory. The instructions may be executable by the processor to identify a compression option associated with a wireless communication session, wherein the compression option is associated with at least a compression context in the wireless communication session. The instructions may further be executable by the processor to generate a compression header for a data packet, wherein the compression header comprises a compression scheme portion that identifies the compression option. The instructions may further be executable by the processor to transmit the compression header and the data packet during the wireless communication session.

A non-transitory computer-readable medium storing computer-executable code for wireless communication is described. The code may be executable by a processor to identify a compression option associated with a wireless communication session, wherein the compression option is associated with at least a compression context in the wireless communication session. The code may further be executable by a processor to generate a compression header for a data packet, wherein the compression header comprises a compression scheme portion that identifies the compression option. The code may also be executable by a processor to transmit the compression header and the data packet during the wireless communication session.

Some examples of the method, apparatuses, or non-transitory computer-readable medium described above may further include conveying, via the compression option, a compression context identification (ID) which identifies the compression context applied to one or more portions of the data packet. Additional examples may include indicating to a receiver, via the compression option, to reset a compression scheme to a compression context ID. Other examples may include indicating to a receiver, via the compression option, to store the compression context using the compression context ID. Some examples may include indicating to a receiver, via the compression option, to apply the compression context ID to additional data packets transmitted subsequent to the transmission of the data packet without updating the compression context. Other examples may include indicating, via the compression option, that the compression context ID applies to a part of an un-compressed portion of the data packet. The part to which the compression context ID applies may be indicated by a length of that part. The length of the part may be indicated with the compression context ID or via a separate length indicator field. Alternatively, the part to which the compression context ID applies may be indicated by an absence of a length field indicating a length of that part, wherein the part is a remaining portion of the data packet.

Some examples of the method, apparatuses, or non-transitory computer-readable medium described above may further include indicating, via the compression option, that at least one data packet transmitted subsequent to the transmission of the data packet will not include the compression header. Other examples may include indicating, via the compression option, that current and subsequent data packets will not include a compression metadata. Still other examples may include pre-negotiating a compression context identification (ID) and a corresponding compressed portion of the data packet; and using the compression scheme portion to indicate that the compression option is a null value.

Some examples of the method, apparatuses, or non-transitory computer-readable medium described above may further include using the compression option to indicate a compression context identification (ID) and a corresponding compressed portion of the data packet. The corresponding compressed portion of the data packet may be indicated by a length of the corresponding compressed portion. The length may be indicated in a dedicated length field indicator of the compression option.

Still other examples of the method, apparatuses, or non-transitory computer-readable medium described above may further include using the compression option to indicate a plurality of compression context identifications (IDs) and corresponding compressed portions of the data packet. At least one of the corresponding compressed portions may be a session initiation protocol (SIP). At least one of the corresponding compressed portions may be a TCP/IP header.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
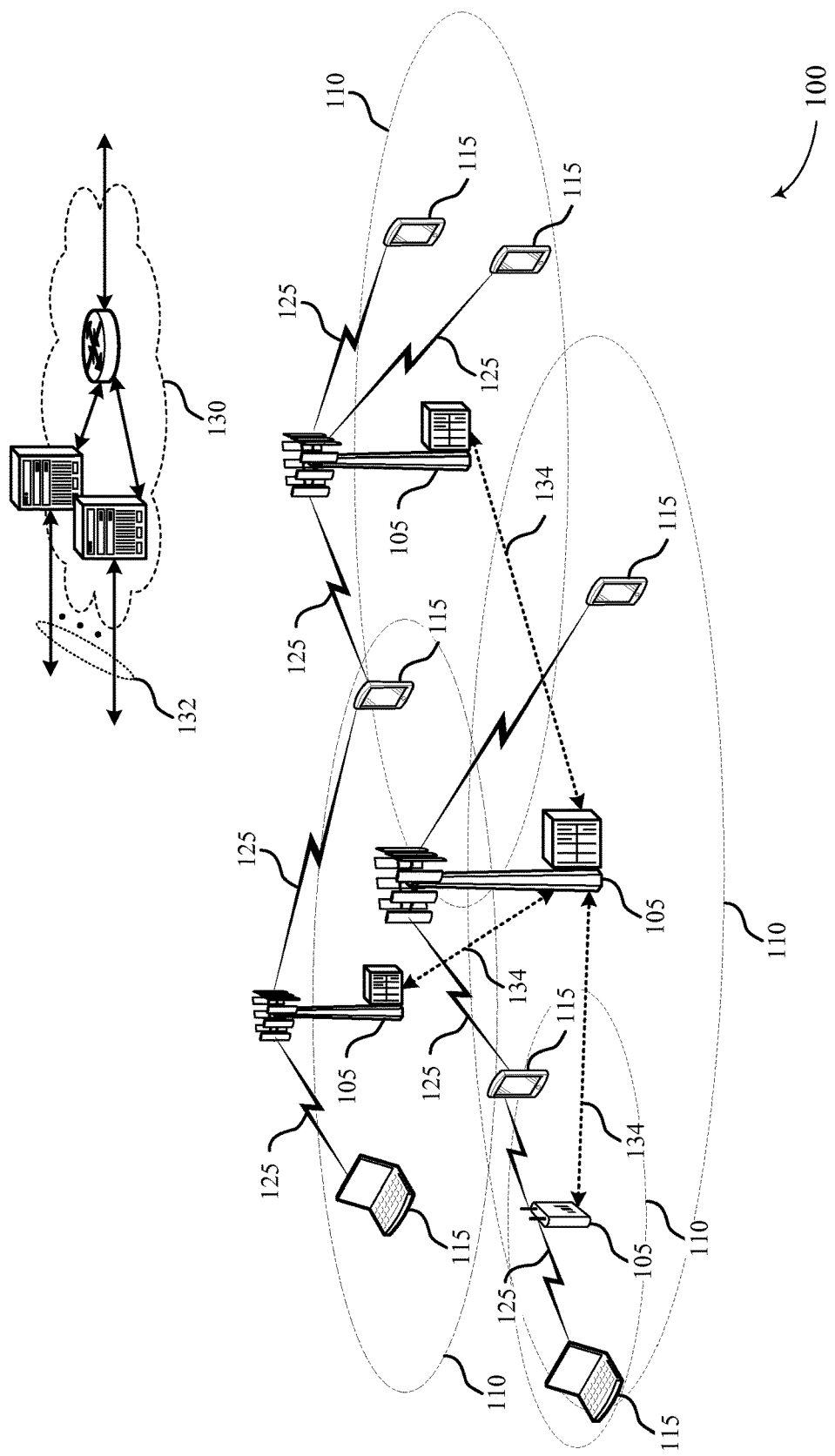
FIG. 1 illustrates an example of a wireless communications system for evolved data compression scheme signaling in accordance with various aspects of the present disclosure.

The described features generally relate to improved systems, methods, or apparatuses for evolved data compression scheme signaling. In some wireless communication schemes, such as in a high speed packet access (HSPA) system, data compression may be used to increase bandwidth. Data compression may include header compression, payload compression, or both. The compression of data may happen at various layers within a communication system, including the packet data convergence protocol layer (PDCP). Additionally, the compression of data may be performed at base stations as well as user equipments (UEs). In some instances, the compression of packet headers and payloads may be based on previously transmitted packets. A wireless system which employs data compression may experience increased system capacity (e.g., by accommodating higher bandwidth and increased number of uses), faster data exchange (e.g., quicker web page downloads), improved call setup (e.g., during cell edge scenarios for session initiation protocol (SIP) procedures), and UE transmit power benefits.

In some examples, a wireless communication system may use an extended data compression header with fields to convey information about the header, compression, packet, etc. In some cases the extended header may include fields to convey the presence of a header extension (e.g., an Extension field), information regarding the data compression (e.g., an Option field), and information regarding the length of header fields (e.g., a Value field). Using these or other fields, the extended header may convey various information to a base station or UE, such as data compression context information (e.g., the Option field may indicate that the data compression context was reset by the transmitter).

An extended header may be used in conjunction with a compression capabilities message sent between a transmitter and a receiver. A compression capabilities message may be compressed or uncompressed. In some cases, the message may convey information pertaining to the compression rate supported by a device, or the compression context prefill configuration. A compression configuration message may convey a PDCP control protocol data unit (PDU) for exchanging compression states (e.g., the message may convey PDCP SN and ciphering support, or indicate a new PDCP control PDU type). In some cases, a compression configuration message may include a PDCP control PDU for compression out of sync (OOS) or flow control (e.g., the message may indicate the maximum number of bytes to compress, a 1-in-n packet compression ratio, or a reset request to a particular context ID). A compression configuration message may save compression context across a radio resource control (RRC) connection, enable or disable compression, and/or handle the PDCP discard timer.

For example, a base station and a UE may communicate information regarding compression capabilities or configurations. The base station may transmit a message to the UE requesting indication of the UE to engage in extended capability communications (e.g., the base station may send an extended UE capabilities request). In aspects, information regarding compression capabilities or configurations may be included in such extended capability communications. In one example, a base station may signal a UE to determine if the UE is compatible with a certain compression configuration. The UE may respond to the request by sharing all the configurations which the UE supports and which are possible for communication with the base station. The UE may share this information with the base station via a message which includes uplink algorithm information, downlink algorithm information, the compression rate supported by the UE, the compressor context memory size, and/or the prefill configuration for the compressor context memory.

The base station may use the information conveyed by the message to request the UE to use a particular configuration for compression. The base station may convey the request using a message that includes fields for indicating the number of radio bearers (e.g., DRBs) which are configured, the resource block ID, the algorithm version and supported compression rate, the compressor context memory size, and/or the prefill configuration for the compressor context memory. The UE may acknowledge the configuration request from the base station by sending a message carrying the confirmation for the request. Next, the UE may send a message indicating to the base station whether the compression is enabled for PDCP PDUs following the indication (e.g., a modified PDCP control PDU may carry the compression status indication). The message may include fields for data, control, PDU type, and/or a field which aids in the re-transmission of control PDUs during handover. The receiver may receive the request from the transmitter and send an acknowledgment indicating that a particular context ID has been saved.

In some cases, a data compression scheme (e.g., an evolved data compression scheme (eDCS) or uplink data compression (UDC)) may be used in a wireless compression network to compress various portions of a data packet, including headers, such as transmission control protocol (TCP)/Internet Protocol (IP) headers, session initiation protocol (SIP) data, portions of data payloads, or combinations of the same. By using a data compression scheme (e.g., eDCS or UDC) to compress all or portions of data packets transferred in a wireless communication network, congestion in the network may be reduced. For example, using a data compression scheme may allow for an increase in system capacity as it relates to the number of devices using the wireless communication network. The use of a data compression scheme may accommodate higher bandwidth and an increase in the number of users of the wireless communication network. Benefits may also include quicker downloads, such as web page downloads. The use of a data compression scheme may potentially improve call setup at the edges of cellular coverage using SIP procedures. These benefits may result in more efficient power use by the participating entities.

An eDCS functions by allowing both parties of a communication session (for example, a UE and a base station), to use a same compression context. The compression context, and other compression-related options, may be communicated between the participating entities via a compression header, which may be applied to the beginning of a data packet. The compression header may include a compression scheme portion that identifies various compression options, such as the compression context. The compression scheme portion may also identify the portions of the data packet to which the compression context is applied.

The following description of the figures provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may include a packet data convergence protocol (PDCP) layer at a UE 115 and at a base station 105. The PDCP layer may be responsible for header compression and decompression of internet protocol (IP) data flows using the robust header compression (ROHC) protocol, transfer of data (user plane or control plane), maintenance of PDCP sequence numbers SNs, and in-sequence delivery of upper layer PDUs to lower layers. The PDCP layer may also manage elimination of duplicate packets, ciphering and deciphering of user plane data and control plane data, integrity protection and integrity verification of control plane data, and packet discard based on a timer-out timer. According to the present disclosure, the PDCP layer may be responsible for data compression.

Wireless communications system 100 may also include an RLC layer that connects higher layers (e.g., RRC and PDCP) to the lower layers (e.g., the MAC layer). An RLC entity in a base station 105 or a UE 115 may ensure that transmission packets are organized into appropriately sized blocks (corresponding to the MAC layer transport block size). If an incoming data packet (e.g., a PDCP or RRC service data unit (SDU)) is too big for transmission, the RLC layer may segment it into several smaller RLC protocol data unit (PDUs). If the incoming packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDU's have been received and the receiver may respond with a Status Report. Unlike the MAC layer HARQ, RLC automatic repeat request (ARQ) may not include a forward error correction function.

An RLC entity may operate in one of three modes. In acknowledged mode (AM), unacknowledged mode (UM) and TM. In AM, the RLC entity may perform segmentation/concatenation and ARQ. This mode may be appropriate for delay tolerant or error sensitive transmissions. In UM, the RLC entity may perform segmentation/concatenation but not ARQ. This may be appropriate for delay sensitive or error tolerant traffic (e.g., voice over Long Term evolution (VoLTE)). Transparent mode (TM) only performs data buffering, and does not include either concatenation/segmentation or ARQ. TM may be used primarily for sending broadcast control information (e.g., the master information block (MIB) and system information block (SIBs)), paging messages, and RRC connection messages. Some transmissions may be sent without RLC (e.g, a random access channel (RACH) preamble and response).

Thus, in some examples, a wireless device such as a UE 115 may receive a transmission from another wireless device such as a base station 105 requesting information about support for data compression. The UE 115 may determine parameters related to the types of supported data compression and communicate the information to the base station 105. In some cases, the UE 115 may then receive a message from the base station 105 that requests establishment of a data compression configuration. The UE 115 may respond with confirmation or rejection of the proposed compression configuration. If the configuration is confirmed, the UE 115 and the base station 105 may exchange compressed data packets according to the configuration. The devices may also exchange status and control information related to the compression configuration (e.g., in a compression header of a compressed message). A UE 115 communicating with a base station 105 is one implementation of the present disclosure, but other implementations are possible. For example, two UEs 115 may communicate with each other using the methods described herein.

The communications between the UEs 115 and the base stations 105 may include the transmission of data packets. In an eDCS context, the transferred data packets may include a compression header which may indicate to the receiver how compression is to be applied to the data packet. The compression header may, for example, indicate that portions of the transmitted data packet are to be compressed, or the compression header may indicate that the entirety of the transmitted data packet is to be compressed. The compression header may not only indicate which portions of the data packet are to be compressed, but which compression context is to be applied to each portion. A compression context is applied by a transmitter in order to compress a portion of a data packet, and is also applied by a receiver in order to decompress the portion of the data packet. Thus, both the transmitters and receivers may be described as being in sync or synchronized when both the transmitters and receivers are applying the same compression context. Additional details are further explained below.

Figure 2:
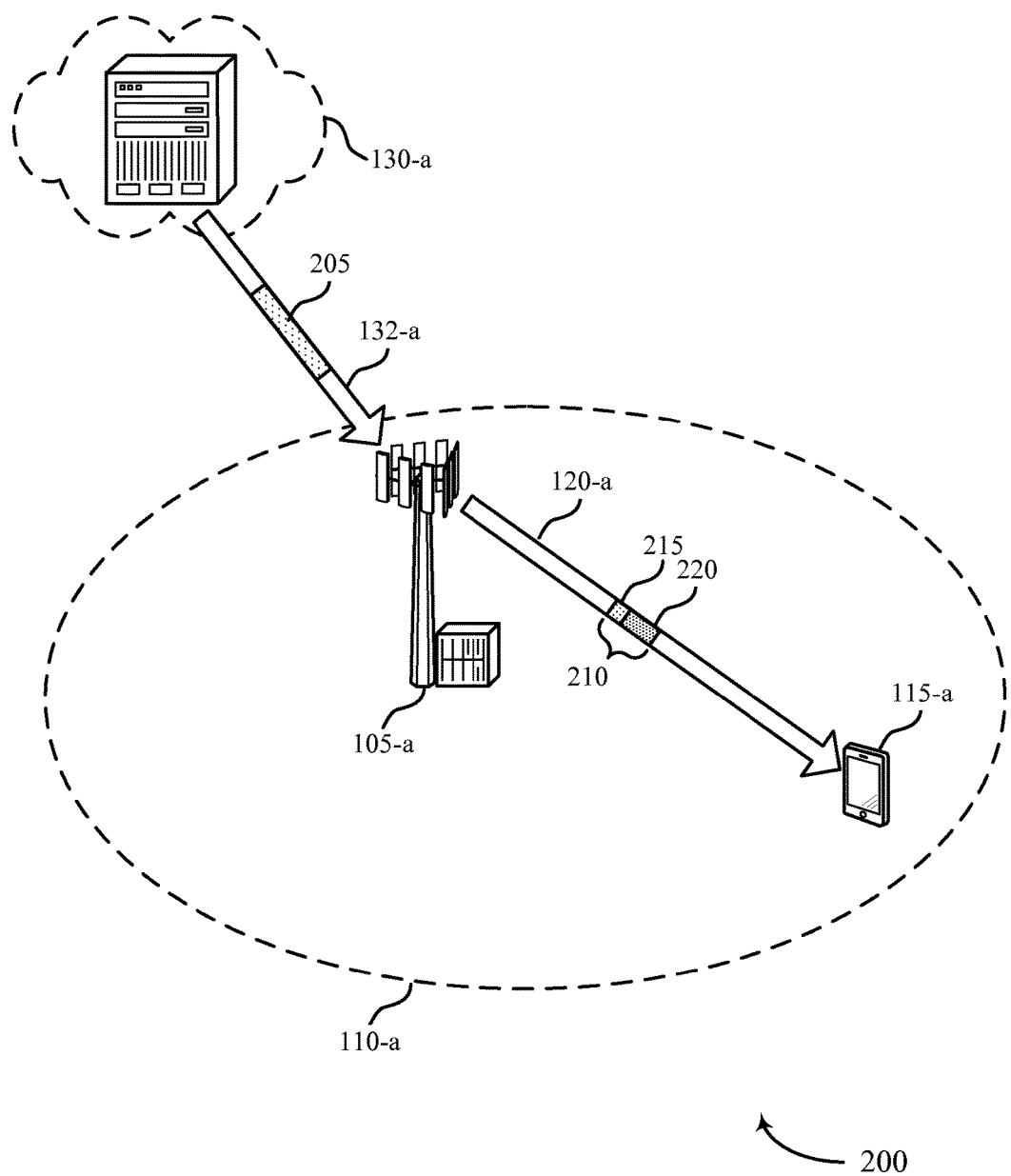
FIG. 2 illustrates an example of a wireless communications subsystem for evolved data compression scheme signaling in accordance with various aspects of the present disclosure.

FIG. 2 illustrates an example of a wireless communications subsystem 200 for evolved data compression scheme signaling in accordance with various aspects of the present disclosure. Wireless communications subsystem 200 may include UE 115-a, which may be an example of a UE 115 described with reference to FIG. 1. Wireless communications subsystem 200 may also include a base station 105-a, which may be an example of a base station 105 described above with reference to FIG. 1. Base station 105-a may communicate with core network 130-a via backhaul link 132-a, such as described with reference to FIG. 1. Additionally, base station 105-a may communicate with any UE 115 within its coverage area 110-a via communication link 120. Communication link 120-a may allow for bidirectional communication between a UE 115-a and a base station 105-a as generally described with respect to FIG. 1. For instance, a base station 105 may transmit control and data information to a UE 115 using time and frequency resources.

Base station 105-a may receive one or more internet protocol (IP) packets 205 from core network 130-a. The IP packets may be packaged in service data units (SDUs) and may convey data to a base station 105-a. At base station 105-a, the packet data convergence protocol (PDCP) layer may add headers to the one or more IP packets 205 to generate one or more PDCP protocol data units (PDU) 210. PDCP PDU 210 may include a header 215 followed by a payload 220. The header 215 may be an extended header, which may include information about the message format, transmitter, and/or communication scheme. In some cases, the PDCP layer may implement data compression for PDCP PDU 210 to increase the amount of data that may be sent using limited resources. The PDCP layer may compress the header 215, the payload 220, or both. The compression may reduce the resources used to convey the information of IP packet 205 from base station 105-a to UE 115-a (e.g., the size of PDCP PDU 210 may be smaller than the size of the corresponding IP packet 205 even if they convey the same data). This may be accomplished by including references in PDCP PDU 210 to one or more matching bit sequences in previous packets rather than including the bit sequences themselves.

At base station 105-a, the IP packet 205 may be processed by additional layers after PDCP compression. For example, the radio link control (RLC) layer may receive the compressed PDCP PDUs 210 from the PDCP layer, segment the PDCP PDUs 210, add headers, and submit the RLC packets to the medium access control (MAC) layer. The MAC layer may attach bit padding and additional header information to the packet before transmitting the data over the physical layer (e.g., using waveforms in the time and frequency domains). In some cases one wireless device (e.g., base station 105) in communication with another wireless device (e.g., UE 115-a) may retain context related to a compression capability and/or configuration. The information may be used by the retaining device to facilitate future communications.

Prior to initiating transmissions using a data compression scheme, base station 105-a may communicate with UE 115-a to determine if UE 115-a supports extended data compression capabilities. Furthermore, base station 105-a may communicate with UE 115-a to determine which compression configurations UE 115-a supports. Thus, base station 105-a may use a compression configuration to communicate with UE 115-a based on compression capability information obtained from UE 115-a. After a compression configuration is established, the devices may exchange status and/or control information using fields in an extended compression header of the exchanged packets, or using dedicated status and/or control messages.

In some cases one wireless device (e.g., base station 105-a) in communication with another wireless device (e.g., UE 115-a) may retain a compression context related to a compression capability or configuration. The information may be used by the retaining device to facilitate future communications.

Figures 3A, 3B:
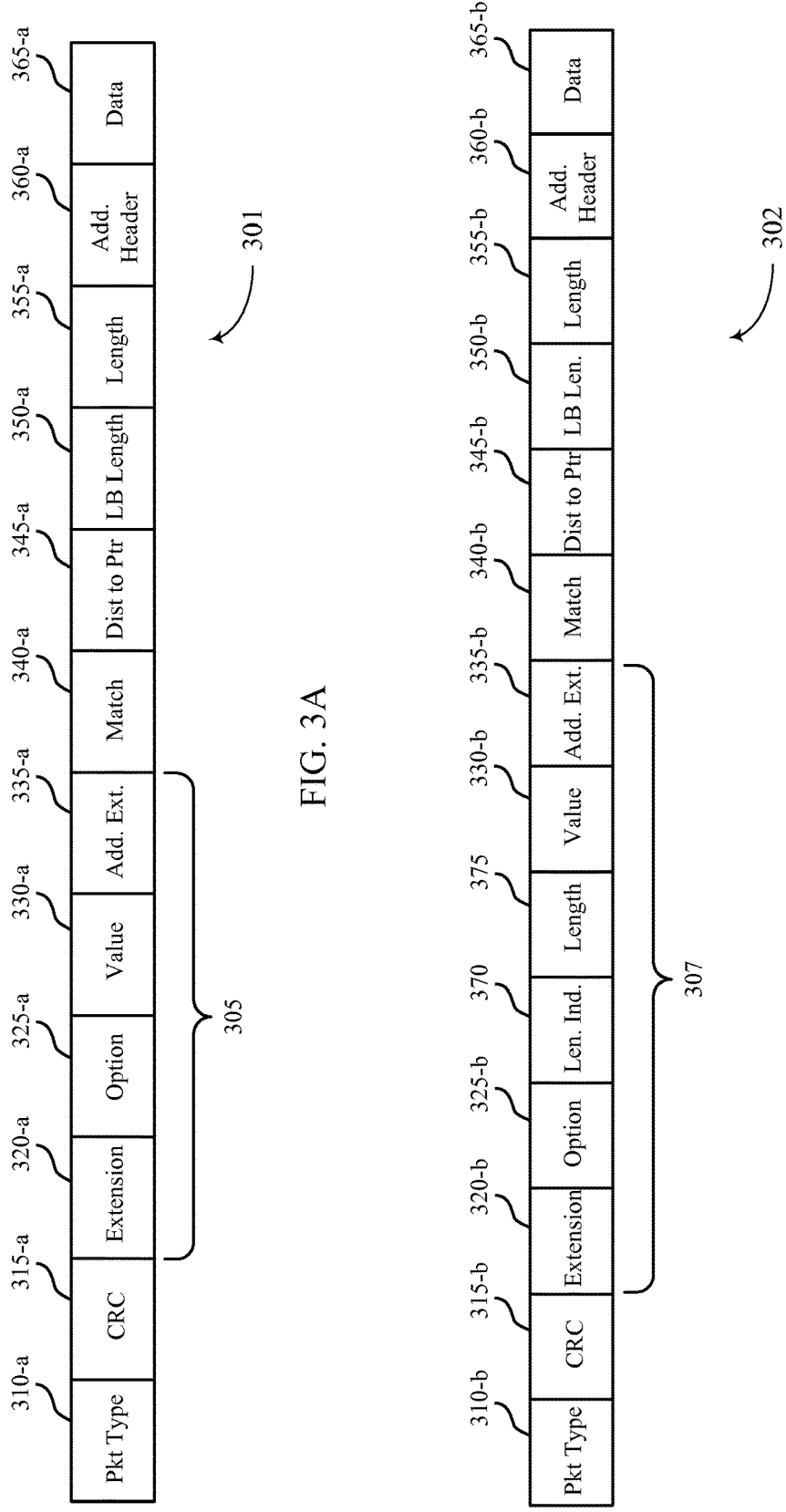
FIG. 3A illustrates an example of an extended compression header associated with data for evolved data compression scheme signaling in accordance with various aspects of the present disclosure.
FIG. 3B illustrates another example of an extended compression header associated with data for evolved data compression scheme signaling in accordance with various aspects of the present disclosure.

FIG. 3A illustrates an example of an extended compression header 301 in accordance with various aspects of the present disclosure. In some cases, the extended compression header 301 may be used for transmissions between a UE 115 and a base station 105, which may be examples of a UE 115 and a base station 105 described with reference to FIG. 1. In other cases, the extended compression may be used for communications between other wireless devices (e.g., between two UEs 115). The extended compression header 301 may itself be compressed or un-compressed, and may precede a payload that is either compressed or uncompressed. The extended compression header 301 may include fields for conveying information regarding compression scheme, context ID, and/or the presence or absence of additional header extension fields. Although the fields of extended compression header 301 are shown in a particular order, the fields may be arranged in alternate configurations. Additionally, some of the fields may be absent (e.g., only a portion of the fields may be included in a header extension).

The extended compression header 301 may be transmitted from one wireless device to another and may be used to convey data, as well as control information which the receiving wireless device may use to configure itself to facilitate proper reception of communications from the transmitting device. The control information may be carried in fields (e.g., in the extended header 305) and may be any length. For example, the extended compression header 301 may include a packet type (Pkt Type) field 310-a which may indicate whether or not compression has been enabled. Packet type field 310-a may be followed by a cyclic redundancy check (CRC) field 315-*a*, which may be used to detect errors in the extended compression header 301. Additionally, extended compression header 301 may include an extension field 320-*a*, which may indicate the absence or presence of the header extension 305.

The extended compression header 301 may include an option field 325-*a*, which may be used to convey information about context ID and various compression factors. For example, the option field 325-*a* may indicate to a receiver that the transmitter has reset the data compression context for that receiver. Additionally, the option field 325-*a* may convey a request to a receiver to check-point a data compression context. In some cases, the option field 325-*a* may indicate that the receiver should "freeze" to a given context ID for the next "n" number of packets (e.g., the receiver should continue to use the same context ID for the "n" packets following extended compression header 301). The option field 325-*a* may be used to indicate when compression is disabled for a number of bits following the field. In some instance, the option field 325-*a* may be used to support compressed payloads using multiple context IDs (e.g., the option field 325-*a* may indicate whether a particular context ID should be used by the receiver for the entirety of the payload, or just a portion). Additionally, the option field 325-*a* may support compression for payloads without compression meta data (e.g., the option field 325-*a* may indicate that meta data is absent from the packet).

The extended compression header 301 may include a value field 330-*a*, which may convey context ID and/or the number of packets to which the option field 325-*a* applies. For example, if the value field 330-*a* carries a value of 8, and the option field 325-*a* indicates that a context "freeze" should be enabled for the next "n" packets, the receiving entity may use the same context for the next 8 packets, as indicated by the value field 330-*a*. The extended compression header 301 may also include an additional extension field 335-*a* and a match field 340-*a*. Extended compression header 301 may include a distance to pointer field (Dist to Ptr) 345-*a*, an LB length field 350-*a*, and/or a length field 355-*a*. Extended compression header 301 may further include a data field 360-*a*, which may convey additional meta data (e.g., data which describes other data in the extended compression header 301) to the receiver.

Extended compression header 301 may be used in conjunction with a compression capabilities message which is sent between a transmitter and a receiver (e.g., between a UE 115 and a base station 105). A compression capabilities message may be compressed or uncompressed. In some cases, a compression capabilities message may convey information pertaining to the compression rate supported by the transmitting device, or the compression context prefill configuration. Additionally, a compression configuration message may convey PDCP control PDU for exchanging compression states (e.g., the message may convey PDCP sequence number (SN), ciphering support, and/or indicate a new PDCP control PDU type). In some cases, a compression configuration message may include PDCP control PDU for compression out of sync/flow control (e.g., the message may indicate the maximum number of bytes to compress, 1-in-n packet compression, and/or reset the compressor to a particular context ID). A compression configuration message may also save compression context across a radio resource control (RRC) connection, enable compression, disable compression, and/or handle a PDCP discard timer.

In some cases, the compression configuration message may indicate whether a UE supports buffer transfer for PDCP re-establishment (e.g., handover and RRC re-establishment upon radio link failure (RLF)). In the case where it is indicated that the UE supports buffer transfer, following PDCP re-establishment the UE may retain the previously transmitted buffer context and compressed PDUs. If the indication is absent, the UE may not support buffer transfer across re-establishment of PDCP. In such cases, the base station may reset the UDC context and discard the received compressed packets according to a previous context. In some cases, buffer transfer may refer to the transfer of a compression buffer from a source base station to target base station during handover/re-establishment. In some examples, an indication may provide the maximum number of data bearers for which compression is supported.

A compression configuration message may also indicate a header length and diagnostic parameters. For example, a header length to be compressed (e.g., in multiples of 20 bytes) may be indicated when header-only compression may be used. In some cases, checksum source bytes may be indicated, such as the bit string of bytes from uplink compression memory on which a checksum was computed. For example, when a checksum is computed and fails to match the checksum in a header, the corresponding source bytes from the uplink compression memory that were used to compute the checksum may be sent to the UE along with a reset indication. Additionally or alternatively, a PDCP sequence number may be indicated, such as a PDCP sequence number that failed a checksum caused a reset. For example, when a header checksum is computed and fails to match the checksum in the header, the corresponding PDCP sequence number may be sent to the UE along with the reset indication.

In some cases, compressed packets may rely on the uplink compression memory for decompression and therefore uplink compression memory at a transmitter and/or a receiver should be synchronized in order to properly compress/decompress packets. Cyclical redundancy check (CRC) field in packet header may be used to detect errors (e.g., synchronization errors) in the packet transmission by a validation process at the receiver. If any errors are detected in the transmission of the packet, uplink compression memory at the transmitter and/or the receiver may be reset to be synchronized. Therefore, a transmitter may need to indicate to the receiver to reset the uplink compression memory before processing a packet. In an example, the packet type field 310-*a* may indicate various decompression options (e.g., whether to reset the uplink compression memory) to a receiver to process a packet. The packet type field 310-*a* may include a plurality of bits (e.g., 3 bits) to indicate various decompression options to a receiver.

In another example, compression/decompression operations may be a large load on the central processing unit (CPU). In order to reduce a load of the CPU, one or more steps (e.g., adding a packet to the uplink compression memory) of compression/decompression operations may be skipped. Also to reduce a load of the CPU, one or more steps of compression/decompression operations may be selectively performed. For example, uplink compression memory may be selectively updated. Therefore, a transmitter may need to indicate to the receiver one or more steps of compression/decompression operations to be selectively performed.

For example, the packet type field 310-*a* may indicate a full packet compression/decompression option. The full packet compression/decompression option may include adding an entire packet to a memory (e.g., uplink compression memory) and performing a decompression of the packet as indicated by a number of matches and pointer metadata fields. In another example, the packet type field 310-*a* may indicate a header compression/decompression option. For example, the header compression/decompression option may include adding a header of a packet to a memory (e.g., uplink compression memory) and performing a decompression of the header as indicated by a number of matches and pointer metadata fields. The packet type field 310-*a* may indicate a compression attempted but no matches found compression/decompression option. For example, the compression attempted but no matches found compression/decompression option may include adding an entire packet to a memory (e.g., uplink compression memory), however, the number of matches and pointer of metadata fields may not be included in the compressed packet.

The packet type field 310-*a* may indicate a no compression compression/decompression option. For example, the no compression compression/decompression option may include not adding a packet to a memory (e.g., uplink compression memory) and the number of matches and pointer of metadata fields may not be present in the compressed packet. The packet type field 310 may indicate a compression performed but no memory update compression/decompression option. For example, the compression performed but no memory update compression/decompression option may include not adding a packet to a memory (e.g., uplink compression memory) and performing a decompression as indicated by a number of matches and pointer metadata fields. The packet type field 310-*a* may indicate a reset compression/decompression option. For example, the reset compression/decompression option may include resetting a memory (e.g., resetting uplink compression memory to all zeros), adding an entire packet to the memory (e.g., uplink compression memory) and number of matches and pointer metadata fields may not be present in the compressed packet.

If a header extension 305 is included, the extended compression header 301 may also include an option field 325-*a*. A corresponding value field 330-*a* may include values corresponding to the options included in the option field 325-*a*. The option field 325-*a* may be used to convey information relating to various compression-related options. The conveyed information may relate to specific actions that the receiver of the extended compression header 301 may take, or may provide details regarding how compression is to be or has been applied to a data packet. A number of different options may be conveyed.

For example, the option field 325-*a* may be used to convey a compression option that may reset a compression context. For example, the transmitter may use the option field 325-*a* to convey to a receiver a compression option of resetting a compression context. Thus, a receiver will know that it should also reset its compression context to match the compression context used by the transmitter. In this example, the value field 330-*a* may include the compression context identification (ID) which corresponds to the desired compression context. This example may be beneficial when the receiver and the transmitter are out of sync with each other. For example, insufficient bandwidth or slow data communication rates could result in a receiver lagging behind the transmitter and even dropping data packets in order to catch up. In this example, it is possible that the receiver and the transmitter may become out of sync, such that the receiver begins to apply an incorrect compression context to received data packets. This may result in significant decompression failure rates. Therefore, the receiver may request that the transmitter reset its compression context, through, for example, a compression control request. When the transmitter resets its compression context, the transmitter may use the option field 325-*a* and the value field 330-*a* to convey to the receiver the reset compression context. Similarly, resetting a compression context may be useful when a transmitter, for example, is in a handover situation, where the receiver may be changed.

The option field 325-*a* may be used to convey a compression option that may disable the compression header for a number of data packets. For example, the option field 325-*a* may be used to indicate that the compression header will be disabled for the next "n" data packets, where "n" is an integer number greater than zero. Thus, in order to avoid entering an out of sync situation that might arise because of bandwidth congestion, a receiver may inform a transmitter to temporarily stop transmitting the compression header with the next "n" data packets. In this example, the transmitter and the receiver may continue applying an existing compression scheme until the "n" data packets have been transmitted, at which time the transmitter will resume transmission of the compression header with the corresponding data packets. In this example, the value field 330-*a* may include the value of "n."

The option field 325-*a* may be used to convey a compression option that may request an entity of the communication to check a compression context. For example, the option field 325-*a* may be used by a transmitter to request that a receiver store a compression context. When both the receiver and the transmitter store a same compression context, the receiver and the transmitter and enabled to reuse that compression context in the future. Thus, if the communication between a receiver and a transmitter is paused, the communication may resume with each entity (e.g., the transmitter or receiver) using the stored compression context, meaning that the entities need not revert to an out-of-date compression context. Similarly, when the transmitter and the receiver reset their compression contexts, the transmitter and the receiver may reset to the stored compression context. Storage of a compression context may occur as frequently as a check point option is received in the option field 325-*a*. When a check point option is received in the option field 325, the value field 330-*a* may include a compression context ID corresponding to the desired compression context to be stored.

The option field 325-*a* may be used to convey a compression context for a number of data packets. For example, the option field 325-*a* may be used to request using a compression context for the next "n" data packets. Thus, the receiver and transmitter may understand that the next "n" data packets will maintain the same compression context without change. The value field 330-*a* may indicate the value of "n." The compression option may be especially beneficial when used for SIP template compression and during Wi-Fi use.

The option field 325-*a* may be used to convey a compression option that may indicate that a compression context is to be used for one or more portions of a data packet. For example, the option field 325-*a* may be used to indicate that piecewise compression is an option, and the corresponding value field 330-*a* may indicate a compression context ID to be applied to a specific portion of the data packet. The value field 330-*a* may also include a length value to indicate the specific portion of the data packet to which the compression context ID is to be applied. This may be particularly useful when different compression contexts are desired to be applied to different portions of a data packet. For example, a first compression context may be applied to a TCP/IP header while a second compression context may be applied to an SIP data. The applied compression context and the part of the data packet to which it is applied may be defined in the value field 330-*a*.

Alternatively, the option field 325-*a* may be used to convey a compression option that may indicate that a compression context is to be used for an end or remaining portion of a data packet. For example, the option field 325-*a* may be used to indicate that a compression context is to be applied to the last half or last portion of a data packet. This example may apply when an entire data packet is to be compressed using a same compression context, or when a first compression context has been applied to a first portion of the data packet and the remainder of the data packet is to be compressed using a second compression context. In this example, the value field 330-*a* may include the desired compression context ID, but need not include a length indicator.

In an additional example, the option field 325-*a* may be used to convey a compression option that may disable the inclusion of compression header metadata in the extended compression header 301. For example, the option field 325-*a* may be used to indicate that no compression header metadata is to be transmitted. As described below, additional fields in the extended compression header 301 may include compression header metadata. However, it may not be necessary to convey all of the compression header metadata with each extended compression header 301. Thus, in this example, the option field 325-*a* may indicate that compression header metadata is not included in the extended compression header 301. The corresponding value field 330-*a* may include the compression context ID to be applied, even in the absence of compression header metadata.

The extended compression header 301 may include more than one option field 325-*a* and value field 330-*a*. Thus, and for example, if a compression context is to be applied to a first portion of the data packet, and a different compression context is to be applied to a second portion of the data packet, the extended compression header 301 may include two option fields 325-*a* and two corresponding value fields 330-*a*. Each option field 325-*a* and value field 330-*a* combination is marked by an extension field, such as extension field 320-*a*. Thus, the extended compression header 301 may include one or more additional extension fields 335-*a*.

A match field 340-*a*, a distance to pointer field 345-*a*, an look back (LB) length field 350-*a* and a length field 355-*a* may also be included after the one or more extension fields. Of these, the distance to pointer field 345-*a*, the LB length field 350-*a* and the length field 355-*a* may include compression header metadata. As explained above, the compression header metadata may be excluded from some extended compression headers 301, as determined by the option field 325-*a* of the header extension 305.

The extended compression header 301 may include additional headers, as indicated by the additional header field 360-*a*, and may also be followed by additional metadata 365-*a*. The extended compression header 301 is just one example of an extended compression header that may be used to convey compression-related options to a receiver. Other examples may also be used.

FIG. 3B illustrates another example of an extended compression header 302 in accordance with various aspects of the present disclosure. In some cases, the extended compression header 302 may be used for transmissions between a UE 115 and a base station 105, which may be examples of a UE 115 and a base station 105 described with reference to FIG. 1. In other cases, the extended compression may be used for communications between other wireless devices (e.g., between two UEs 115). The extended compression header 302 may itself be compressed or un-compressed, and may precede a payload that is either compressed or uncompressed. The extended compression header 302 may include fields for conveying information regarding compression scheme, context ID, and/or the presence or absence of additional header extension fields as described in relation to FIG. 3A. Additionally, the extended compression header 302 may include fields for conveying information pertaining to payload length and/or compression.

For example, the extended compression header 302 may include a length indicator (Len. Ind) field 370. The length indicator field 370 may be used by the transmitting entity to indicate whether a compression context should be applied to only a specific portion of a data packet or to the remainder of the data packet or to convey the length of a payload (e.g., the length indicator field 370 may indicate the length for the payload following the header). The extended compression header 302 may also include a length field 375, which may indicate a length of the specific portion of the data packet which has been compressed using a particular context ID (e.g., the context ID conveyed by the value field 330-*b*. A base station 105 or UE 115 may send a message using either extended compression header 301, extended compression header 302, or an extended compression header which includes any arrangement of the fields included in extended compression headers 301 and/or 302.

In some cases, an initial packet may be transmitted using a different header configuration than subsequent packets. For example, subsequent packets may exclude the Option field 325-*b*, the length indicator field 370, the length field 375, the Value field 330-*b*, and/or the additional extension field 335-*b*. Subsequent packets with a reduced header may also be used with extended compression header 301. The header values of extended compression header 301 or 302 may be used in conjunction with a session initiation protocol (SIP) and with encryption methods. In some cases only the dynamic parts of extended compression header 301 or 302 (e.g., the field values) are compressed. In other cases, both the static and the dynamic parts of extended compression header 301 or 302 are compressed. In yet other cases, only the static parts may be compressed.

In some cases, the extended compression header 302 may include a different header extension 307, as indicated by the extension field 320-*b*. The extended compression header 302 may include an option field 325-*b*, a corresponding value field 330-*b*, a length indicator field 370, and a length field 375. The option field 325-*b* and the value field 330-*b* of the header extension 307 may be used in essentially the same way as the option field 325-*a* and the value field 330-*a* of the header extension 305. However, where the header extension 305 may have included length information in its value field 330-*a*, the header extension 307 may instead include length information in a separate length field 375.

For example, the length indicator field 370 may indicate whether a compression context ID included in the value field 330-*a* should be applied to the remainder of the data packet's payload or to just a portion of the payload. If the length indicator field 370 indicates that a compression context ID should be applied to only a portion of the data packet, then the length field 375 may indicate the length of the portion to which the compression context ID should be applied.

As with the extended compression header 301, the extended compression header 302 may include an additional extension field 335-*b* to indicate that additional header extensions 307 may be included in the extended compression header 302.

Figure 4:
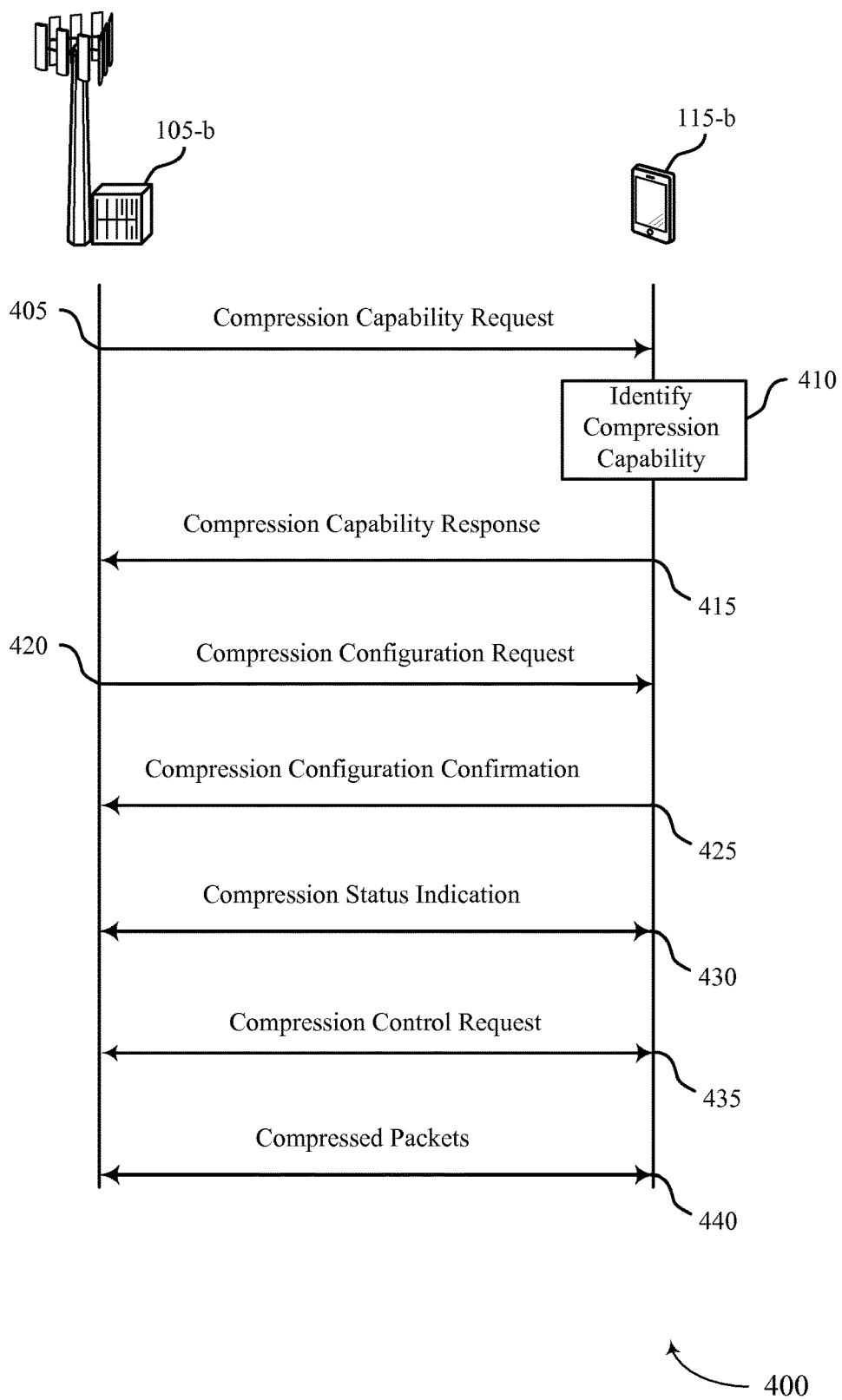
FIG. 4 illustrates an example of a process flow for evolved data compression scheme signaling in accordance with various aspects of the present disclosure.

FIG. 4 illustrates an example of a process flow 400 for evolved data compression scheme signaling in accordance with various aspects of the present disclosure. Process flow 400 may be used by a UE 115-*b* and a base station 105-*b*, which may be examples of a UE 115 and a base station 105 described with reference to FIG. 1. Process flow 400 may also be used by wireless devices other than those depicted in FIG. 4. Process flow 400 may use messages with extended compression headers such as described with reference to FIGS. 3A and/or 3B. Prior to initiating transmissions based on the data compression scheme, base station 105-*b* may communicate with UE 115-*b* to determine if UE 115-*b* supports extended data compression capabilities. For example, base station 105-*b* may send a message via a signaling radio bearer (e.g., attached to an RRC security mode PDU) to determine whether UE 115-*b* is capable of supporting an extended signaling (e.g., an extended data compression) radio bearer (e.g., a Q2X bearer). Using the established radio bearer, base station 105-*b* may communicate with UE 115-*b* to determine which compression configurations may be supported. Base station 105-*b* may use compression information from UE 115-*b* to select a compression configuration. Finally, base station 105-*b* may request UE 115-*b* to use said selected compression configuration.

At step 405, UE 115-*b* may receive a compression capability request from base station 105-*b* related to a capability for compressing a payload of a wireless data transmission. In some cases, base station 105-*b* may transmit a message to UE 115-*b* requesting an indication of the ability of UE 115-*b* to engage in extended capability communications (e.g., base station 105-*b* may send an extended UE capabilities request). Additionally, the compression capability request may direct UE 115-*b* to indicate which compression configurations UE 115-*b* supports. For example, base station 105-*b* may signal UE 115-*b* to determine whether UE 115-*a* is compatible with a certain compression configuration.

At step 410, UE 115-*b* may identify at least one compression capability parameter based on the compression capability request. In some examples the capability parameter relates to a compression rate support parameter or a compression context prefill configuration.

At step 415, UE 115-*b* may transmit a compression capability response to base station 105-*b* based at least in part on the compression capability request and the at least one compression capability parameter. For example, UE 115-*b* may respond to the request by sharing the supported configurations of UE 115-*b*. UE 115-*b* may share this information with base station 105-*b* via a message which includes uplink and/or downlink algorithm information, the compression rate supported by UE 115-*a*, the compressor context memory size, and/or the prefill configuration for the compressor context memory. In some cases, UE 115-*b* may receive a compression capability response based at least in part on a compression capability request sent by UE 115-*b*. UE 115-*b* or base station 105-*b* may select a compression configuration based at least in part on the compression capability response.

At step 420, UE 115-*b* may receive a compression configuration request from base station 105-*b*. For example, base station 105-*b* may signal UE 115-*b* requesting UE 115-*b* use a selected compression configuration. In other words, base station 105-*b* may request UE 115-*b* to use a particular configuration for compression. Base station 105-*b* may convey the request using a message that may include fields for indicating the number of data radio bearers (DRBs) which are configured, the radio bearer ID(s), an algorithm version, a supported compression rate, the compressor context memory size, and/or the prefill configuration for the compressor context memory. In some examples, UE 115-*b* may transmit a compression configuration request to base station 105-*b*.

At step 425, UE 115-*b* may transmit a compression configuration confirmation (or rejection) based at least in part on the compression configuration request. In some examples, UE 115-*b* may append the confirmation/rejection message at the end of a packet. In some cases, UE 115-*b* may transmit a compression configuration rejection based at least in part on the nature of the compression configuration request (e.g., UE 115-*b* may not support the requested compression configuration).

At step 430, UE 115-*b* or base station 105-*b* may transmit a compression status indication. In some examples, the compression status indication may include a ciphered PDCP control PDU type, an unciphered PDCP control PDU type, a sequence number, and/or a compression enable/disable indication. For example, UE 115-*b* may send a message indicating to base station 105-*b* whether compression is enabled for the PDCP PDUs following the indication (e.g., a modified PDCP control PDU may carry the compression status indication). The message may include fields for data, control, PDU type, and/or as a field which aids in the re-transmission of control PDUs during handover.

As described above, the compression status indication may include a compression enable/disable indication. In some examples, then, a PDCP control PDU may be used to indicate whether compression is enabled or disabled for data PDUs that may follow the transmission of the compression status indication.

For example, base station 105-*b* may establish a radio bearer with no compression but may later enable compression on that radio bearer. In this instance, a PDCP control PDU indicating that compression is enabled may be transmitted before the first compressed data PDU is transmitted.

In another example, base station 105-*b* may establish a radio bearer with compression but may later disable compression on that radio bearer. In this instance, a PDCP control PDU indicating that compression is disabled may be transmitted after the last compressed data PDU is transmitted.

In yet another example, base station 105-*b* may establish a radio bearer with compression but UE 115-*b* may later disable compression on that radio bearer. In this instance, a PDCP control PDU indicating that compression is disabled may be transmitted after the last compressed data PDU is transmitted.

In another example, base station 105-*b* may establish a radio bearer with compression but UE 115-*b* may later disable compression on that radio bearer, as described above. However, if UE 115-*b* then desires to re-enable compression on that bearer, a PDCP control PDU indicating that compression is enabled may be transmitted before the first compressed data PDU is transmitted.

In aspects, the compression status indication may include a PDCP control PDU type that itself may include an enable/disable indication. When base station 105-*b* establishes a radio bearer with compression in a same configuration message, a PDCP control PDU indicating that compression has been enabled may or may not actually be transmitted. As the radio bearer was established via a same configuration message, a compression status indication may not be needed. Whether the compression status indication is transmitted may be determined by a predetermined implementation, for example.

At step 435, UE 115-*b* or base station 105-*b* may transmit a compression control message (e.g., request). In some examples transmitting the compression control message comprises transmitting the compression control message on a high priority radio bearer (e.g., a radio bearer having higher priority than another radio bearer). For example, if UE 115-*b* is compatible, base station 105-*b* may set up a new DRB. In some examples the compression control message is based at least in part on a determination that an amount of available wireless device processing resources is below a threshold. In some examples the compression control message is based on a determination that the wireless device has failed to decompress or decode a number of packets. In some examples the compression control message comprises at least one of a compression state indication, a compression scope (e.g., compress header, payload, or both header and payload) indication, a data compression threshold, a compression enable/disable indication, a compressed packet ratio, or a context ID reset request.

At step 440, UE 115-*b* and base station 105-*b* may exchange compressed packets based at least in part on the established compression configuration The compressed packets may include one or more extended compression header fields indicating at least one of a compression context reset request, a compression disable request associated with a number of subsequent packets, a compression context synchronization indication, a compression context freeze request, a multi-part compression indicator associated with a plurality of compression contexts, or a compression metadata indicator. UE 115-*b* and base station 105-*b* may store compressed and uncompressed versions of transmitted packets. In such instances, UE 115-*b* may reset a context ID based on the uncompressed version of the packet.

In some examples, UE 115-*b* or base station 105-*b* may transmit a context identification (ID) save confirmation request. The devices may transmit a compression enable request or a compression disable request based at least in part on processing limitation, a traffic type, or a determination that a resource grant volume is sufficient to clear an uncompressed memory buffer during one or more periodic intervals. In some examples the compression capability parameter comprises a compression rate support parameter or a compression context prefill configuration.

In some cases, a receiver such as UE 115-*b* or base station 105-*b* may need to handle out of sync communications. For example, the receiver may fail to decompress received packets (e.g., data compression CRC failure) or may detect invalid PDU contents after decompression. In such cases, the receiver may trigger a reset for the sender via a "reset compressor" field in the compression control message with a desired compression context ID. Additionally or alternatively the receiver may declare a radio link failure (RLF) and establish a fresh data connection. In terms of flow control, if the receiver is running out of memory during decompression, the receiver may request the transmitter to stop compression and/or reduce the number of compressed bytes (e.g., the receiver may use a compression control message field). In such instances, the flow control messages may be sent out-of-band so that they are prioritized over regular DRB messages.

In some cases, the same compressor context may be maintained across RRC connections, which may improve efficiency. During an active data call, a base station and UE may periodically request, via an extended compression PDU header, the peer to back-up the existing compression context. The compression PDU header CRC may serve as one of the unique identifies for the context ID. For a new RRC connection, a base station may send the context ID as part of the compression configuration request. If UE 115-*b* has the same context ID backed-up, the UE 115-*b* may accept that configuration. If UE 115-*b* does not have the same context ID backed-up, the UE 115-*b* may reject the base station configuration, which may trigger the base station to start a fresh extended capability request procedure.

UE 115-*b* may dynamically enable/disable data compression based on various parameters such as available UL resources, grant assignment, UL throughput, grant size and/or grant frequency. For example, is UE 115-*b* is getting grants often enough to clear its uncompressed buffers, the UE may disable data compression. In some cases, UE 115-*b* may select a certain percentage of packets to be compressed. Additionally or alternatively, UE 115-*b* may base compression decisions on traffic type. For example, UE 115-*b* may choose a compression mode based on IP flow header information (e.g., UE 115-*b* may base the compression on a per flow basis using packet header information), flow rate, and/or traffic content.

In some cases, a wireless system may use a PDCP discard timer which indicates to a device when a packet should be dropped (e.g., upon expiry of the timer). Dropping a packet may cause a loss of synchronization between a transmitter and receiver, retransmission of packets, and compression reset. Thus, a UE may disable the PDCP timer for all compressed (e.g., and corresponding uncompressed) PDCP SDUs. In such an instance, the size of the compressed PDCP PDU buffer may be controlled based on the rate at which the discard timer expires. The PDCP PDU may be retransmitted until the packet is delivered or RLF is declared. In an alternative method, the UE may perform compression on the fly (e.g., at the time of transmission). In aspects, in this manner compressed data may not be stored. Thus, the UE may keep the compressor context buffer up-to-date without any compressor context resets. In another example, the UE may maintain 2 queues (e.g., in software (SW)); one for compressed packets and one for un-compressed packets. The UE may reset the compressor when the packets are dropped due to the PDCP discard timer and identify and exchange the last successful compressor context ID. For example, if the "nth" packet is dropped from a compressed queue, then all the compressed packets from the (n+1)th packet in the compressed queue may be dropped and replaced by compressing the (n+1)th and beyond packets from the un-compressed queue using the new compressor context.

Thus, in some examples UE 115-*b* or base station 105-*b* may disable a PDCP discard timer based at least in part on the compression capability request. The devices may receive a compressed packet, wherein the compressed packet is compressed immediately prior to transmission. The devices may reset a compression queue based on an indication that a compressed packet has been dropped. In some cases, the transmitting device may compress a packet based on the determination that the packet is scheduled for immediate transmission (e.g., to avoid complications due to the PDCP discard timer).

Figure 5:
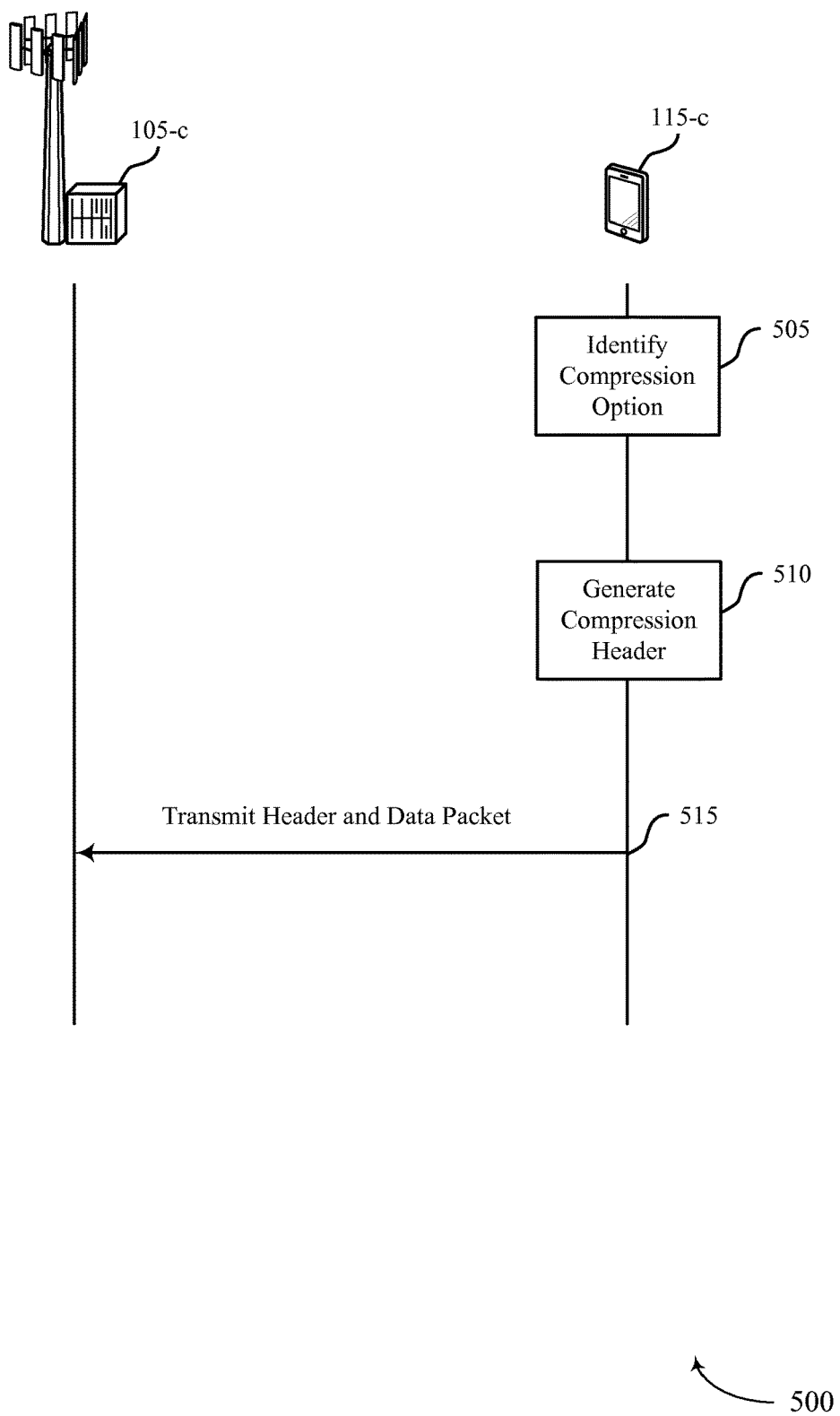
FIG. 5 illustrates an example of a process flow for evolved data compression scheme signaling in accordance with various aspects of the present disclosure.

FIG. 5 illustrates an example of a process flow 500 for evolved data compression scheme signaling in accordance with various aspects of the present disclosure. The process flow 500 may be between a base station 105-*c* and a UE 115-*c*, for example. The base station 105-*c* may be an example of the base station 105 of FIG. 1, while the UE 115-*c* may be an example of the UE 115 of FIG. 1. While the process flow 500 illustrates communication between a base station 105-*c* and a UE 115-*c*, the communications shown need not be limited to the illustrated combination. For example, similar communication flows may exist between two different UEs 115-c, or two different base stations 105-c. Additionally, while the communication flow 400 illustrates a transmission from the UE 115-c to the base station 105-c, the roles may be reversed.

In process flow 500, the UE 115-c first identifies a compression option that is to be applied (at block 510). The compression option may instruct a receiver to reset its compression context, for example. Or, the compression option may include disabling the transmission of the extended compression header for a specified number of data packets. The compression option may be to request that a receiver check point a compression context. Or, the compression option may be to request that a compression context be frozen and used for a specific number of data packets. The compression option may indicate that a compression context is to be applied to a portion of a data packet, or even to the remaining portion of a data packet. Additionally, the compression option may indicate that an extended compression header will include no compression header metadata.

Once the UE 115-c identifies a compression option, the UE 115-c may generate an extended compression header in which to include the identified compression option (at block 510). As the UE 115-c may identify more than one compression option, the UE 115-c may include multiple compression options in a single extended compression header (in, for example, different header extensions). Once the extended compression header has been generated, the UE 115-c may append the extended compression header to a data packet and transmit the combined extended compression header and data packet to the base station 105-c. The base station 105-c then receives the combined extended compression header and data packet and applies the compression options included in the extended compression header.

As explained above, while the example illustrated in FIG. 5 is specific to a transmission from a UE 115-c to a base station 105-c, the concepts illustrated may be applied to any wireless communication between a transmitter and a receiver.

Figure 6A:
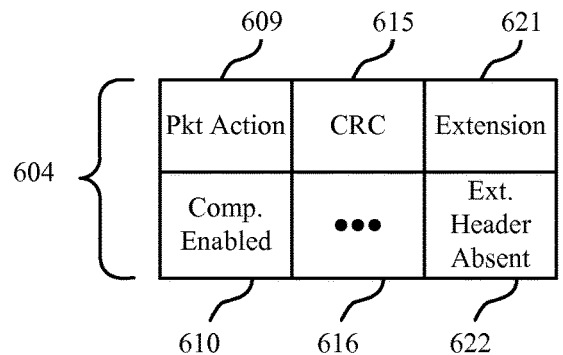
FIG. 6A, FIG. 6B, and FIG. 6C show examples of a compression header for evolved data compression scheme signaling in accordance with various aspects of the present disclosure.
Figure 6B:
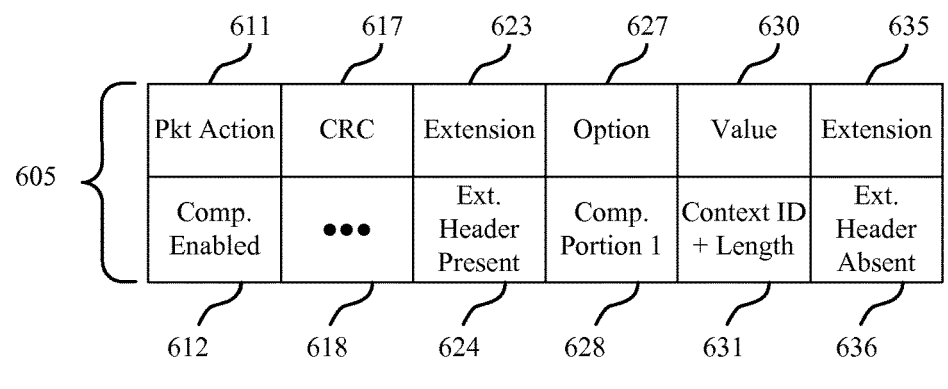
Figure 6B:
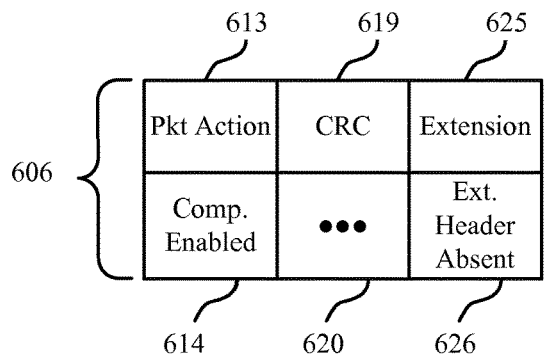
Figure 6C:
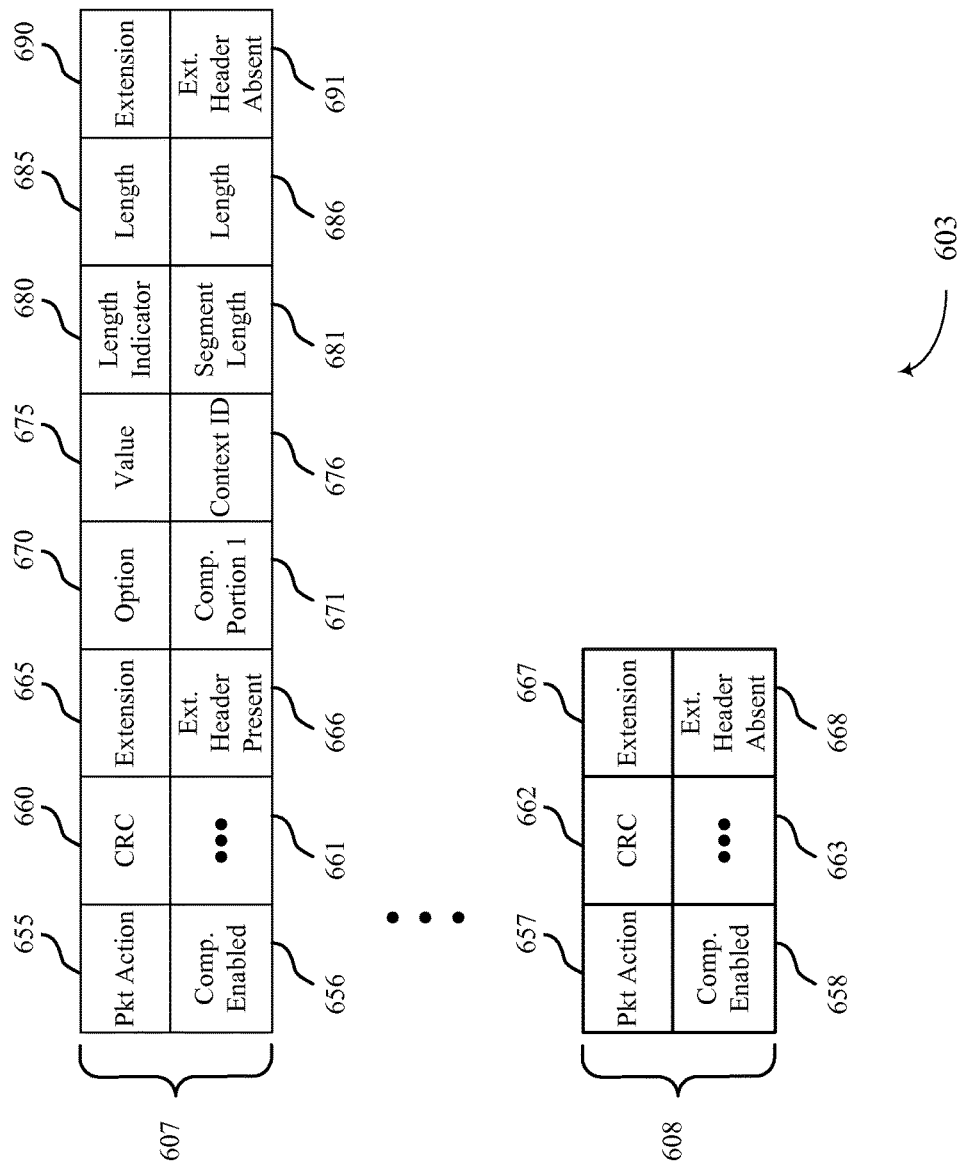

FIG. 6A, FIG. 6B, and FIG. 6C show examples of a compression header, in accordance with aspects of the present disclosure. In particular, FIG. 6A shows an example of a compression header, in accordance with aspects of the present disclosure. In particular, FIG. 6A illustrates a compression header framework 601 that includes an extended compression header 604. For simplicity, only a portion of the extended compression header 604 is illustrated in FIG. 6A. The extended compression header 504 may be an example of either of the extended compression headers 300, 302 of FIGS. 3A and 3B.

The extended compression header 605 may be used between a transmitter and a receiver when a compression context ID and a portion of the data packet to which the compression context ID is to be applied have been pre-negotiated. In other words, in the example shown in FIG. 6A, both the receiver and the transmitter already know what type of compression to be applied and to what portion of the data packet the compression scheme is to be applied. Thus, there is no need to convey the compression context or other compression-related values in the extended compression header 504.

Therefore, the extended compression header 604 includes a packet action field 609 which has a corresponding value 610 indicating that compression is enabled for the data packet. The extended compression header 604 also includes a CRC field 615 which includes a corresponding CRC value 616. Following the CRC field 615, the extended compression header 604 includes an extension field 621. Because no compression options need be conveyed in the extended compression header 604 (as a result of the options being pre-negotiated), the value 622 for the extension field 621 indicates that the extension header is absent.

FIG. 6B illustrates a compression header framework 602 that includes an extended compression header 605 to be used on a first data packet, and an extended compression header 606 to be used on subsequently transmitted data packets. For simplicity, only a portion of the extended compression headers 605, 606 are illustrated in FIG. 6B. The extended compression headers 605, 606 may be examples of the extended compression header 300 of FIG. 3B.

The extended compression header 605 may be used between a transmitter and a receiver when a compression context ID and a portion of the data packet to which the compression context ID is to be applied have not been pre-negotiated. In other words, in the example shown in FIG. 6B, the transmitter may convey to the receiver various identified compression options that the receiver may apply to one or more portions of the transmitted data packet.

Therefore, the extended compression header 605 includes a packet action field 611 which has a corresponding value 612 indicating that compression is enabled for the data packet. The extended compression header 605 also includes a CRC field 617 which includes a corresponding CRC value 618. Following the CRC field 617, the extended compression header 605 includes an extension field 623. Because the transmitter has need to convey compression options to the receiver in the extended compression header 605, the extension field 623 has a value 624 that indicates that an extension header is present (in the form of option field 627 and value field 630). In this example, the option field 627 indicates (in its value 628) that a portion of the data packet (portion 1) is to be compressed using the value 631 in value field 630. The value 631 indicates the compression context ID to be applied to a length of the data packet. In this example, no additional compression options need to be conveyed to the receiver, and so the extended compression header 605 includes a second extension field 635 which indicates in its corresponding value 636 that additional extension headers are absent.

Assuming the transmitter and the receiver intend to use the same compression scheme for successive data packets, future data packets may include a simplified versions of the extended compression header 606. Extended compression header 606 includes a packet action field 613 with a value 614 which indicates that compression is enabled for the data packet. Extended compression header 606 also includes a CRC field 619 with a CRC value 620. And, because these successive data packets need not convey additional compression options, the extended compression header 606 includes an extension field 625 having a value 626 indicating that the extension header is absent.

FIG. 6C illustrates a compression header framework 603 that includes an extended compression header 607 to be used on a first data packet, and an extended compression header 608 to be used on subsequently transmitted data packets. For simplicity, only a portion of the extended compression headers 607, 608 are illustrated in FIG. 6C. The extended compression headers 607, 608 may be examples of the extended compression header 302 of FIG. 3B.

The extended compression header 607 may be used between a transmitter and a receiver when a compression context ID and a portion of the data packet to which the compression context ID is to be applied have not been pre-negotiated. In other words, in the example shown in FIG. 6C, the transmitter may convey to the receiver various identified compression options that the receiver may apply to one or more portions of the transmitted data packet.

Therefore, the extended compression header 607 includes a packet action field 655 which has a corresponding value 656 indicating that compression is enabled for the data packet. The extended compression header 607 also includes a CRC field 660 which includes a corresponding CRC value 661. Following the CRC field 660, the extended compression header 607 includes an extension field 665. Because the transmitter has need to convey compression options to the receiver in the extended compression header 607, the extension field 665 has a value 666 that indicates that an extension header is present (in the form of option field 670, value field 675, length indicator field 680, and length field 685). In this example, the option field 670 indicates (in its value 671) that a portion of the data packet (portion 1) is to be compressed using the value 676 in value field 675. The value 676 indicates the compression context ID to be applied. The length indicator field 680 indicates in its value 681 whether the compression context ID is to be applied to just a portion of the data packet or to the remainder of the data packet. In this case, value 681 indicates that the compression context ID is to be applied to just a portion of the data packet. The length of the portion of the data packet to which the compression context ID is to be applied is indicated in the value 686 of the length field 685. In this example, no additional compression options need to be conveyed to the receiver, and so the extended compression header 607 includes a second extension field 690 which indicates in its corresponding value 691 that additional extension headers are absent.

Assuming the transmitter and the receiver intend to use the same compression scheme for successive data packets, future data packets may include a simplified versions of the extended compression header 608. Extended compression header 608 includes a packet action field 657 with a value 658 which indicates that compression is enabled for the data packet. Extended compression header 608 also includes a CRC field 662 with a CRC value 663. And, because these successive data packets need not convey additional compression options, the extended compression header 608 includes an extension field 667 having a value 668 indicating that the extension header is absent.

Figure 7A:
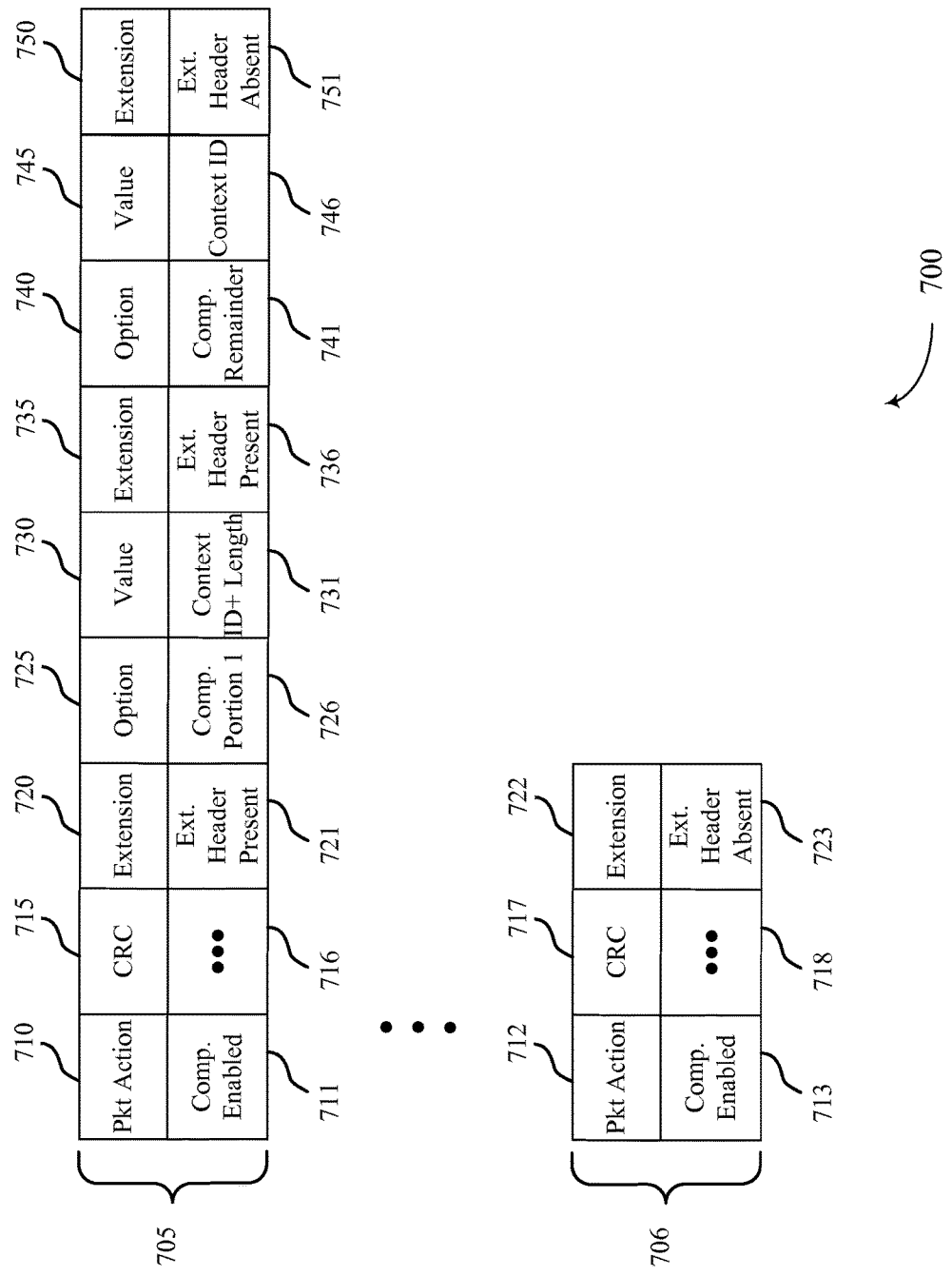
FIG. 7A and FIG. 7B show examples of a compression header for evolved data compression scheme signaling in accordance with various aspects of the present disclosure.
Figure 7B:
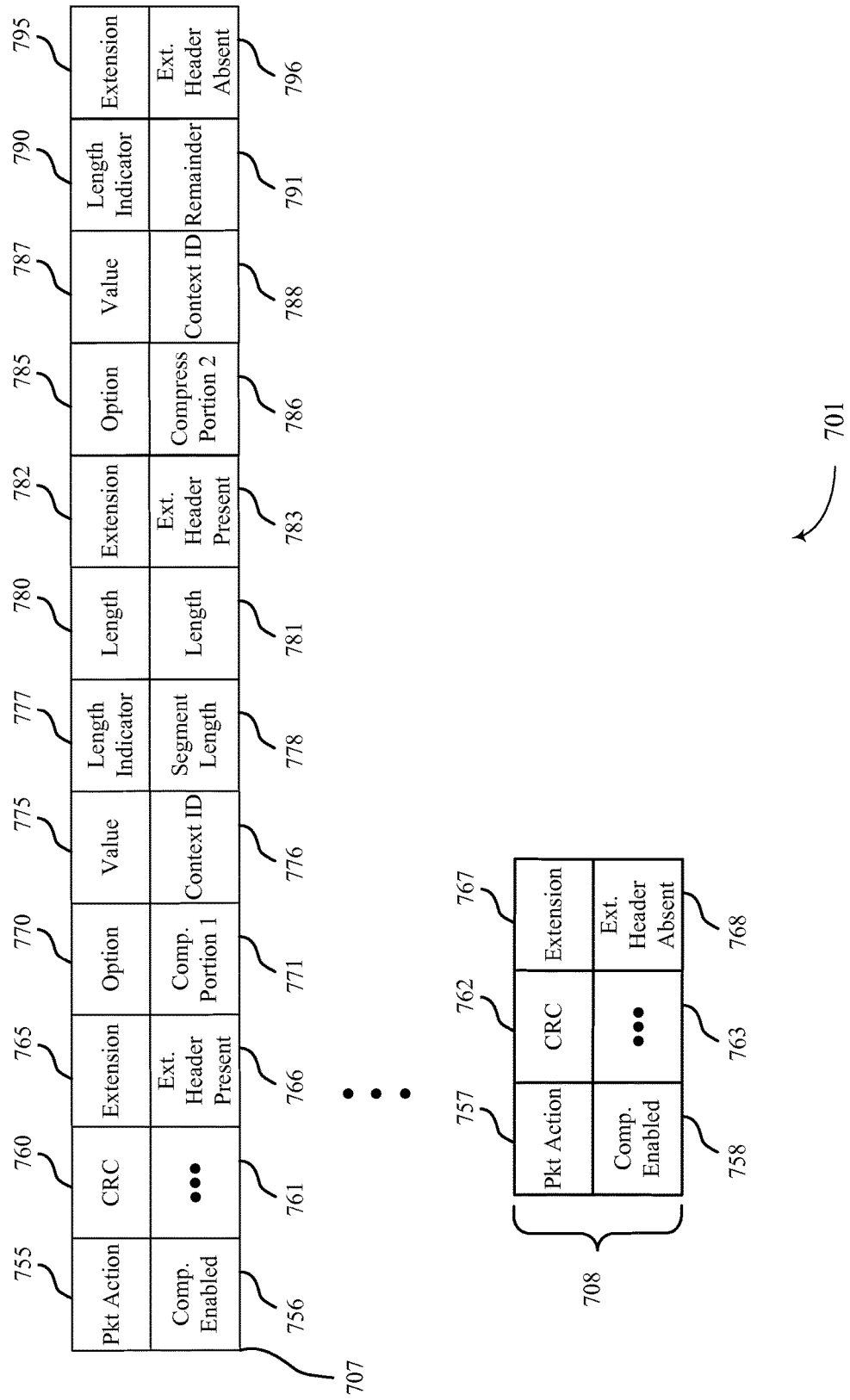

FIG. 7A and FIG. 7B show examples of a compression header, in accordance with aspects of the present disclosure. In particular, FIG. 7A illustrates a compression header framework 700 that includes an extended compression header 705 to be used on a first data packet, and an extended compression header 706 to be used on subsequently transmitted data packets. For simplicity, only a portion of the extended compression headers 705, 706 are illustrated in FIG. 7A. The extended compression headers 705, 706 may be examples of the extended compression header 300 of FIG. 3A.

The extended compression header 705 may be used between a transmitter and a receiver when a compression context ID and a portion of the data packet to which the compression context ID is to be applied have not been pre-negotiated, and when different compression contexts are to be applied to different portions of the transmitted data packet.

Therefore, the extended compression header 705 includes a packet action field 710 which has a corresponding value 711 indicating that compression is enabled for the data packet. The extended compression header 705 also includes a CRC field 715 which includes a corresponding CRC value 716. Following the CRC field 715, the extended compression header 705 includes an extension field 720. Because the transmitter has need to convey compression options to the receiver in the extended compression header 705, the extension field 720 has a value 721 that indicates that an extension header is present (in the form of option field 725 and value field 730). In this example, the option field 725 indicates (in its value 726) that a portion of the data packet (portion 1) is to be compressed using the value 731 in value field 730. The value 731 indicates the compression context ID to be applied to a length of the data packet.

The extended compression header 705 also includes a second extension field 735 which indicates, by its value 736, that an additional compression option is included in an additional extension header. In this second extension header, option field 740 indicates (by its value 741) that the remainder of the data packet is to be compressed using a different compression context identified in the value 746 of value field 745.

Because no additional compression options need to be conveyed to the receiver, the extended compression header 705 includes a third extension field 750 which indicates in its corresponding value 751 that additional extension headers are absent.

Assuming the transmitter and the receiver intend to use the same compression scheme for successive data packets, future data packets may include a simplified version of the extended compression header 706. Extended compression header 706 includes a packet action field 712 with a value 713 which indicates that compression is enabled for the data packet. Extended compression header 706 also includes a CRC field 715 with a CRC value 718. And, because these successive data packets need not convey additional compression options, the extended compression header 706 includes an extension field 722 having a value 723 indicating that the extension header is absent.

FIG. 7B illustrates a compression header framework 701 that includes an extended compression header 707 to be used on a first data packet, and an extended compression header 708 to be used on subsequently transmitted data packets. For simplicity, only a portion of the extended compression headers 707, 708 are illustrated in FIG. 7B. The extended compression headers 707, 708 may be examples of the extended compression header 302 of FIG. 3B.

The extended compression header 707 may be used between a transmitter and a receiver when a compression context ID and a portion of the data packet to which the compression context ID is to be applied have not been pre-negotiated.

The extended compression header 707 includes a packet action field 755 which has a corresponding value 756 indicating that compression is enabled for the data packet. The extended compression header 707 also includes a CRC field 760 which includes a corresponding CRC value 761. Following the CRC field 760, the extended compression header 707 includes an extension field 765. Because the transmitter has need to convey compression options to the receiver in the extended compression header 707, the extension field 765 has a value 766 that indicates that an extension header is present (in the form of option field 770, value field 775, length indicator field 777, and length field 780). In this example, the option field 770 indicates (in its value 771) that a portion of the data packet (portion 1) is to be compressed using the value 776 in value field 775. The value 776 indicates the compression context ID to be applied. The length indicator field 777 indicates in its value 778 whether the compression context ID is to be applied to just a portion of the data packet or to the remainder of the data packet. In this case, value 778 indicates that the compression context ID is to be applied to just a portion of the data packet. The length of the portion of the data packet to which the compression context ID is to be applied is indicated in the value 781 of the length field 780.

The extended compression header 707 also includes a second extension field 782 which indicates, by its value 783, that an additional compression option is included in an additional extension header. In this second extension header, option field 785 indicates (by its value 786) that a second portion of the data packet is to be compressed using a different compression context. The different compression context to be applied is identified in the value 788 of value field 787. The length indicator field 790 indicates by its value 791 that the compression context ID identified in value 788 is to be applied to the remainder of the data packet. Thus, no additional length field is necessary.

Because no additional compression options need to be conveyed to the receiver, the extended compression header 707 includes a third extension field 795 which indicates in its corresponding value 796 that additional extension headers are absent.

Assuming the transmitter and the receiver intend to use the same compression scheme for successive data packets, future data packets may include a simplified version of the extended compression header 708. Extended compression header 708 includes a packet action field 757 with a value 758 which indicates that compression is enabled for the data packet. Extended compression header 708 also includes a CRC field 762 with a CRC value 763. And, because these successive data packets need not convey additional compression options, the extended compression header 708 includes an extension field 767 having a value 768 indicating that the extension header is absent.

Figure 8:
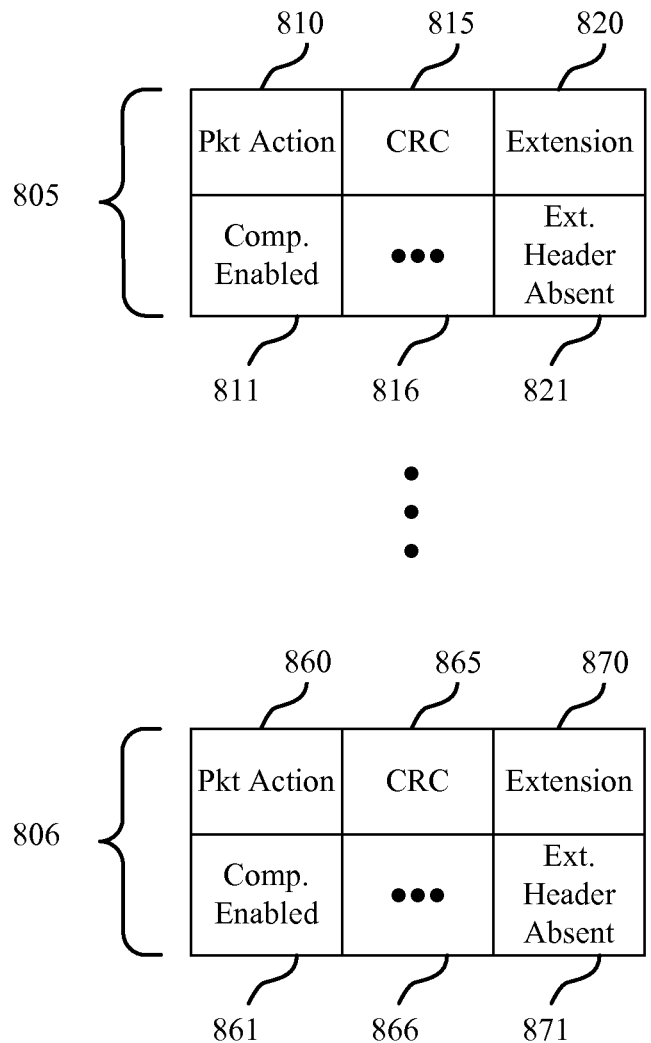
FIG. 8 shows an example of a compression header for evolved data compression scheme signaling in accordance with various aspects of the present disclosure.

FIG. 8 shows an example of a compression header, in accordance with aspects of the present disclosure. In particular, FIG. 8 illustrates a compression header framework 800 that includes an extended compression header 805 applied to a first data packet, and an extended compression header 806 applied to subsequently transmitted data packets. For simplicity, only a portion of the extended compression headers 805, 806 are illustrated in FIG. 8. The extended compression headers 805, 806 may be examples of either of the extended compression headers 300, 302 of FIGS. 3A and 3B.

The extended compression header 805 may be used between a transmitter and a receiver when multiple compression context IDs and multiple portions of the data packet to which the compression context IDs are to be applied have been pre-negotiated. In other words, in the example shown in FIG. 6, both the receiver and the transmitter already know what types of compression schemes to be applied and to what portions of the data packet the compression schemes are to be applied. Thus, there is no need to convey the compression contexts or other compression-related values in the extended compression header 805.

Therefore, the extended compression header 805 includes a packet action field 810 which has a corresponding value 811 indicating that compression is enabled for the data packet. The extended compression header 805 also includes a CRC field 815 which includes a corresponding CRC value 816. Following the CRC field 815, the extended compression header 805 includes an extension field 820. Because no compression options need be conveyed in the extended compression header 805 (as a result of the options being pre-negotiated), the value 821 for the extension field 820 indicates that the extension header is absent.

Assuming the transmitter and the receiver intend to use the same compression schemes for successive data packets, future data packets may include a simplified versions of the extended compression header 806. Extended compression header 806 includes a packet action field 860 with a value 861 which indicates that compression is enabled for the data packet. Extended compression header 806 also includes a CRC field 865 with a CRC value 866. And, because these successive data packets need not convey additional compression options, the extended compression header 806 includes an extension field 870 having a value 871 indicating that the extension header is absent.

Figure 9:
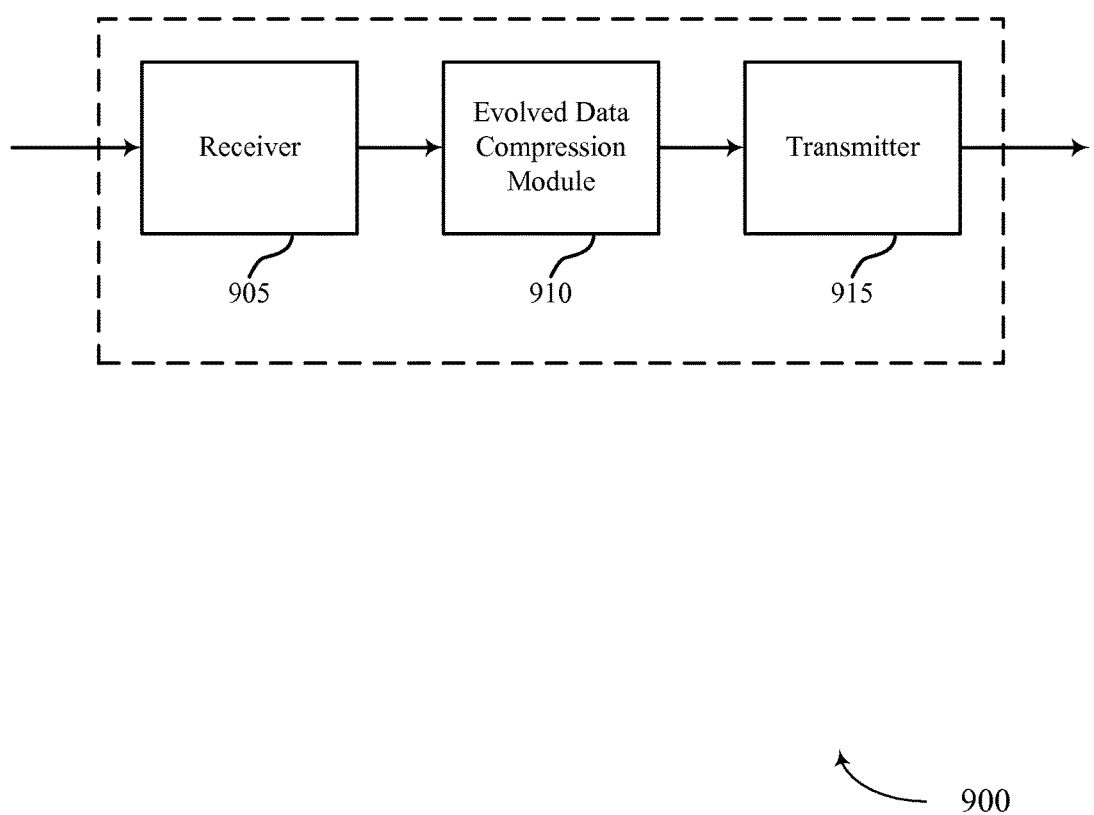
FIG. 9 shows a block diagram of a wireless device configured for evolved data compression scheme signaling in accordance with various aspects of the present disclosure.

FIG. 9 shows a block diagram of a wireless device 900 configured for evolved data compression scheme signaling in accordance with various aspects of the present disclosure. Wireless device 900 may be an example of aspects of a UE 115 described with reference to FIGS. 1-4. Wireless device 900 may include a receiver 905, an evolved data compression module 910, or a transmitter 915. Wireless device 900 may also include a processor. Each of these components may be in communication with each other.

The components of wireless device 900 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may be implemented, in whole or in part, with instructions embodied in a memory, formatted to be executed by one or more general or application-specific processors.

The receiver 905 may receive information such as packets, user data, or control information associated with various information channels (e.g., control channels, data channels, and information related to evolved data compression scheme signaling, etc.). Information may be passed on to the evolved data compression module 910, and to other components of wireless device 900.

The evolved data compression module 910 may receive a compression capability request related to a capability for compressing a payload of a wireless data transmission, identify at least one compression capability parameter based on the compression capability request, and transmit a compression capability response based at least in part on the compression capability request and the at least one compression capability parameter.

The transmitter 915 may transmit signals received from other components of wireless device 900. In some embodiments, the transmitter 915 may be collocated with the receiver 905 in a transceiver module. The transmitter 915 may include a single antenna, or it may include a plurality of antennas.

Figure 10:
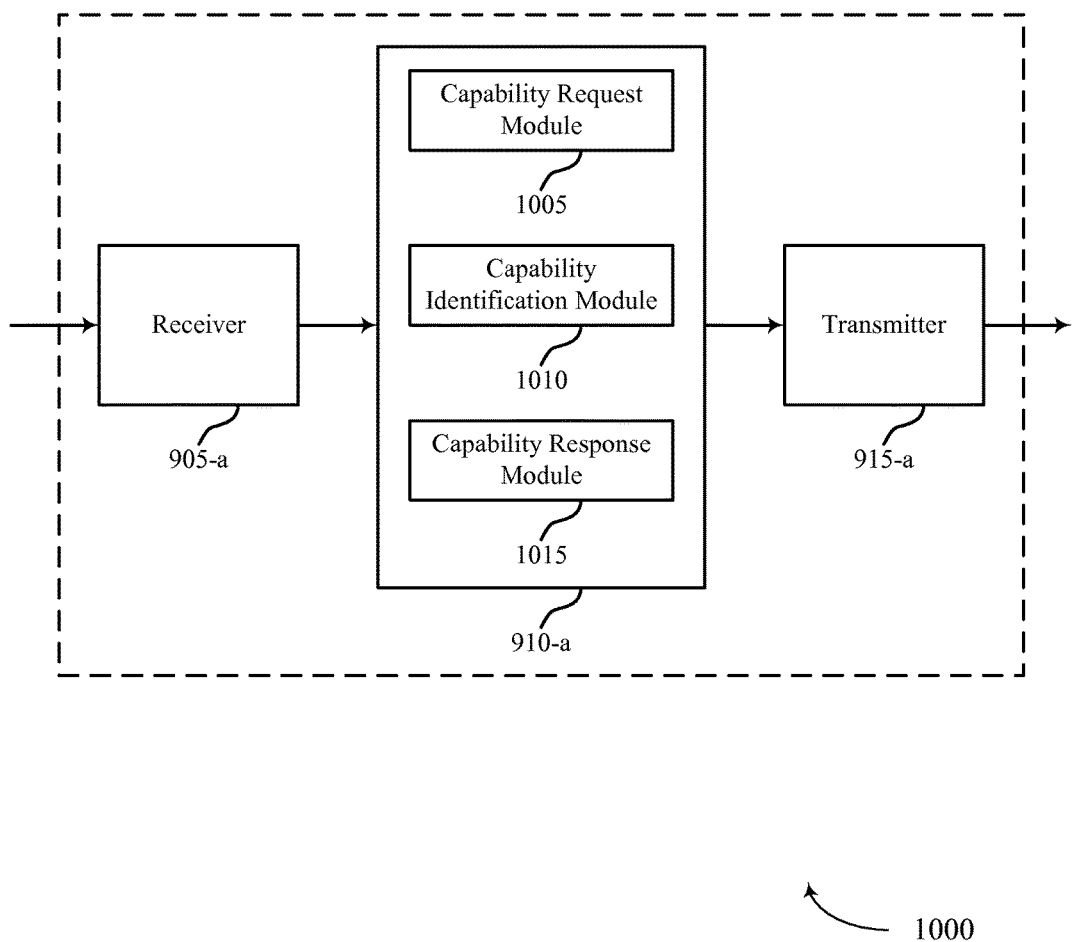
FIG. 10 shows a block diagram of a wireless device configured for evolved data compression scheme signaling in accordance with various aspects of the present disclosure.

FIG. 10 shows a block diagram of a wireless device 1000 for evolved data compression scheme signaling in accordance with various aspects of the present disclosure. Wireless device 1000 may be an example of aspects of a wireless device 900 or a UE 115 described with reference to FIGS. 1-5. Wireless device 1000 may include a receiver 905-*a*, an evolved data compression module 910-*a*, or a transmitter 915-*a*. Wireless device 1000 may also include a processor. Each of these components may be in communication with each other. The evolved data compression module 910-*a* may include a capability request module 1005, a capability identification module 1010, and/or a capability response module 1015.

The components of wireless device 1000 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may be implemented, in whole or in part, with instructions embodied in a memory, formatted to be executed by one or more general or application-specific processors.

The receiver 905-*a* may receive information which may be passed on to evolved data compression module 910-*a*, and to other components of a UE 115. The evolved data compression module 910-*a* may perform the operations described above with reference to FIG. 9. The transmitter 915-*a* may transmit signals received from other components of wireless device 1000.

The capability request module 1005 may receive a compression capability request related to a capability for compressing a payload of a wireless data transmission as described above with reference to FIGS. 2-4. In some examples, the capability relates to a compression rate support parameter and/or a compression context prefill configuration.

The capability identification module 1010 may identify at least one compression capability parameter based on the compression capability request as described above with reference to FIGS. 2-4.

The capability response module 1015 may transmit a compression capability response based at least in part on the compression capability request and the at least one compression capability parameter as described above with reference to FIGS. 2-4.

Figure 11:
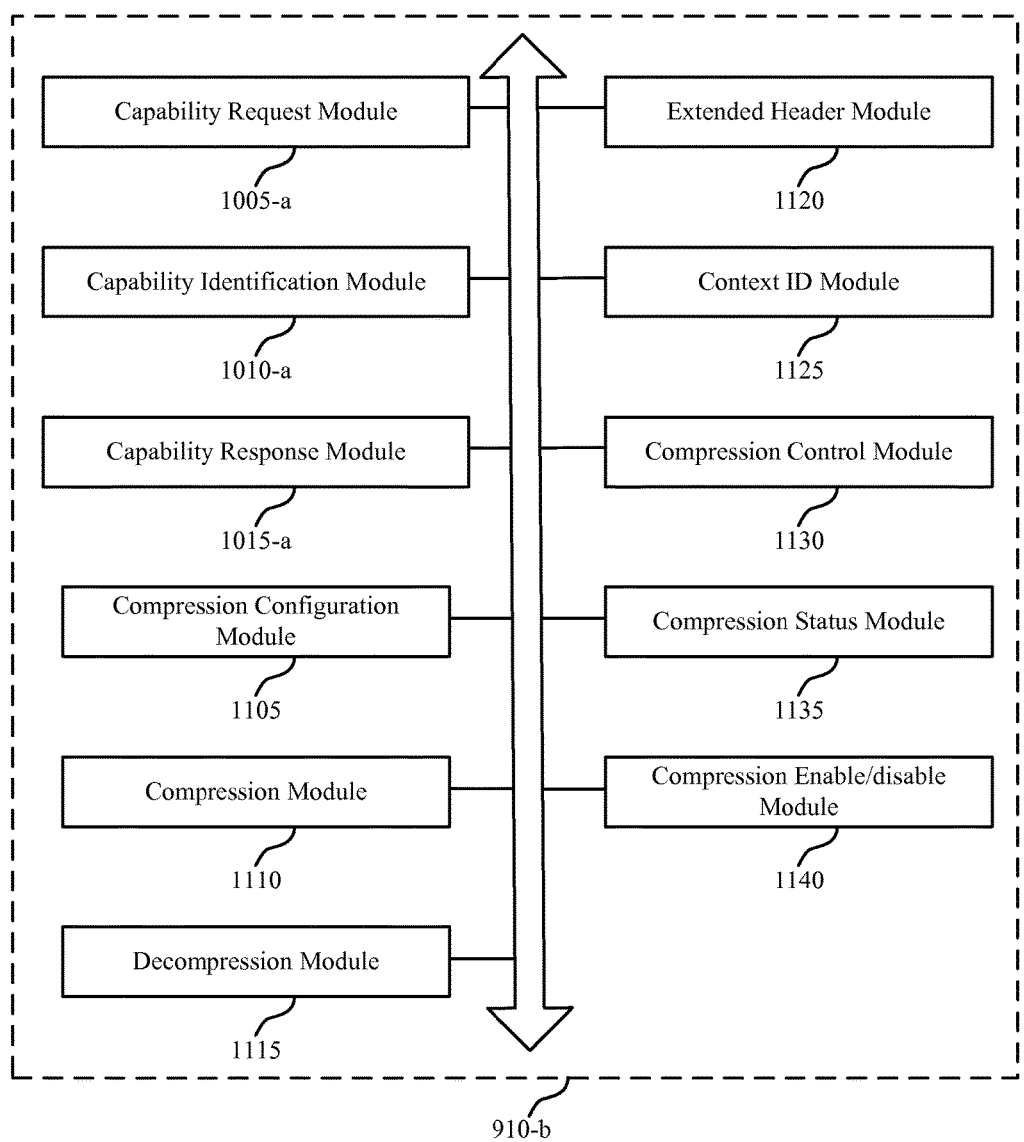
FIG. 11 shows a block diagram of an evolved data compression module configured for evolved data compression scheme signaling in accordance with various aspects of the present disclosure.

FIG. 11 shows a block diagram 1100 of an evolved data compression module 910-*b* which may be a component of a wireless device 900 or a wireless device 1000 for evolved data compression scheme signaling in accordance with various aspects of the present disclosure. The evolved data compression module 910-*b* may be an example of aspects of an evolved data compression module 910 described with reference to FIGS. 9-10. The evolved data compression module 910-*b* may include a capability request module 1005-*a*, a capability identification module 1010-*a*, and a capability response module 1015-*a*. Each of these modules may perform the functions described above with reference to FIG. 10. The evolved data compression module 910-*b* may include a compression configuration module 1105, a compression module 1110, a decompression module 1115, an extended header module 1120, a context ID module 1125, a compression control module 1130, a compression status module 1135, and/or a compression enable/disable module 1140.

The components of the evolved data compression module 910-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may be implemented, in whole or in part, with instructions embodied in a memory, formatted to be executed by one or more general or application-specific processors.

The compression configuration module 1105 may receive a compression configuration request as described above with reference to FIGS. 2-4. The compression configuration module 1105 may transmit a compression configuration request based at least in part on the selected compression configuration. The compression configuration module 1105 may transmit a compression configuration confirmation based at least in part on the compression configuration request. The compression configuration module 1105 may transmit a compression configuration rejection based at least in part on the compression configuration request. The compression configuration module 1105 may receive a compression configuration confirmation based at least in part on the compression configuration request. The compression configuration module 1105 may receive a compression configuration rejection based at least in part on the compression configuration request.

The compression module 1110 may transmit a compressed packet based at least in part on the compression capability response as described above with reference to FIGS. 2-4. The compression module 1110 may reset a compression queue based on an indication that a compressed packet has been dropped. The compression module 1110 may store a compressed version of a packet. The compression module 1110 may store an uncompressed version of the packet. The compression module 1110 may reset a context ID based on the uncompressed version of the packet. The compression module 1110 may determine that a packet is scheduled for immediate transmission. The compression module 1110 may compress the packet based on the determination that the packet is scheduled for immediate transmission.

The decompression module 1115 may receive a compressed packet based at least in part on the compression capability response as described above with reference to FIGS. 2-4. The decompression module 1115 may receive a compressed packet, wherein the compressed packet is compressed immediately prior to transmission.

The extended header module 1120 may be configured such that the compressed packet may include one or more extended compression header fields indicating at least one of a compression context reset request, a compression disable request associated with a number of subsequent packets, a compression context synchronization indication, a compression context freeze request, a multi-part compression indicator associated with a plurality of compression contexts, or a compression metadata indicator as described above with reference to FIGS. 2-4.

The context ID module 1125 may transmit a context ID save confirmation request as described above with reference to FIGS. 2-4. The context ID module 1125 may receive a context ID save confirmation. The context ID module 1125 may transmit a context ID save confirmation.

The compression control module 1130 may transmit a compression control message as described above with reference to FIGS. 2-4. In some examples, transmitting the compression control message comprises transmitting the compression control message on a high priority radio bearer. In some examples, the compression control message may be based at least in part on a determination that an amount of available wireless device processing resources may be below a threshold. In some examples, the compression control message may be based on a determination that the wireless device has failed to decompress or decode a number of packets. In some examples, the compression control message comprises at least one of a compression state indication, a compression scope indication, a data compression threshold, a compression enable/disable indication, a compressed packet ratio, or context ID reset request.

The compression status module 1135 may transmit a compression status indication as described above with reference to FIGS. 2-4. In some examples, the compression status indication comprises at least one of a ciphered PDCP control PDU type, an unciphered PDCP control PDU type, a sequence number, or a compression enable/disable indication. When the compression status indication indicates that compression has been enabled for a radio bearer, the compression status module 1135 may transmit the compression status indication before transmission of a first compressed data PDU. When the compression status indication indicates that compression has been disabled for a radio bearer, the compression status module 1135 may transmit the compression status indication after transmission of a last compressed data PDU. In certain cases, when compression is established on a radio bearer in the same configuration message, the compression status indication indicating that compression has been enabled may not actually be transmitted.

The compression enable/disable module 1140 may transmit a compression enable request or a compression disable request based at least in part on at least one of a processing limitation, a traffic type, or a determination that a resource grant volume is sufficient to clear an uncompressed memory buffer during one or more periodic intervals as described above with reference to FIGS. 2-4.

Figure 12:
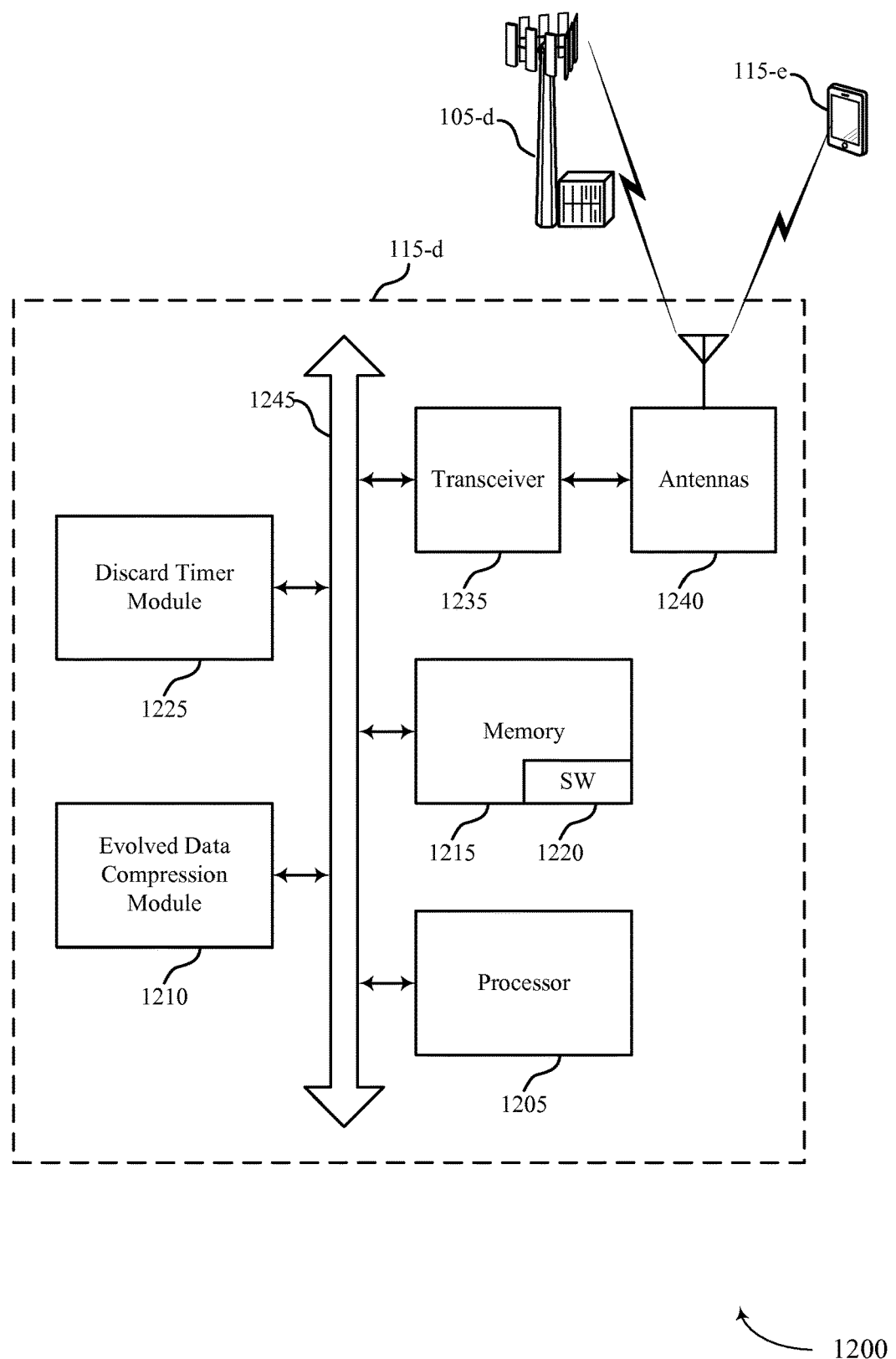
FIG. 12 illustrates a block diagram of portions of a system including a UE configured for evolved data compression scheme signaling in accordance with various aspects of the present disclosure.

FIG. 12 shows a diagram of a portion of a system 1200 including a UE 115 configured for evolved data compression scheme signaling in accordance with various aspects of the present disclosure. System 1200 may include UE 115-*d*, which may be an example of a wireless device 900, a wireless device 1000, or a UE 115 described above with reference to FIGS. 1, 2 and 9-10. UE 115-*d* may include an evolved data compression module 1210, which may be an example of an evolved data compression module 910 described with reference to FIGS. 9-11. UE 115-*d* may include a discard timer module 1225. UE 115-*d* may include components for bi-directional voice and data communications including components for transmitting communications and components for receiving communications. For example, UE 115-*d* may communicate bi-directionally with base station 105-*d* or UE 115-*e*.

The discard timer module 1225 may be used to discard PDCP PDUs after the expiration of a time-out timer. In some cases, discard timer module 1225 may disable a PDCP discard timer based at least in part on the compression capability request as described above with reference to FIGS. 2-4.

UE 115-*d* may include a processor module 1205, and memory 1215 (e.g., including software (SW)) 1220, a transceiver module 1235, and one or more antenna(s) 1240, each of which may communicate, directly or indirectly, with one another (e.g., via buses 1245). The transceiver module 1235 may communicate bi-directionally, via the antenna(s) 1240 or wired or wireless links, with one or more networks, as described above. For example, the transceiver module 1235 may communicate bi-directionally with a base station 105 or another UE 115. The transceiver module 1235 may include a modem to modulate the packets and provide the modulated packets to the antenna(s) 1240 for transmission, and to demodulate packets received from the antenna(s) 1240. While UE 115-*d* may include a single antenna 1240, UE 115-*d* may also have multiple antennas 1240 capable of concurrently transmitting or receiving multiple wireless transmissions.

The memory 1215 may include random access memory (RAM) and read only memory (ROM). The memory 1215 may store computer-readable, computer-executable software/firmware code 1220 including instructions that, when executed, cause the processor module 1205 to perform various functions described herein (e.g., evolved data compression scheme signaling, etc.). Alternatively, the software/firmware code 1220 may not be directly executable by the processor module 1205 but cause a computer (e.g., when compiled and executed) to perform functions described herein. The processor module 1205 may include an intelligent hardware device, (e.g., a central processing unit (CPU), a microcontroller, an ASIC, etc.).

Figure 13:
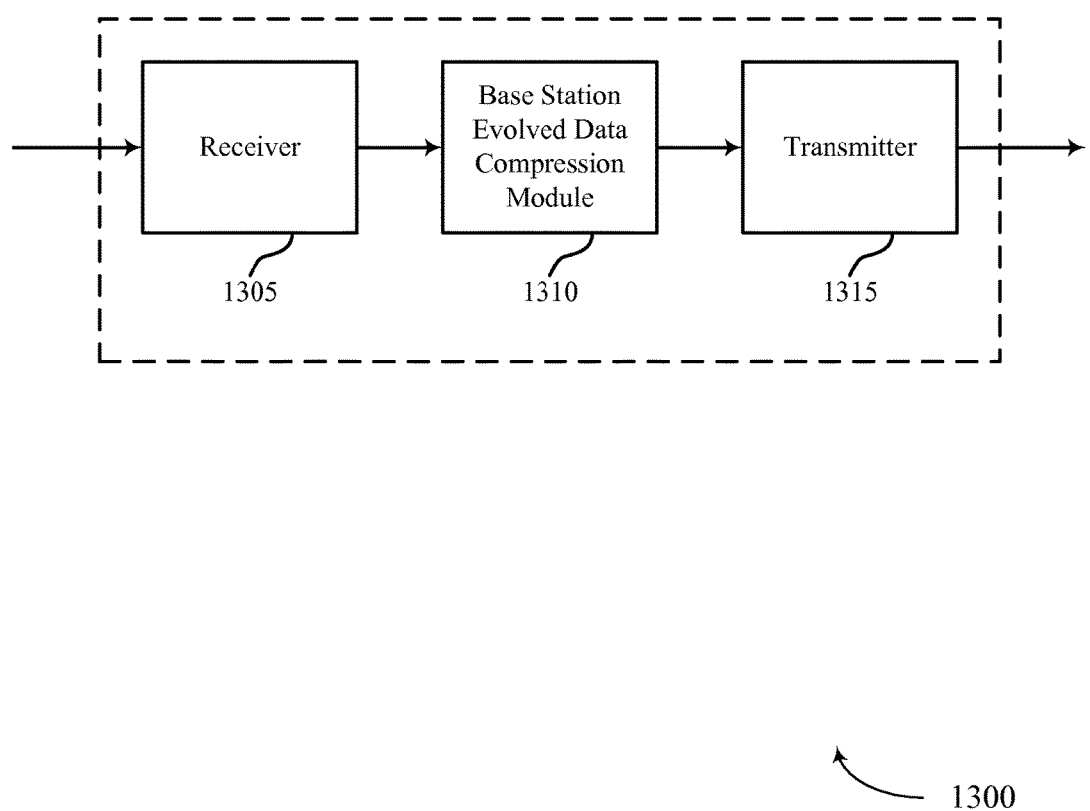
FIG. 13 shows a block diagram of a wireless device configured for evolved data compression scheme signaling in accordance with various aspects of the present disclosure.

FIG. 13 shows a block diagram of a wireless device 1300 configured for evolved data compression scheme signaling in accordance with various aspects of the present disclosure. Wireless device 1300 may be an example of aspects of a base station 105 described with reference to FIGS. 1-2, and 9-12. Wireless device 1300 may include a receiver 1305, a base station evolved data compression module 1310, or a transmitter 1315. Wireless device 1300 may also include a processor. Each of these components may be in communication with each other.

The components of wireless device 1300 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may be implemented, in whole or in part, with instructions embodied in a memory, formatted to be executed by one or more general or application-specific processors.

The receiver 1305 may receive information such as packets, user data, or control information associated with various information channels (e.g., control channels, data channels, and information related to evolved data compression scheme signaling, etc.). Information may be passed on to the base station evolved data compression module 1310, and to other components of wireless device 1300.

The base station evolved data compression module 1310 may transmit a compression capability request related to a capability for compressing a payload of a wireless data transmission, receive a compression capability response based at least in part on the compression capability request, and select a compression configuration based at least in part on the compression capability response.

The transmitter 1315 may transmit signals received from other components of wireless device 1300. In some embodiments, the transmitter 1315 may be collocated with the receiver 1305 in a transceiver module. The transmitter 1315 may include a single antenna, or it may include a plurality of antennas.

Figure 14:
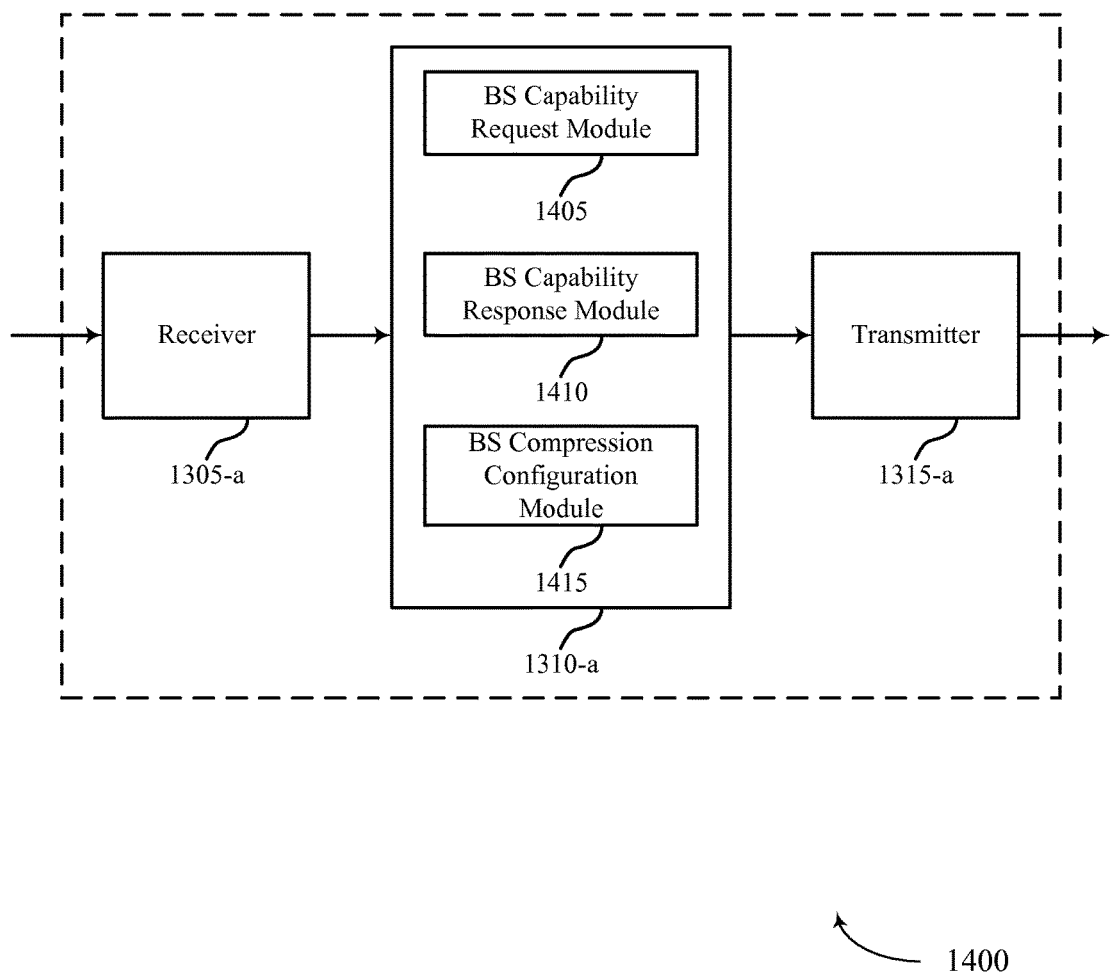
FIG. 14 shows a block diagram of a wireless device configured for evolved data compression module configured for evolved data compression scheme signaling in accordance with various aspects of the present disclosure.

FIG. 14 shows a block diagram of a wireless device 1400 for evolved data compression scheme signaling in accordance with various aspects of the present disclosure. Wireless device 1400 may be an example of aspects of a wireless device 1300 or a base station 105 described with reference to FIGS. 1, 2, 4, and 9-13. Wireless device 1400 may include a receiver 1305-*a*, a base station evolved data compression module 1310-*a*, or a transmitter 1315-*a*. Wireless device

1400 may include a processor. Each of these components may be in communication with each other. The base station evolved data compression module 1310-*a* may include a BS capability request module 1405, a BS capability response module 1410, and a BS compression configuration module 1415.

The components of wireless device 1400 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may be implemented, in whole or in part, with instructions embodied in a memory, formatted to be executed by one or more general or application-specific processors.

The receiver 1305-*a* may receive information which may be passed on to base station evolved data compression module 1310-*a*, and to other components of a base station 105. The base station evolved data compression module 1310-*a* may perform the operations described above with reference to FIG. 13. The transmitter 1315-*a* may transmit signals received from other components of wireless device 1400.

The BS capability request module 1405 may transmit a compression capability request related to a capability for compressing a payload of a wireless data transmission as described above with reference to FIGS. 2-4.

The BS capability response module 1410 may receive a compression capability response based at least in part on the compression capability request as described above with reference to FIGS. 2-4.

The BS compression configuration module 1415 may select a compression configuration based at least in part on the compression capability response as described above with reference to FIGS. 2-4.

Figure 15:
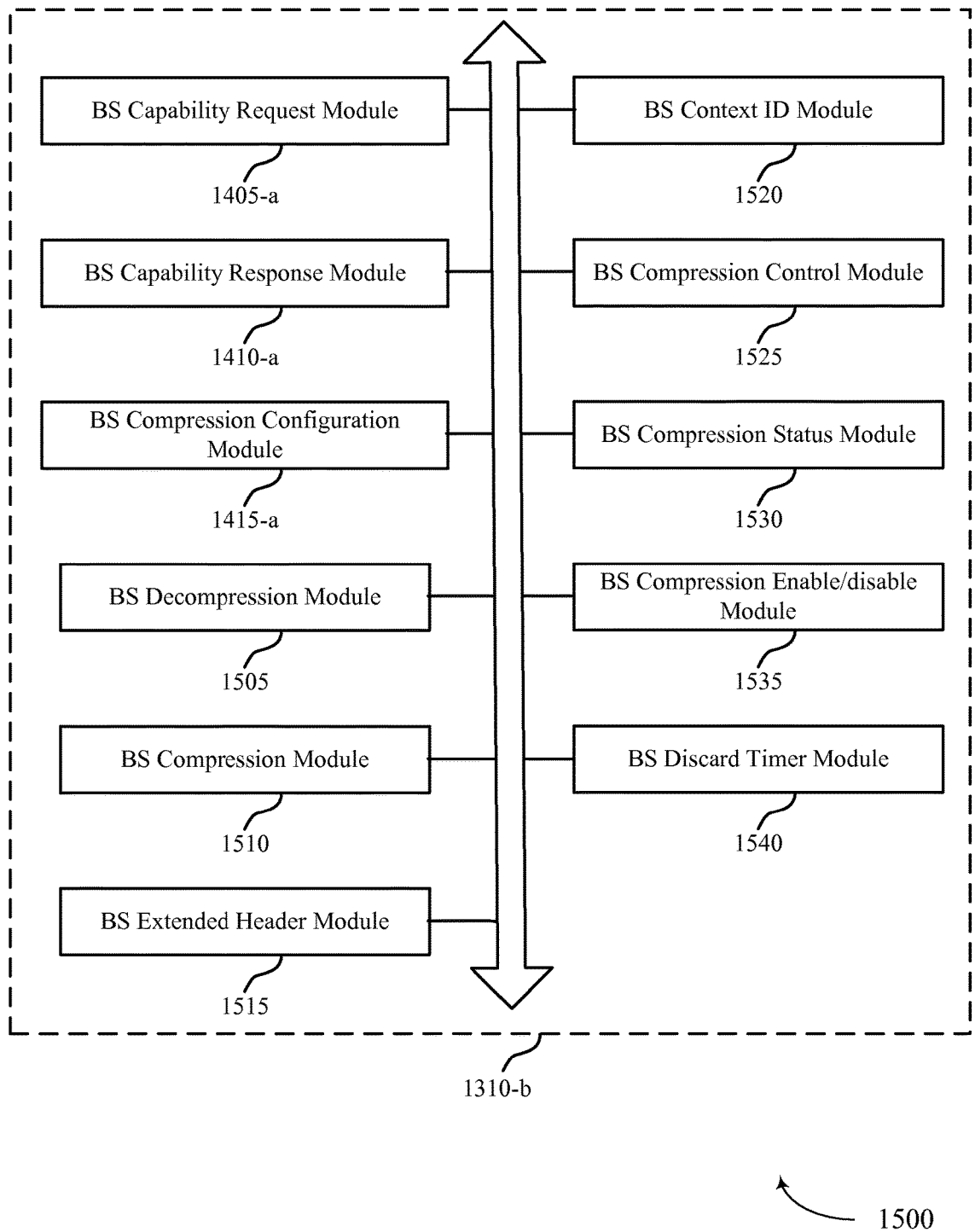
FIG. 15 shows a block diagram of a base station evolved data compression module configured for evolved data compression scheme signaling in accordance with various aspects of the present disclosure.

FIG. 15 shows a block diagram 1500 of a base station evolved data compression module 1310-*b* which may be a component of a wireless device 1300 or a wireless device 1400 for evolved data compression scheme signaling in accordance with various aspects of the present disclosure. The base station evolved data compression module 1310-*b* may be an example of aspects of a base station evolved data compression module 1310 described with reference to FIGS. 13-14. The base station evolved data compression module 1310-*b* may include a BS capability request module 1405-*a*, a BS capability response module 1410-*a*, and a BS compression configuration module 1415-*a*. Each of these modules may perform the functions described above with reference to FIG. 14. The base station evolved data compression module 1310-*b* may include a BS decompression module 1505, a BS compression module 1510, a BS extended header module 1515, a BS context ID module 1520, a BS compression control module 1525, a BS compression status module 1530, a BS compression enable/disable module 1535, and/or a BS discard timer module 1540.

The components of the base station evolved data compression module 1310-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may be implemented, in whole or in part, with instructions embodied in a memory, formatted to be executed by one or more general or application-specific processors.

The BS decompression module 1505 may receive a compressed packet based at least in part on the compression capability response as described above with reference to FIGS. 2-4.

The BS compression module 1510 may be used to transmit a compressed packet based at least in part on the compression capability response as described above with reference to FIGS. 2-4.

The BS extended header module 1515 may be configured such that the compressed packet may include one or more extended compression header fields indicating at least one of a compression context reset request, a compression disable request associated with a number of subsequent packets, a compression context synchronization indication, a compression context freeze request, a multi-part compression indicator associated with a plurality of compression contexts, or a compression metadata indicator as described above with reference to FIGS. 2-4.

The BS context ID module 1520 may receive a context ID save confirmation request as described above with reference to FIGS. 2-4. The BS compression control module 1525 may transmit a compression control message as described above with reference to FIGS. 2-4. The BS compression status module 1530 may transmit a compression status indication as described above with reference to FIGS. 2-4.

The BS compression enable/disable module 1535 may transmit a compression enable request or a compression disable request based at least in part on at least one of a processing limitation, a traffic type, or a determination that a resource grant volume is sufficient to clear an uncompressed memory buffer during one or more periodic intervals as described above with reference to FIGS. 2-4. The BS discard timer module 1540 may disable a PDCP discard timer based at least in part on the compression capability request as described above with reference to FIGS. 2-4.

Figure 16:
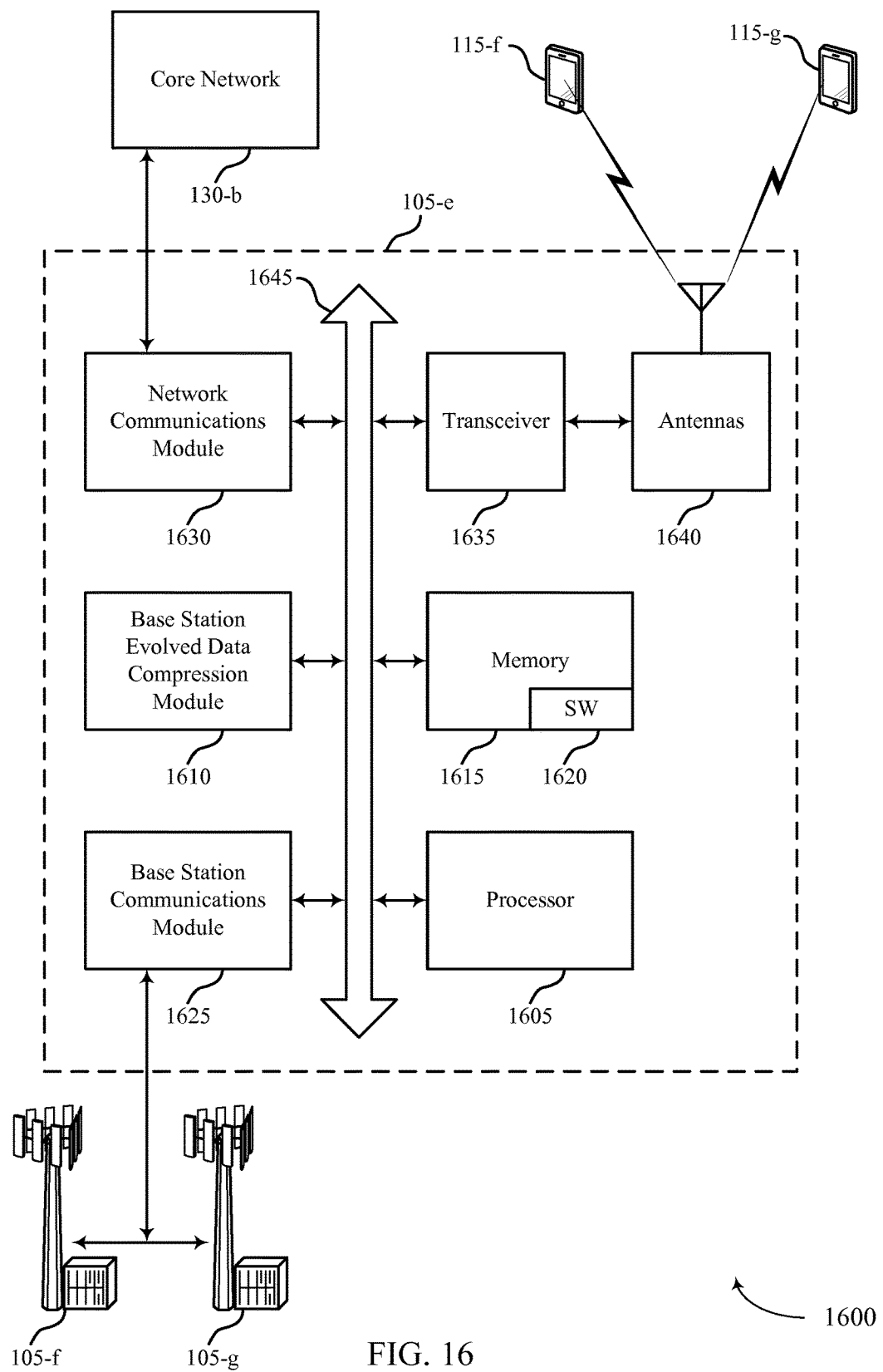
FIG. 16 illustrates a block diagram of a system including a base station configured for evolved data compression scheme signaling in accordance with various aspects of the present disclosure.

FIG. 16 shows a diagram of a system 1600 including a base station 105 configured for evolved data compression scheme signaling in accordance with various aspects of the present disclosure. System 1600 may include base station 105-*e*, which may be an example of a wireless device 1300, a wireless device 1400, or a base station 105 described above with reference to FIGS. 1, 2 and 4-15. Base station 105-*e* may include a base station evolved data compression module 1610, which may be an example of a base station evolved data compression module 1310 described with reference to FIGS. 13-15. Base station 105-*e* may include components for bi-directional voice and data communications including components for transmitting communications and components for receiving communications. For example, base station 105-*e* may communicate bi-directionally with UE 115-*f* or UE 115-*g*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communication module 1625. In some embodiments, base station communication module 1625 may provide an X2 interface within an LTE/LTE-A wireless communication network technology to provide communication between some of the base stations 105. In some embodiments, base station 105-e may communicate with other base stations through core network 130. In some cases, base station 105-e may communicate with the core network 130 through network communications module 1630.

The base station 105-e may include a processor module 1605, memory 1615 (e.g., including software (SW) 1620), transceiver modules 1635, and antenna(s) 1640, which each may be in communication, directly or indirectly, with one another (e.g., over bus system 1645). The transceiver modules 1635 may be configured to communicate bi-directionally, via the antenna(s) 1640, with the UEs 115, which may be multi-mode devices. The transceiver module 1635 (or other components of the base station 105-e) may be configured to communicate bi-directionally, via the antennas 1640, with one or more other base stations (not shown). The transceiver module 1635 may include a modem configured to modulate the packets and provide the modulated packets to the antennas 1640 for transmission, and to demodulate packets received from the antennas 1640. The base station 105-e may include multiple transceiver modules 1635, each with one or more associated antennas 1640. The transceiver module may be an example of a combined receiver 1305 and transmitter 1315 of FIG. 13.

The memory 1615 may include RAM and ROM. The memory 1615 may also store computer-readable, computer-executable software code 1620 containing instructions that are configured to, when executed, cause the processor module 1610 to perform various functions described herein (e.g., evolved data compression scheme signaling, selecting coverage enhancement techniques, call processing, database management, message routing, etc.). Alternatively, the software 1620 may not be directly executable by the processor module 1605 but be configured to cause the computer, e.g., when compiled and executed, to perform functions described herein. The processor module 1605 may include an intelligent hardware device, (e.g., a CPU, a microcontroller, an ASIC, etc.). The processor module 1605 may include various special purpose processors such as encoders, queue processing modules, base band processors, radio head controllers, digital signal processor (DSPs), and the like.

The base station communications module 1625 may manage communications with other base stations 105. The communications management module may include a controller or scheduler for controlling communications with UEs 115 in cooperation with other base stations 105. For example, the base station communications module 1625 may coordinate scheduling for transmissions to UEs 115 for various interference mitigation techniques such as beamforming or joint transmission.

Figure 17:
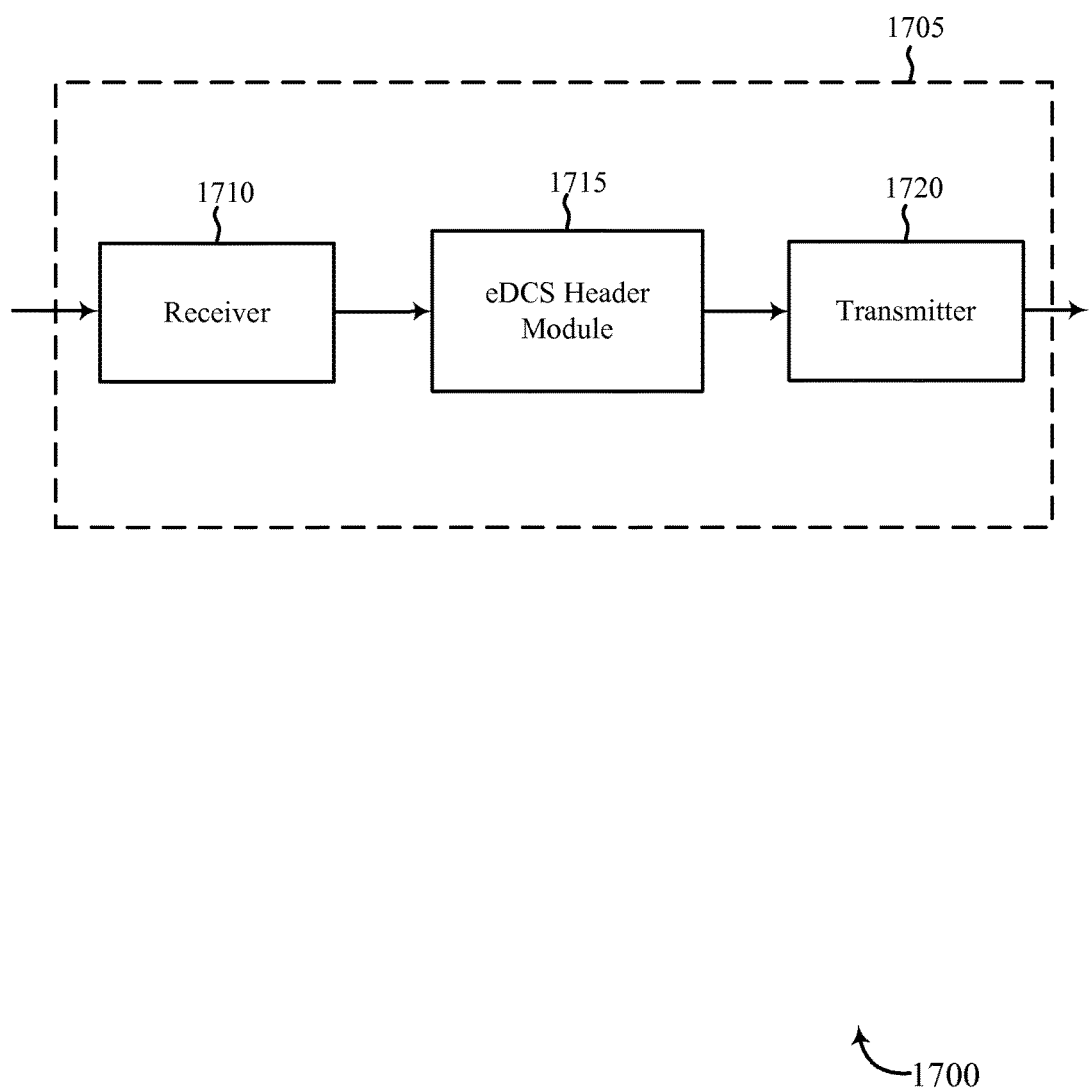
FIG. 17 shows a block diagram of a device configured for use in wireless communication for evolved data compression scheme signaling in accordance with aspects of the present disclosure.

FIG. 17 shows a block diagram 1700 of a device 1705 configured for use in wireless communication, in accordance with aspects of the present disclosure. The device 1705 may be an example of one or more aspects of a UE 115 described with reference to FIGS. 1, 2, and 5. Alternatively, the device 1705 may be an example of one or more aspects of a base station 105 of FIGS. 1, 2, and 5. The device 1705 may include a receiver 1710, an eDCS header module 1715, or a transmitter 1720. The device 1705 may also be or include a processor (not shown). Each of these modules may be in communication with each other.

The components of the device 1705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver 1710 may receive information such as packets, user data, and/or control information associated with various information channels (e.g., control channels, data channels, etc.). The receiver 1710 may be configured to receive data packets that have been partially or completely compressed, as indicated by an extended compression header. Information may be passed on to the eDCS header module 1715, and to other components of the device 1705.

The eDCS header module 1715 may be used to identify or apply a compression option. The compression option may instruct a receiver to reset its compression context, for example. Or, the compression option may include disabling the transmission of the extended compression header for a specified number of data packets. The compression option may be to request that a receiver check point a compression context. Or, the compression option may be to request that a compression context be frozen and used for a specific number of data packets. The compression option may indicate that a compression context is to be applied to a portion of a data packet, or even to the remaining portion of a data packet. Additionally, the compression option may indicate that an extended compression header will include no compression header metadata.

The eDCS header module 1715 may include the identified compression option in an extended compression header which may be included with a data packet during transmission. Additionally, the eDCS header module 1715 may be configured to apply a received compression option.

The transmitter 1720 may transmit the one or more signals received from other components of the device 1705. The transmitter 1720 may transmit data packets that are either partially or completely compressed, as indicated by an attached extended compression header. In some examples, the transmitter 1720 may be collocated with the receiver 1710 in a transceiver.

Figure 18:
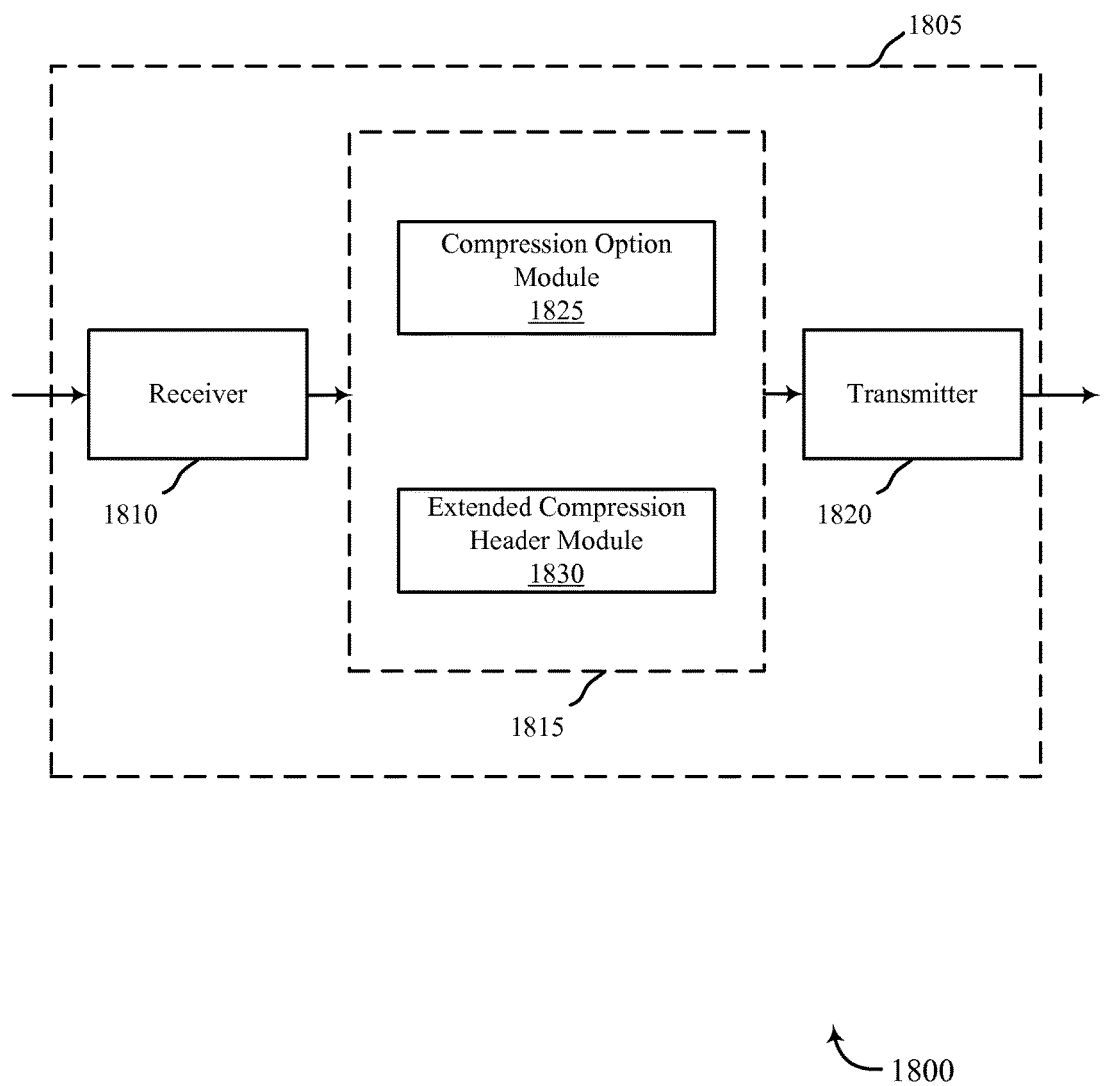
FIG. 18 shows a block diagram of a device configured for use in wireless communication for evolved data compression scheme signaling in accordance with aspects of the present disclosure.

FIG. 18 shows a block diagram 1800 of a device 1805 configured for use in wireless communication, in accordance with aspects of the present disclosure. The device 1805 may be an example of one or more aspects of a UE 115 described with reference to FIGS. 1, 2, and 5. The device 1805 may also be an example of one or more aspects of a base station 105 described with reference to FIGS. 1, 2, and 5. Additionally, the device 1805 may be an example of a device 1705 described with reference to FIG. 17. The device 1805 may include a receiver 1810, an eDCS header module 1815, or a transmitter 1820, which may be examples of the corresponding modules of device 1705. The device 1805 may also include a processor (not shown). Each of these components may be in communication with each other. The eDCS header module 1815 may include a compression option module 1825 or an extended compression header module 1830. The receiver 1810 and the transmitter 1820 may perform the functions of the receiver 1710 and the transmitter 1720, of FIG. 17, respectively.

The compression option module 1825 may be used to determine an appropriate compression option and value to include in an extended compression header. For example, the compression option module 1825 may be used to identify that the device 1805 and a communicating device are out of sync, and thus a compression option that instructs a receiver to reset its compression context may be appropriate. Other options that may be identified by the compression option module 1825 may include options for disabling the transmission of the extended compression header for a specified number of data packets, options for requesting that a receiver check point a compression context, or options for requesting that a compression context be frozen and used for a specific number of data packets. The compression option may indicate that a compression context is to be applied to a portion of a data packet, or even to the remaining portion of a data packet. Additionally, the compression option may indicate that an extended compression header will include no compression header metadata.

The extended compression header module 1830 may be used to generate an extended compression header in which one or more identified compression options may be included. The extended compression header generated by the extended compression header module 1830 may be coupled with a data packet for transmission by the transmitter module 1820.

Figure 19:
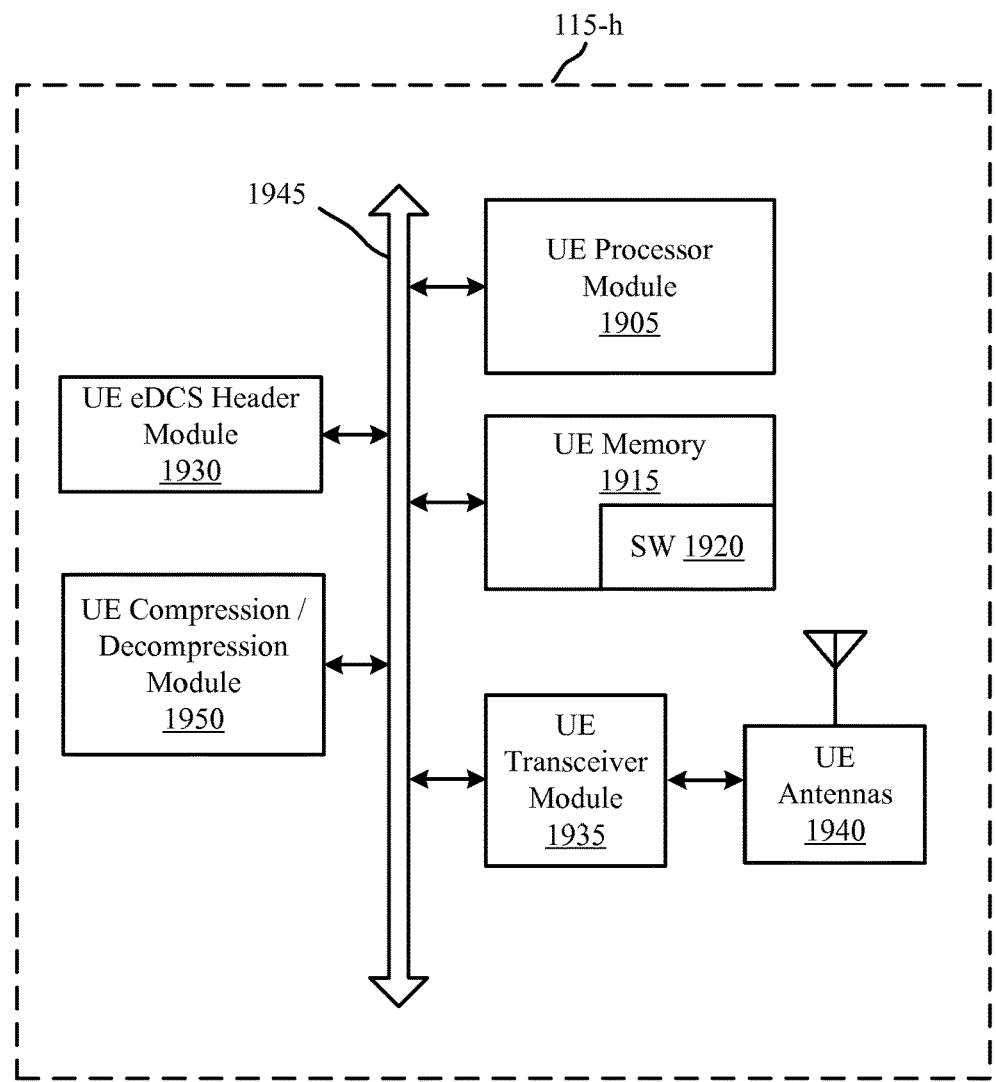
FIG. 19 shows a block diagram of a wireless communication device for evolved data compression scheme signaling in accordance with various aspects of the present disclosure.

FIG. 19 shows a block diagram 1900 of a wireless communication device, in accordance with aspects of the present disclosure. Wireless communication device may include a UE 115-*h*, which may be an example of the UEs 115 FIGS. 1, 2, and 5. UE 115-*h* may also be an example of one or more aspects of devices 1705 and 1805 of FIGS. 17 and 18. The UE 115-*h* may be configured to implement or facilitate at least some of the UE or device features and functions described with reference to FIGS. 1 through 18.

The UE 1910 may include components for bi-directional voice and data communications including components for transmitting communications and components for receiving communications. The UE 115-*h* may include UE antenna(s) 1940, a UE transceiver module 1935, a UE processor module 1905, and UE memory 1915 (including software (SW) 1920), which each may communicate, directly or indirectly, with each other (e.g., via one or more buses 1945). The UE transceiver module 1935 may be configured to communicate bi-directionally, via the UE antenna(s) 1940 and/or one or more wired or wireless links, with one or more networks, as described above. For example, the UE transceiver module 1935 may be configured to communicate bi-directionally with base stations 105, 235, 405 with reference to FIGS. 1, 2, and 4. The UE transceiver module 1935 may include a modem configured to modulate the packets and provide the modulated packets to the UE antenna(s) 1940 for transmission, and to demodulate packets received from the UE antenna(s) 1940. While the UE 115-*h* may include a single UE antenna 1940, the UE 115-*h* may have multiple UE antennas 1940 capable of concurrently transmitting and/or receiving multiple wireless transmissions. The UE transceiver module 1935 may be capable of concurrently communicating with one or more base stations 105, 235, 405 via multiple component carriers.

The UE 115-*h* may include a UE eDCS header module 1930, which may perform the functions described above for the eDCS header modules 915, 1015 of devices 905 and 1005, respectively, when devices 905 and 1005 function or are included as a UE, as described in relation to FIGS. 9 and 10. The UE 115-*h* may also include a UE compression/decompression module 1950. The UE compression/decompression module 1950 may be used by the UE 115-*h* to compress portions or the entirety of a data packet in accordance to compression options identified with relation to the data packet. Additionally, the UE compression/decompression module 1950 may be used by the UE 115-*h* to decompress portions of a data packet in accordance to compression options received in an extended compression header with the data packet.

The UE memory 1915 may include random access memory (RAM) and read-only memory (ROM). The UE memory 1915 may store computer-readable, computer-executable software/firmware code 1920 containing instructions that are configured to, when executed, cause the UE processor module 1905 to perform various functions described herein (e.g., identify compression options, generate extended compression headers and compress or decompress data packets in accordance with the compression options included in the extended compression headers, etc.). Alternatively, the computer-readable, computer-executable software/firmware code 1920 may not be directly executable by the UE processor module 1905 but be configured to cause a computer (e.g., when compiled and executed) to perform functions described herein. The UE processor module 1905 may include an intelligent hardware device, (e.g., a central processing unit (CPU), a microcontroller, an application-specific integrated circuit (ASIC), etc.)

Figure 20:
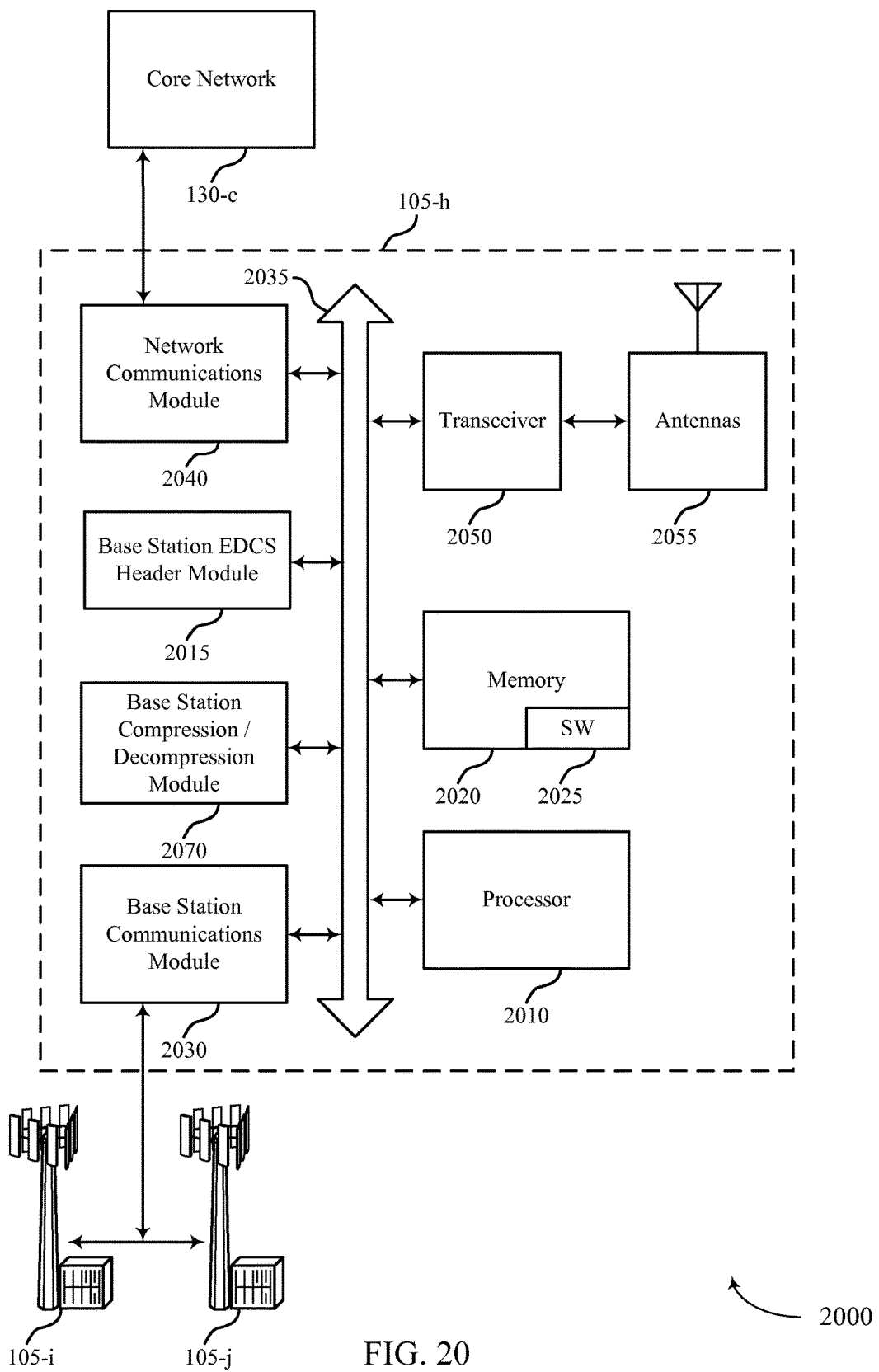
FIG. 20 shows a block diagram of a base station for use in wireless communication for evolved data compression scheme signaling in accordance with various aspects of the present disclosure.

FIG. 20 shows a block diagram 2000 of a base station 105-*h* (e.g., a base station forming part or all of an eNB) for use in wireless communication, in accordance with aspects of the present disclosure. In some examples, the base station 105-*h* may be an example of aspects of one or more of the base stations 105 described with reference to FIGS. 1, 2, and 5. Base station 105-*h* may also be an example of one or more aspects of devices 1705, 1805 of FIGS. 17 and 18. The base station 105-*h* may be configured to implement or facilitate at least some of the base station or device features and functions described with reference to FIGS. 1 through 19.

The base station 105-*h* may include a processor module 2010, a memory 2020, at least one base station transceiver module (represented by base station transceiver module(s) 2050), at least one antenna (represented by antenna(s) 2055), a base station eDCS header module 2015, or a base station compression/decompression module 2070. The base station 105-*h* may also include one or more of a base station communications module 2030 or a network communications module 2040. Each of these modules may be in communication with each other, directly or indirectly, over one or more buses 2035.

The memory 2020 may include random access memory (RAM) and/or read-only memory (ROM). The memory 2020 may store computer-readable, computer-executable software/firmware code 2025 containing instructions that are configured to, when executed, cause the processor module 2010 to perform various functions described herein related to wireless communication (e.g., identify compression options, generate extended compression headers and compress or decompress data packets in accordance with the compression options included in the extended compression headers, etc.). Alternatively, the computer-readable, computer-executable software/firmware code 2025 may not be directly executable by the processor module 2010 but be configured to cause the base station 105-*h* (e.g., when compiled and executed) to perform various of the functions described herein.

The processor module 2010 may include an intelligent hardware device (e.g., a central processing unit (CPU), a microcontroller, an ASIC, etc.). The processor module 2010 may process information received through the base station transceiver module(s) 2050, the base station communications module 2030, or the network communications module 2040. The processor module 2010 may also process information to be sent to the transceiver module(s) 2050 for transmission through the antenna(s) 2055, to the base station communications module 2030, for transmission to one or more other base stations 2060 and 2065, or to the network communications module 2040 for transmission to a core network 130-*d*, which may be an example of one or more aspects of the core network 130, 230 described with reference to FIGS. 1 and 2. The processor module 2010 may handle, alone or in connection with the base station eDCS header module 2015 and the base station compression/decompression module 2070, various aspects of eDCS compression, such as identifying compression options, generating extended compression headers and compressing or decompressing data packets in accordance with the compression options included in the extended compression headers.

The base station transceiver module(s) 2050 may include a modem configured to modulate packets and provide the modulated packets to the antenna(s) 2055 for transmission, and to demodulate packets received from the antenna(s) 2055. The base station transceiver module(s) 2050 may, in some examples, be implemented as one or more base station transmitter modules and one or more separate base station receiver modules. The base station transceiver module(s) 2050 may support communications in a first radio frequency spectrum band or a second radio frequency spectrum band. The base station transceiver module(s) 2050 may be configured to communicate bi-directionally, via the antenna(s) 2055, with one or more UEs or apparatuses, such as one or more of the UEs 115 described with reference to FIGS. 1, 2, and 5. The base station 105-*h* may, for example, include multiple antennas 2055 (e.g., an antenna array). The base station 2005 may communicate with the core network 2045 through the network communications module 2040. The base station 105-*h* may also communicate with other base stations, such as the base stations 105-*i* and 105-*j*, using the base station communications module 2030.

The base station eDCS header module 2015 may be configured to perform or control some or all of the features or functions described with reference to FIGS. 1 through 10 related to eDCS compression. In some examples, the base station eDCS header module 2015 may identify compression options and may generate extended compression headers. In some examples, the base station eDCS header module 2015 may cooperate with the base station compression/decompression module 2070 to compress or decompress data packets in accordance with the compression options included in the extended compression headers. The base station eDCS header module 2015, or portions of the base station eDCS header module 2015, may include a processor module, or some or all of the functions of the base station eDCS header module 2015 may be performed by the processor module 2010 or in connection with the processor module 2010. Similarly, the base station compression/decompression module 2070, or portions of the base station compression/decompression module 2070, may include a processor module, or some or all of the functions of the base station compression/decompression module 2070 may be performed by the processor module 2010 or in connection with the processor module 2010. In some examples, the base station eDCS header module 2015 may be an example of the eDCS header module 1715 or 1815 described with reference to FIGS. 17 and 18.

Figure 21:
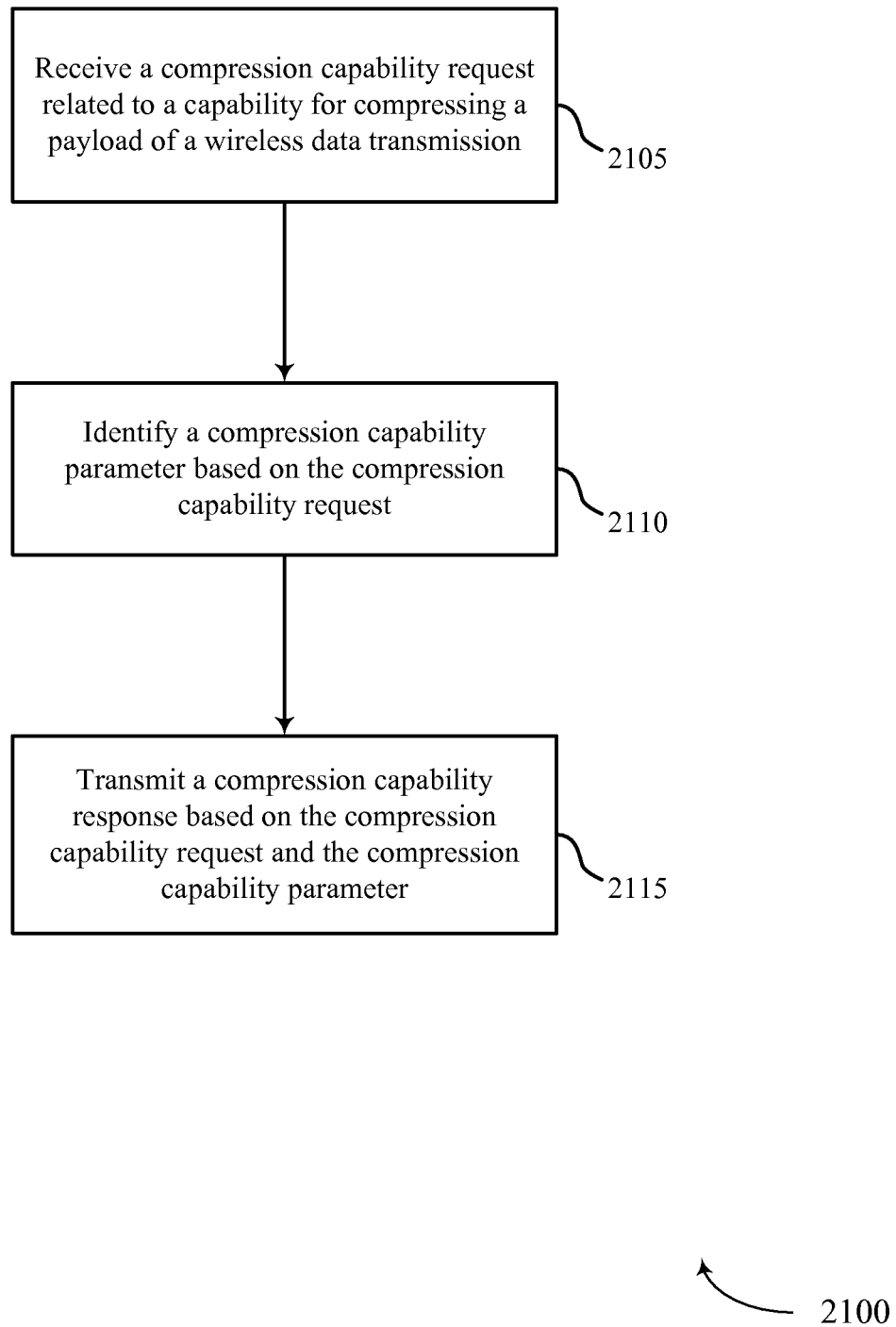
FIGS. 21-29 show flowcharts illustrating methods for evolved data compression scheme signaling in accordance with various aspects of the present disclosure.

FIG. 21 shows a flowchart illustrating a method 2100 for evolved data compression scheme signaling in accordance with various aspects of the present disclosure. The operations of method 2100 may be implemented by a UE 115 or its components as described with reference to FIGS. 1-20. For example, the operations of method 2100 may be performed by the evolved data compression module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware.

At block 2105, the UE 115 may receive a compression capability request related to a capability for compressing a payload of a wireless data transmission as described above with reference to FIGS. 2-4. In certain examples, the operations of block 2105 may be performed by the capability request module 1005 as described above with reference to FIG. 10.

At block 2110, the UE 115 may identify at least one compression capability parameter based on the compression capability request as described above with reference to FIGS. 2-4. In certain examples, the operations of block 2110 may be performed by the capability identification module 1010 as described above with reference to FIG. 10.

At block 2115, the UE 115 may transmit a compression capability response based at least in part on the compression capability request and the at least one compression capability parameter as described above with reference to FIGS. 2-4. In certain examples, the operations of block 2115 may be performed by the capability response module 1015 as described above with reference to FIG. 10.

Figure 22:
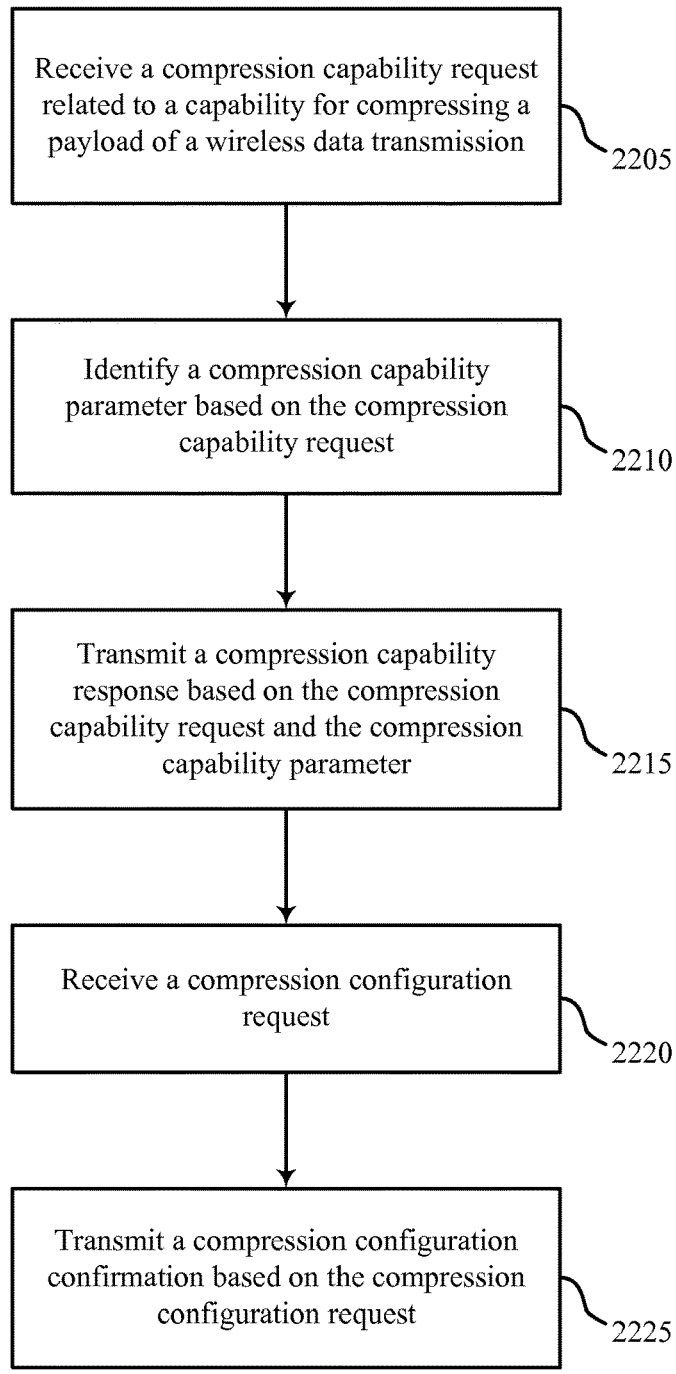

FIG. 22 shows another flowchart illustrating a method 2200 for evolved data compression scheme signaling in accordance with various aspects of the present disclosure. The operations of method 2200 may be implemented by a UE 115 or its components as described with reference to FIGS. 1-20. For example, the operations of method 2200 may be performed by the evolved data compression module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 2200 may incorporate aspects of method 2100 of FIG. 21.

At block 2205, the UE 115 may receive a compression capability request related to a capability for compressing a payload of a wireless data transmission as described above with reference to FIGS. 2-4. In certain examples, the operations of block 2205 may be performed by the capability request module 1005 as described above with reference to FIG. 10.

At block 2210, the UE 115 may identify at least one compression capability parameter based on the compression capability request as described above with reference to FIGS. 2-4. In certain examples, the operations of block 2210 may be performed by the capability identification module 1010 as described above with reference to FIG. 10.

At block 2215, the UE 115 may transmit a compression capability response based at least in part on the compression capability request and the at least one compression capability parameter as described above with reference to FIGS. 2-4. In certain examples, the operations of block 2215 may be performed by the capability response module 1015 as described above with reference to FIG. 10.

At block 2220, the UE 115 may receive a compression configuration request as described above with reference to FIGS. 2-4. In certain examples, the operations of block 2220 may be performed by the compression configuration module 1105 as described above with reference to FIG. 11.

At block 2225, the UE 115 may transmit a compression configuration confirmation based at least in part on the compression configuration request as described above with reference to FIGS. 2-4. In certain examples, the operations of block 2225 may be performed by the compression configuration module 1105 as described above with reference to FIG. 11.

Figure 23:
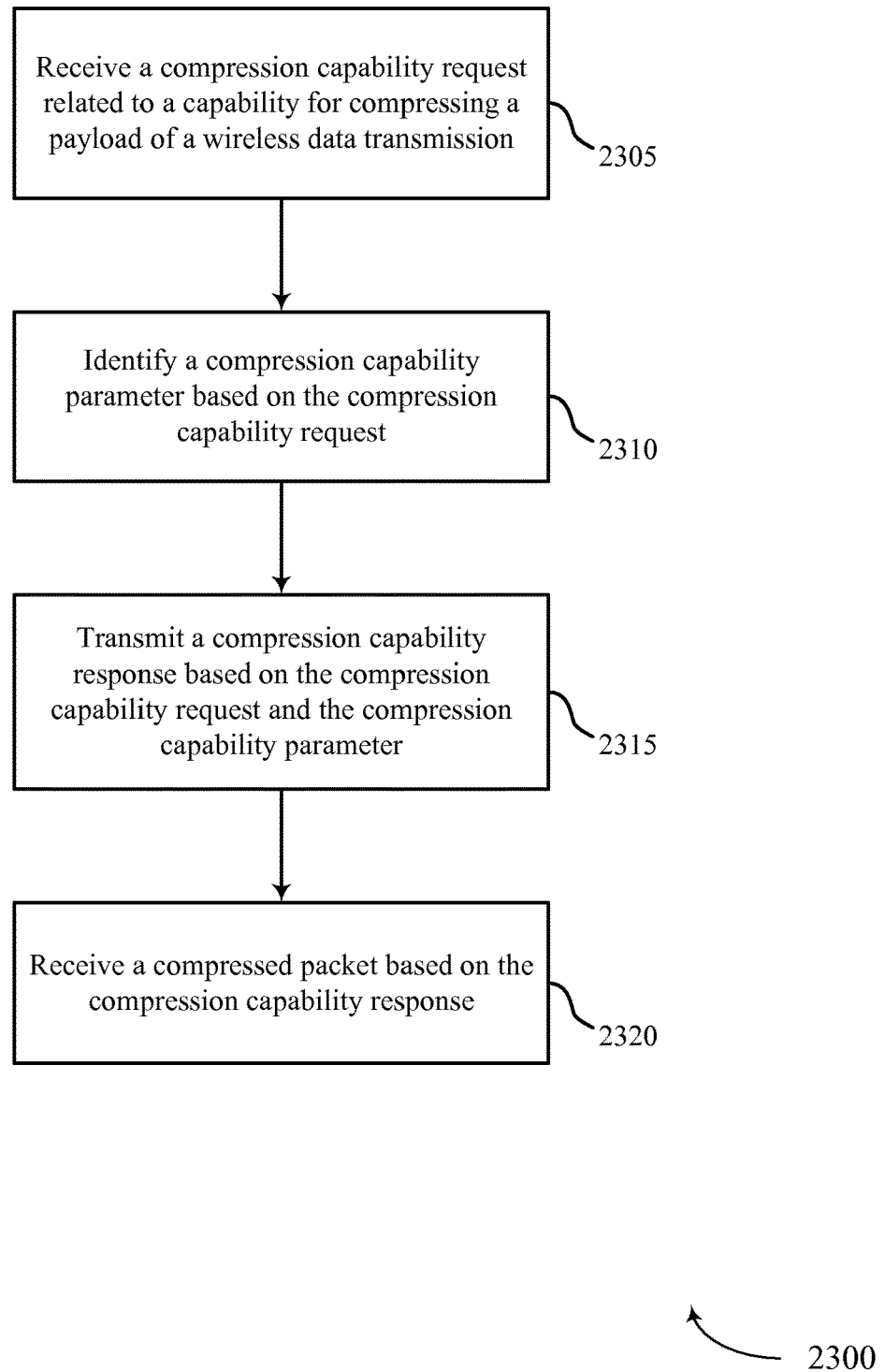

FIG. 23 shows another flowchart illustrating a method 2300 for evolved data compression scheme signaling in accordance with various aspects of the present disclosure. The operations of method 2300 may be implemented by a UE 115 or its components as described with reference to FIGS. 1-20. For example, the operations of method 2300 may be performed by the evolved data compression module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 2300 may incorporate aspects of methods 2100, and 2200 of FIGS. 21 and/or 22.

At block 2305, the UE 115 may receive a compression capability request related to a capability for compressing a payload of a wireless data transmission as described above with reference to FIGS. 2-4. In certain examples, the operations of block 2305 may be performed by the capability request module 1005 as described above with reference to FIG. 10.

At block 2310, the UE 115 may identify at least one compression capability parameter based on the compression capability request as described above with reference to FIGS. 2-4. In certain examples, the operations of block 2310 may be performed by the capability identification module 1010 as described above with reference to FIG. 10.

At block 2315, the UE 115 may transmit a compression capability response based at least in part on the compression capability request and the at least one compression capability parameter as described above with reference to FIGS. 2-4. In certain examples, the operations of block 2315 may be performed by the capability response module 1015 as described above with reference to FIG. 10.

At block 2320, the UE 115 may receive a compressed packet based at least in part on the compression capability response as described above with reference to FIGS. 2-4. The compressed packet comprises one or more extended compression header fields indicating at least one of: a compression context reset request, a compression disable request associated with a number of subsequent packets, a compression context synchronization indication, a compression context freeze request, a multi-part compression indicator associated with a plurality of compression contexts, or a compression metadata indicator. In certain examples, the operations of block 2320 may be performed by the decompression module 1115 as described above with reference to FIG. 11.

Figure 24:
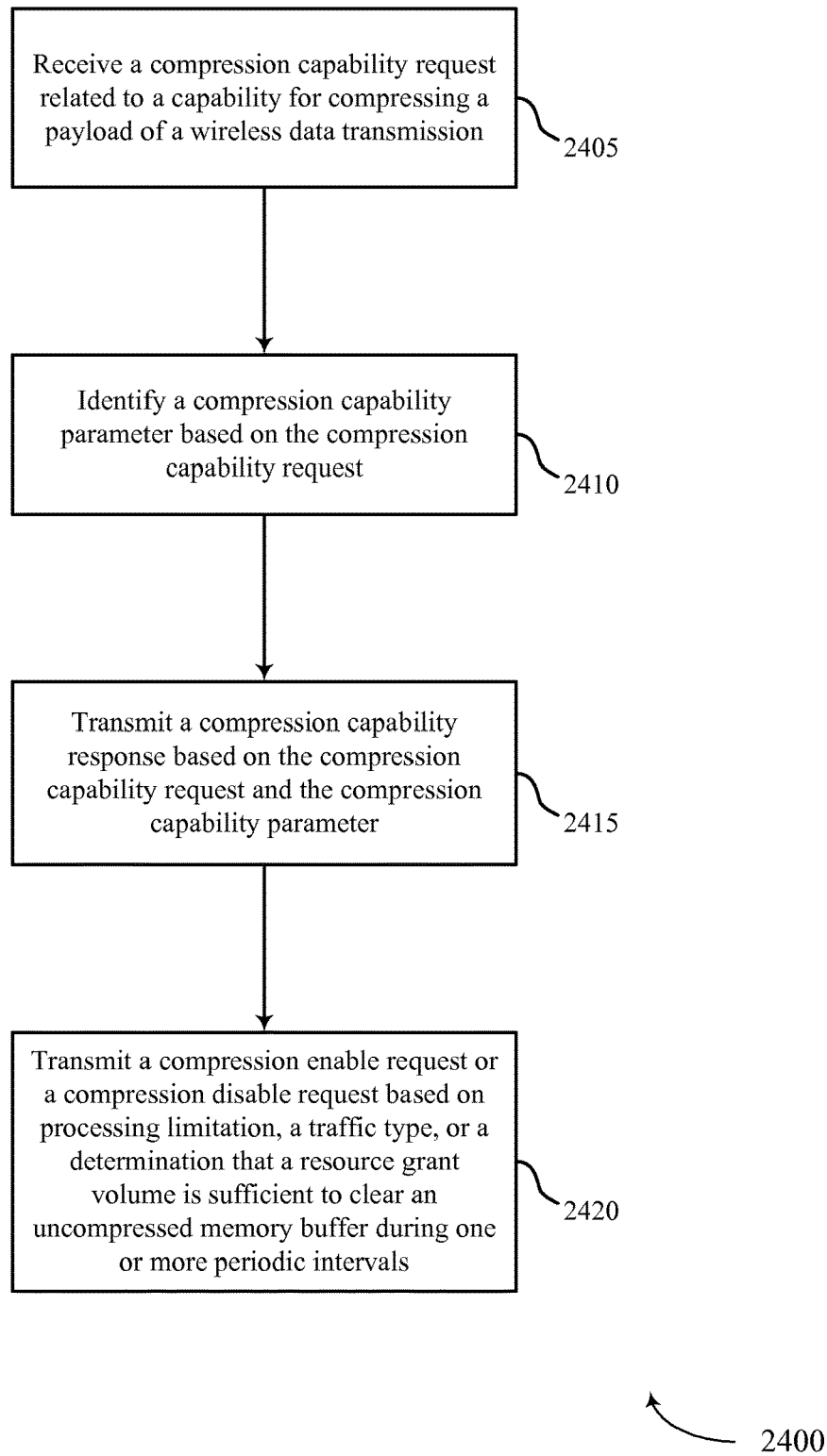

FIG. 24 shows another flowchart illustrating a method 2400 for evolved data compression scheme signaling in accordance with various aspects of the present disclosure. The operations of method 2400 may be implemented by a UE 115 or its components as described with reference to FIGS. 1-20. For example, the operations of method 2400 may be performed by the evolved data compression module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 2400 may incorporate aspects of methods 2100, 2200, and/or 2300 of FIGS. 21-23.

At block 2405, the UE 115 may receive a compression capability request related to a capability for compressing a payload of a wireless data transmission as described above with reference to FIGS. 2-4. In certain examples, the operations of block 2405 may be performed by the capability request module 1005 as described above with reference to FIG. 10.

At block 2410, the UE 115 may identify at least one compression capability parameter based on the compression capability request as described above with reference to FIGS. 2-4. In certain examples, the operations of block 2410 may be performed by the capability identification module 1010 as described above with reference to FIG. 10.

At block 2415, the UE 115 may transmit a compression capability response based at least in part on the compression capability request and the at least one compression capability parameter as described above with reference to FIGS. 2-4. In certain examples, the operations of block 2415 may be performed by the capability response module 615 as described above with reference to FIG. 10.

At block 2420, the UE 115 may transmit a compression enable request or a compression disable request based at least in part on at least one of a processing limitation, a traffic type, or a determination that a resource grant volume is sufficient to clear an uncompressed memory buffer during one or more periodic intervals as described above with reference to FIGS. 2-4. In certain examples, the operations of block 2420 may be performed by the compression enable/disable module 1140 as described above with reference to FIG. 11.

Figure 25:
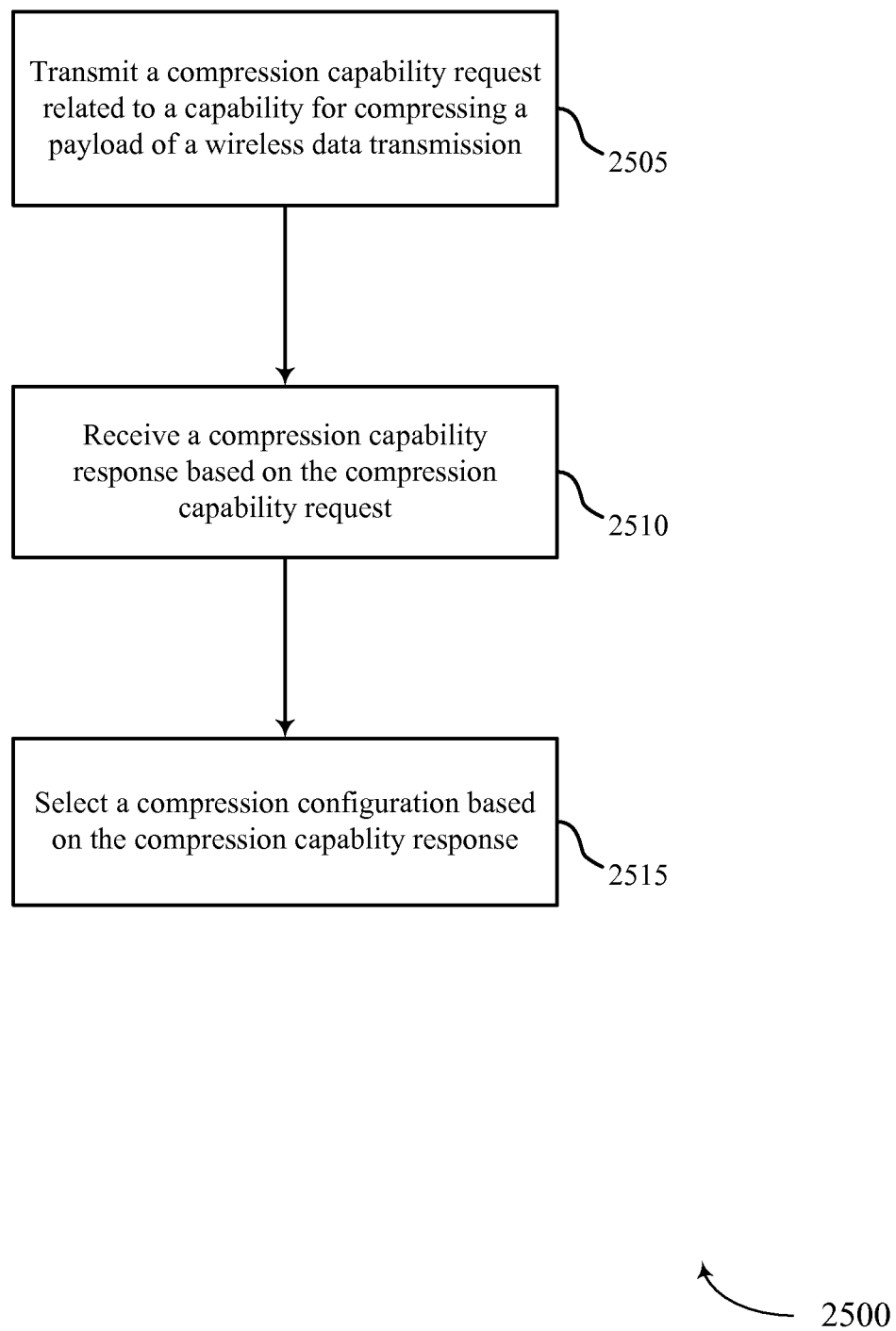

FIG. 25 shows another flowchart illustrating a method 2500 for evolved data compression scheme signaling in accordance with various aspects of the present disclosure. The operations of method 2500 may be implemented by a base station 105 or its components as described with reference to FIGS. 1-20. For example, the operations of method 2500 may be performed by the base station evolved data compression module 1310 as described with reference to FIGS. 13-16. In some examples, a base station 105 may execute a set of codes to control the functional elements of the base station 105 to perform the functions described below. Additionally or alternatively, the base station 105 may perform aspects the functions described below using special-purpose hardware. The method 2500 may incorporate aspects of methods 2100, 2200, 2300, 2400 and/or 2500 of FIGS. 21-25.

At block 2505, the base station 105 may transmit a compression capability request related to a capability for compressing a payload of a wireless data transmission as described above with reference to FIGS. 2-4. In certain examples, the operations of block 2505 may be performed by the BS capability request module 1405 as described above with reference to FIG. 14.

At block 2510, the base station 105 may receive a compression capability response based at least in part on the compression capability request as described above with reference to FIGS. 2-4. In certain examples, the operations of block 2510 may be performed by the BS capability response module 1410 as described above with reference to FIG. 14.

At block 2515, the base station 105 may select a compression configuration based at least in part on the compression capability response as described above with reference to FIGS. 2-4. In certain examples, the operations of block 2515 may be performed by the BS compression configuration module 1415 as described above with reference to FIG. 14.

Figure 26:
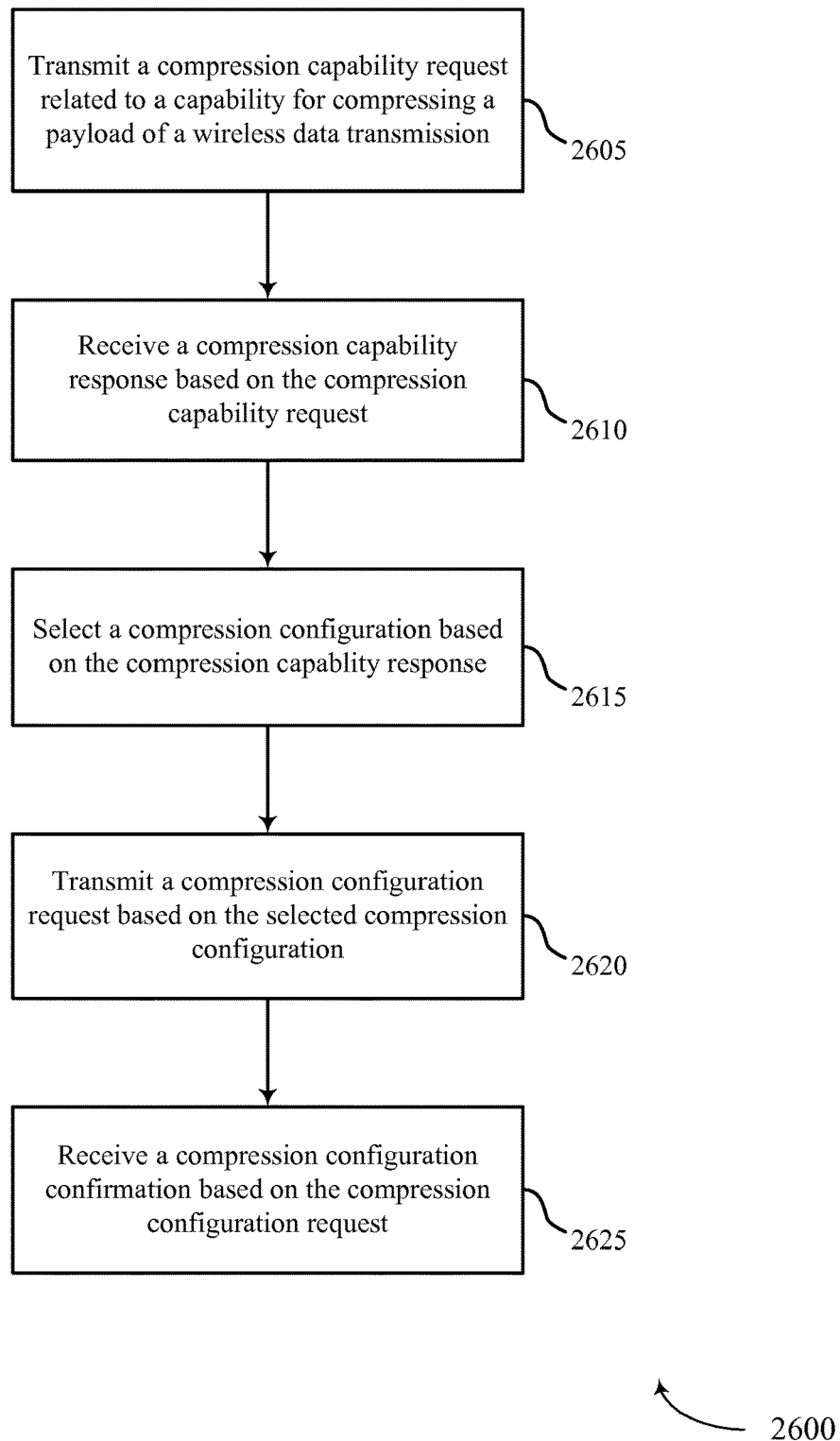

FIG. 26 shows another flowchart illustrating a method 2600 for evolved data compression scheme signaling in accordance with various aspects of the present disclosure. The operations of method 2600 may be implemented by a base station 105 or its components as described with reference to FIGS. 1-20. For example, the operations of method 2600 may be performed by the base station evolved data compression module 1310 as described with reference to FIGS. 13-16. In some examples, a base station 105 may execute a set of codes to control the functional elements of the base station 105 to perform the functions described below. Additionally or alternatively, the base station 105 may perform aspects the functions described below using special-purpose hardware. The method 2600 may incorporate aspects of methods 2100, 2200, 2300, 2400, and/or 2500 of FIGS. 21-25.

At block 2605, the base station 105 may transmit a compression capability request related to a capability for compressing a payload of a wireless data transmission as described above with reference to FIGS. 2-4. In certain examples, the operations of block 2605 may be performed by the BS capability request module 1405 as described above with reference to FIG. 14.

At block 2610, the base station 105 may receive a compression capability response based at least in part on the compression capability request as described above with reference to FIGS. 2-4. In certain examples, the operations of block 2610 may be performed by the BS capability response module 1410 as described above with reference to FIG. 14.

At block 2615, the base station 105 may select a compression configuration based at least in part on the compression capability response as described above with reference to FIGS. 2-4. In certain examples, the operations of block 2615 may be performed by the BS compression configuration module 1415 as described above with reference to FIG. 14.

At block 2620, the base station 105 may transmit a compression configuration request based at least in part on the selected compression configuration as described above with reference to FIGS. 2-4. In certain examples, the operations of block 2620 may be performed by the BS compression configuration module 1415-a as described above with reference to FIG. 12.

At block 2625, the base station 105 may receive a compression configuration confirmation based at least in part on the compression configuration request as described above with reference to FIGS. 2-4. In certain examples, the operations of block 2625 may be performed by the BS compression configuration module 1415-a as described above with reference to FIG. 12.

Figure 27:
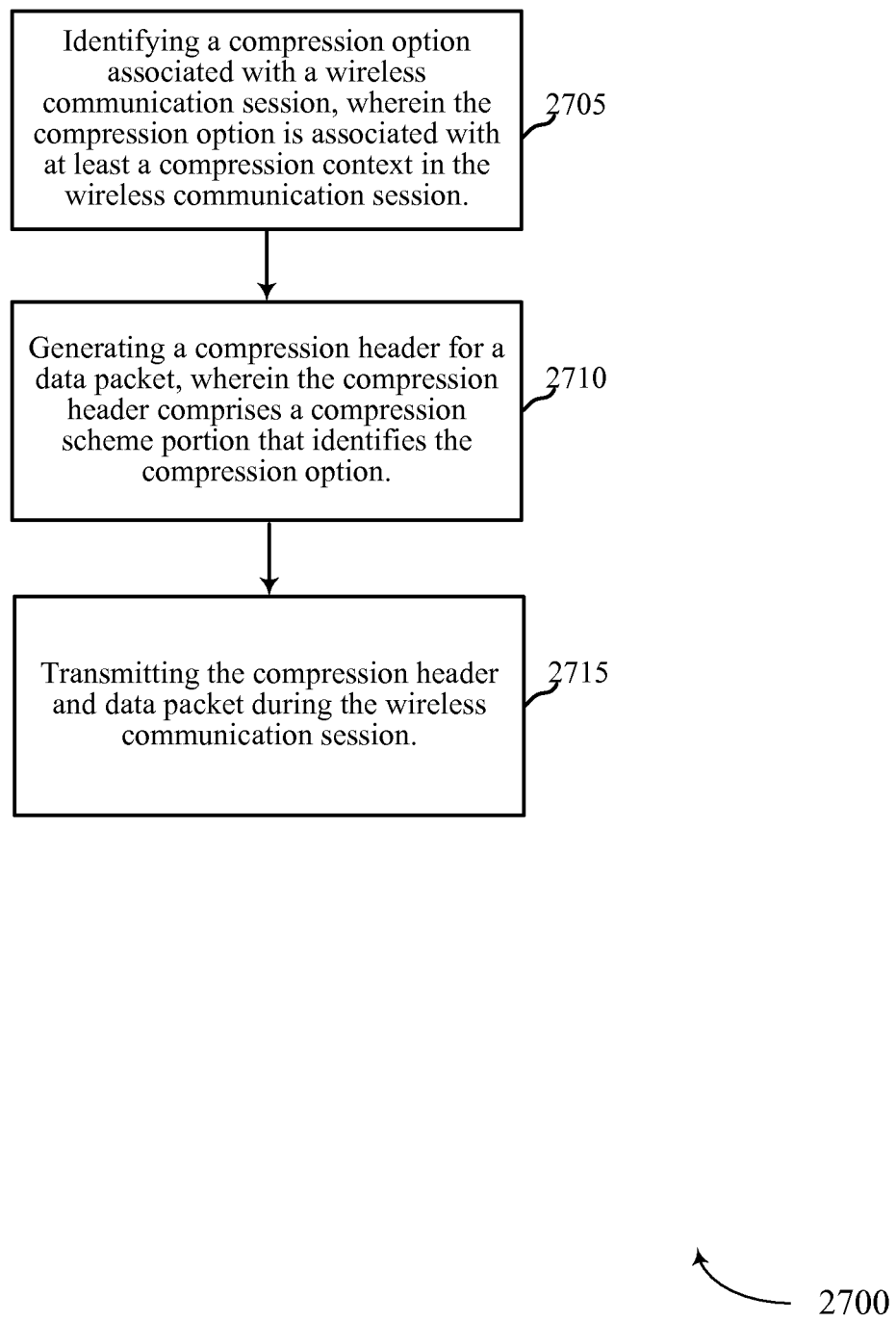

FIG. 27 is a flow chart illustrating an example of a method for wireless communication, in accordance with aspects of the present disclosure. For clarity, the method 2700 is described below with reference to aspects of one or more of the UEs 115 or base stations 105 or their components described with reference to FIGS. 1-20. In some examples, a UE or base station may execute one or more sets of codes to control the functional elements of the UE or base station to perform the functions described below. Additionally or alternatively, the UE or base station may perform one or more of the functions described below using special-purpose hardware.

At block 2705, the method 2700 may include identifying a compression option associated with a wireless communication session, wherein the compression option is associated with at least a compression context in the wireless communication session. The operations at block 2705 may be performed using the compression option module 1825 described with reference to FIG. 18.

At block 2710, the method 2700 may include generating a compression header for a data packet, wherein the compression header comprises a compression scheme portion that identifies the compression option. The operations at block 2710 may be performed using the extended compression header module 1830 described with reference to FIG. 18.

At block 2715, the method 2700 may include transmitting the compression header and data packet during the wireless communication session. The operations at block 2715 may be performed using the transmitter module 1720, 1820 of FIGS. 17 and 18.

Thus, the method 2700 may provide for wireless communication. It should be noted that the method 2700 is just one implementation and that the operations of the method 2700 may be rearranged or otherwise modified such that other implementations are possible.

Figure 28:
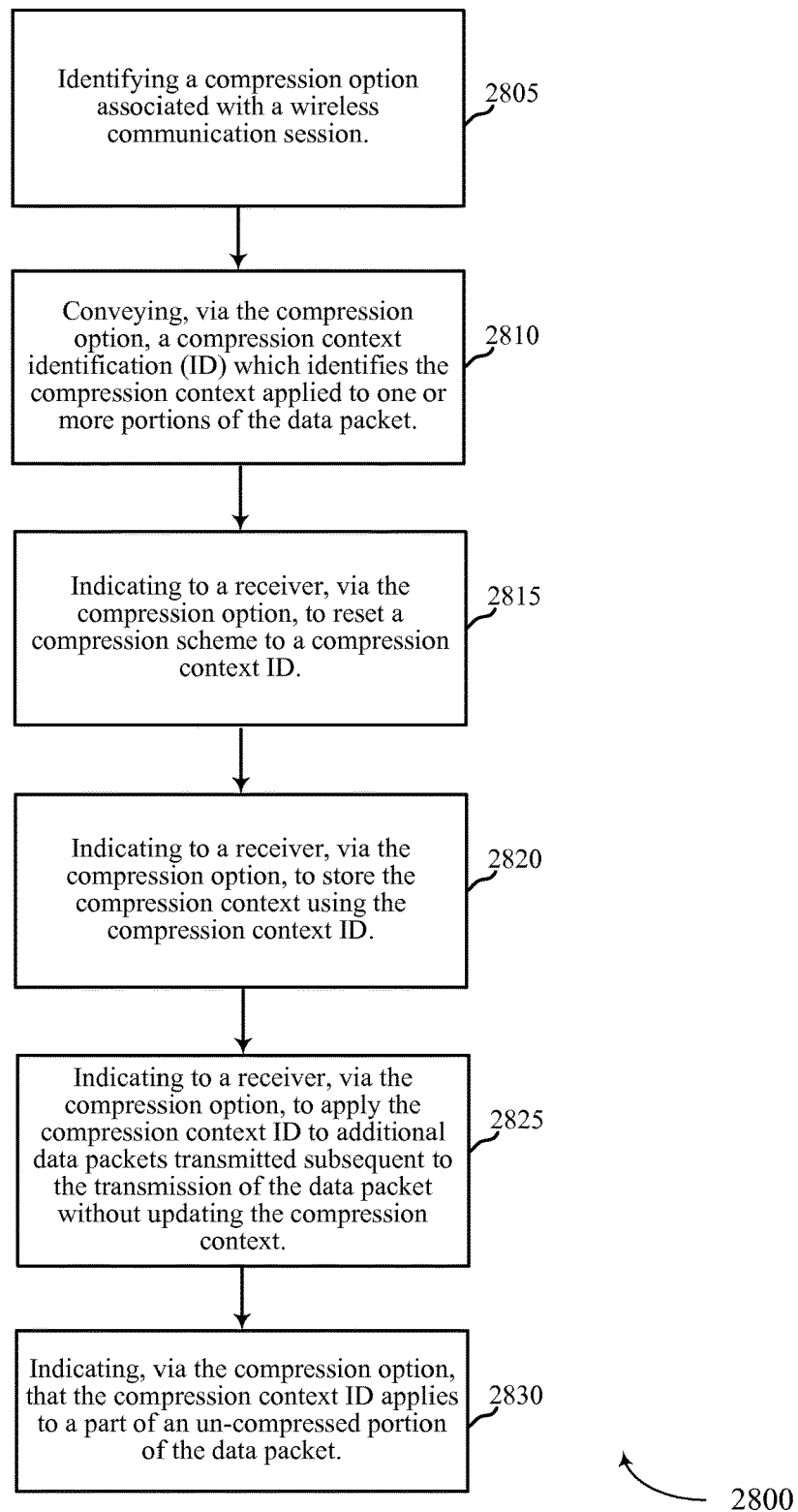

FIG. 28 is a flow chart illustrating an example of a method for wireless communication, in accordance with aspects of the present disclosure. For clarity, the method 2800 is described below with reference to aspects of one or more of the UEs 115 or base stations 105 or their components described with reference to FIGS. 1-20. In some examples, a UE or base station may execute one or more sets of codes to control the functional elements of the UE or base station to perform the functions described below. Additionally or alternatively, the UE or base station may perform one or more of the functions described below using special-purpose hardware.

At block 2805, the method 2800 may include identifying a compression option associated with a wireless communication session. The operations at block 2805 may be performed using the compression option module 1825 described with reference to FIG. 18.

At block 2810, the method 2800 may include conveying, via the compression option, a compression context identification (ID) which identifies the compression context applied to one or more portions of the data packet. The operations at block 2810 may be performed using the compression option module 1825 described with reference to FIG. 18 and the transmitter 1720, 1820 of FIGS. 17 and 18.

At block 2815, the method 2800 may include indicating to a receiver, via the compression option, to reset a compression scheme to a compression context ID. The operations at block 2815 may be performed using the compression option module 1825 described with reference to FIG. 18 and the transmitter 1720, 1820 of FIGS. 17 and 18.

At block 2820, the method 2800 may include indicating to a receiver, via the compression option, to store the compression context using the compression context ID. The operations at block 2820 may be performed using the compression option module 1825 described with reference to FIG. 18 and the transmitter 1720, 1820 of FIGS. 17 and 18.

At block 2825, the method 2800 may include indicating to a receiver, via the compression option, to apply the compression context ID to additional data packets transmitted subsequent to the transmission of the data packet without updating the compression context. The operations at block 2825 may be performed using the compression option module 1825 described with reference to FIG. 18 and the transmitter 1720, 1820 of FIGS. 17 and 18.

At block 2830, the method 2800 may include indicating, via the compression option, that the compression context ID applies to a part of an un-compressed portion of the data packet. The operations at block 2830 may be performed using the compression option module 1825 described with reference to FIG. 18 and the transmitter 1720, 1820 of FIGS. 17 and 18.

Thus, the method 2800 may provide for wireless communication. It should be noted that the method 2800 is just one implementation and that the operations of the method 2800 may be rearranged or otherwise modified such that other implementations are possible.

Figure 29:
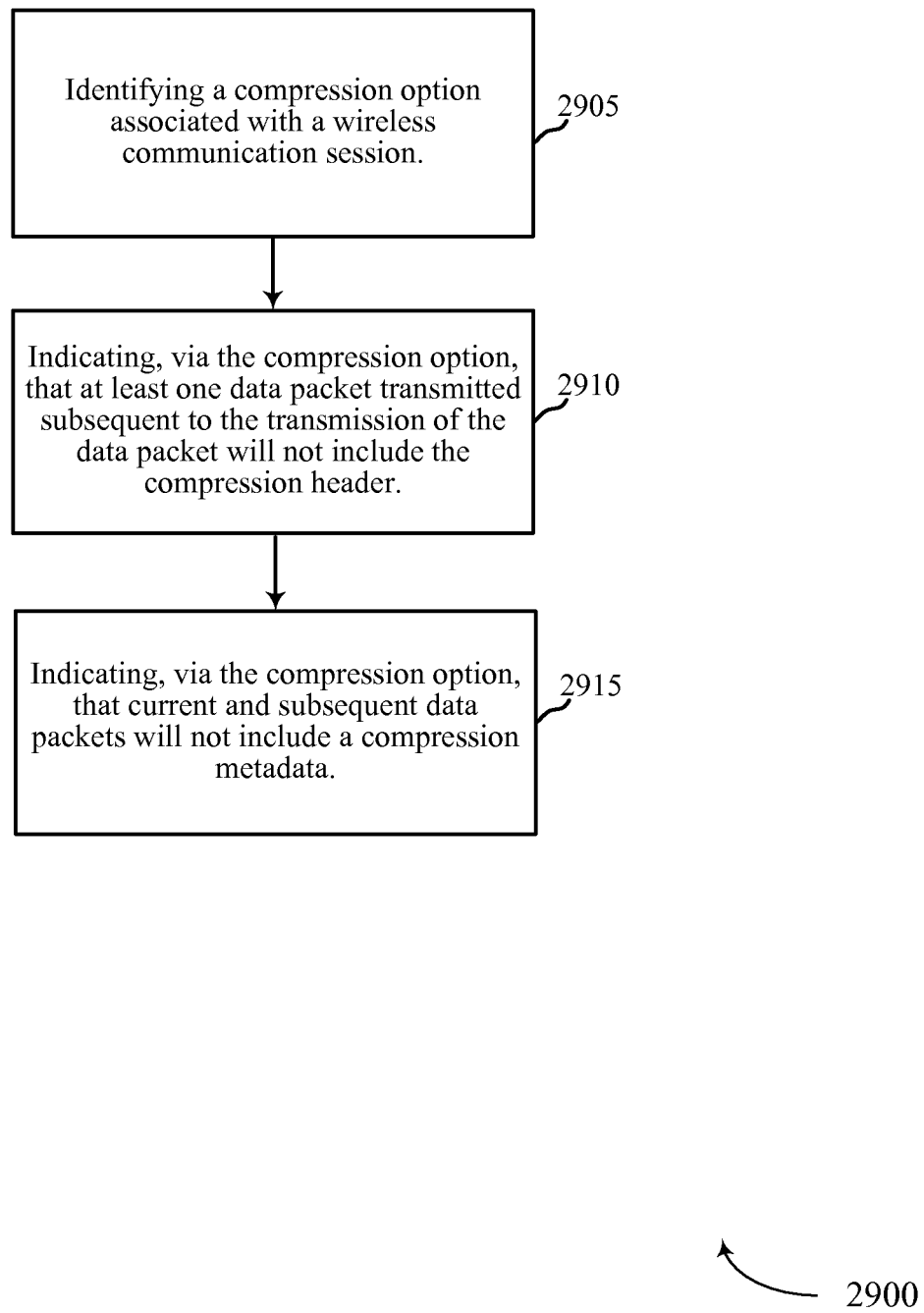

FIG. 29 is a flow chart illustrating an example of a method for wireless communication, in accordance with aspects of the present disclosure. For clarity, the method 2900 is described below with reference to aspects of one or more of the UEs 115 or base stations 185 described with reference to FIGS. 1-20. In some examples, a UE 115 or base station 185 may execute one or more sets of codes to control the functional elements of the UE or base station to perform the functions described below. Additionally or alternatively, the UE or base station may perform one or more of the functions described below using special-purpose hardware.

At block 2905, the method 2900 may include identifying a compression option associated with a wireless communication session. The operations at block 2905 may be performed using the compression option module 1825 described with reference to FIG. 18.

At block 2910, the method 2900 may include indicating, via the compression option, that at least one data packet transmitted subsequent to the transmission of the data packet will not include the compression header. The operations at block 2910 may be performed using the compression option module 1825 described with reference to FIG. 1 and the transmitter 1720, 1820 of FIGS. 17 and 18.

At block 2915, the method 2900 may include indicating, via the compression option, that current and subsequent data packets will not include a compression metadata. The operations at block 2915 may be performed using the compression option module 1825 described with reference to FIG. 18 and the transmitter 1720, 1820 of FIGS. 17 and 18.

Thus, the method 2900 may provide for wireless communication. It should be noted that the method 2900 is just one implementation and that the operations of the method 2900 may be rearranged or otherwise modified such that other implementations are possible.

Thus, methods 2100, 2200, 2300, 2400, 2500, 2600, 2700, 2800 and 2900 may provide for evolved data compression scheme signaling. It should be noted that methods 2100, 2200, 2300, 2400, 2500, 2600, 2700, 2800 and 2900 describe possible implementations, and that the operations and the steps may be rearranged or otherwise modified such that other implementations are possible. In some examples, aspects from two or more of the methods 2100, 2200, 2300, 2400, 2500, 2600, 2700, 2800 and 2900 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X,1X, etc. IS-856 (TIA-856) is commonly referred to as CDMA2000 1x EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communication at a wireless device, comprising:
    receiving, from a first device, a compression capability request requesting an indication of a capability of the wireless device for compressing a payload of a wireless data transmission;
    identifying, by the wireless device, a compression capability parameter based on the compression capability request and the capability of the wireless device, wherein the compression capability parameter is one of uplink algorithm information, downlink algorithm information, a compression rate supported by the wireless device, a compressor context memory size, or a prefill configuration for a compressor context memory;
    transmitting, to the first device and in response to the compression capability request, a compression capability response that includes a header that conveys the compression capability parameter, the compression capability response indicating one or more capabilities of the wireless device and allowing the first device to select a compression configuration based at least in part on the compression capability parameter; and
    receiving, from the first device, a compression configuration request based at least in part on the compression capability response, the compression configuration request indicating a compression context identity (ID) that is saved across a plurality of radio resource control (RRC) connections.

2. The method of claim 1, further comprising:
    transmitting a compression configuration confirmation or rejection based at least in part on the compression configuration request.

3. The method of claim 1, further comprising:
    transmitting and receiving a compressed packet based at least in part on the compression capability response.

4. The method of claim 3, wherein the compressed packet comprises one or more extended compression header fields indicating at least one of:
    a compression context reset request, a compression disable request associated with a number of subsequent packets, a compression context synchronization indication, a compression context freeze request, a multi-part compression indicator associated with a plurality of compression contexts, or a compression metadata indicator.

5. The method of claim 4, further comprising:
    transmitting a context identification (ID) save confirmation request; and
    receiving a context ID save confirmation.

6. The method of claim 1, further comprising:
    transmitting a compression control message.

7. The method of claim 6, wherein transmitting the compression control message comprises:
    transmitting the compression control message on a high priority radio bearer.

8. The method of claim 6, wherein the compression control message is based at least in part on a determination that an amount of available wireless device processing resources is below a threshold, or based on a determination that the wireless device has failed to decompress or decode a number of packets.

9. The method of claim 6, wherein the compression control message comprises at least one of a compression state indication, a compression scope indication, a data compression threshold, a compression enable/disable indication, a compressed packet ratio, or a context ID reset request.

10. The method of claim 1, further comprising:

transmitting a compression status indication.

11. The method of claim 10, wherein the compression status indication comprises at least one of a ciphered packet data convergence protocol (PDCP) control protocol data unit (PDU) type, an unciphered PDCP control PDU type, a sequence number, or a compression enable/disable indication.

12. The method of claim 10, wherein transmitting the compression status indication comprises:

disabling or enabling compression on a radio bearer; and transmitting the compression status indication after a last or before a first compressed data protocol data unit (PDU) is transmitted.

13. The method of claim 1, further comprising:

transmitting a compression enable request or a compression disable request based at least in part on at least one of a processing limitation, a traffic type, or a determination that a resource grant volume is sufficient to clear an uncompressed memory buffer during one or more periodic intervals.

14. The method of claim 1, wherein the compression capability parameter comprises a compression rate support parameter or a compression context prefill configuration.

15. The method of claim 1, further comprising:

disabling a PDCP discard timer based at least in part on the compression capability request.

16. The method of claim 1, further comprising:

storing a compressed version of a packet;

storing an uncompressed version of the packet; and resetting a context ID based on the uncompressed version of the packet.

* * * * *